US012563633B2

(12) United States Patent
Wang et al.

(10) Patent No.: US 12,563,633 B2
(45) Date of Patent: Feb. 24, 2026

(54) DATA TRANSMISSION METHOD AND APPARATUS

(71) Applicant: HUAWEI TECHNOLOGIES CO., LTD., Shenzhen (CN)

(72) Inventors: Hong Wang, Beijing (CN); Bingzhao Li, Beijing (CN); Zonghui Xie, Shenzhen (CN); Lei Chen, Beijing (CN); Baokun Shan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 553 days.

(21) Appl. No.: 17/965,032

(22) Filed: Oct. 13, 2022

(65) Prior Publication Data

US 2023/0038417 A1      Feb. 9, 2023

Related U.S. Application Data

(63) Continuation of application No. PCT/CN2020/107585, filed on Aug. 6, 2020.

(30) Foreign Application Priority Data

Apr. 14, 2020     (WO) ................ PCT/CN2020/084774

(51) Int. Cl.
*H04W 76/28* (2018.01)
*H04W 52/02* (2009.01)
*H04W 68/00* (2009.01)

(52) U.S. Cl.
CPC ....... *H04W 76/28* (2018.02); *H04W 52/0235* (2013.01); *H04W 68/005* (2013.01)

(58) Field of Classification Search
CPC ............. H04W 76/28; H04W 52/0235; H04W 68/005
See application file for complete search history.

(56) References Cited

U.S. PATENT DOCUMENTS

| | | | |
|---|---|---|---|
| 10,390,305 B1 | 8/2019 | Geekie et al. | |
| 2019/0007992 A1 | 1/2019 | Kim et al. | |
| 2019/0159082 A1 | 5/2019 | Talebi Fard et al. | |

FOREIGN PATENT DOCUMENTS

| | | | | |
|---|---|---|---|---|
| CN | 106507700 A | | 3/2017 | |
| CN | 107005838 A | * | 8/2017 | ............. H04W 8/22 |

(Continued)

OTHER PUBLICATIONS

Qualcomm Incorporated, Potential impacts of eDRX in 5GS on RAN3 specifications. 3GPP TSG-RAN WG3 Meeting#103, Athens, Greece, Feb. 25-Mar. 1, 2019, R3-190319, 4 pages.

(Continued)

*Primary Examiner* — Charles C Jiang
(74) *Attorney, Agent, or Firm* — HAUPTMAN HAM, LLP

(57) ABSTRACT

This application provides a data transmission method and apparatus. The method includes: receiving downlink data, where the downlink data is used to be sent to a terminal device; receiving first information from a second network device, where the first information is used to determine a time point for sending the downlink data to the second network device; and sending the downlink data to the second network device based on the first information, to avoid directly sending the downlink data to the second network device after receiving the downlink data, thereby relieving storage burden of the second network device.

11 Claims, 43 Drawing Sheets

(56)             References Cited

FOREIGN PATENT DOCUMENTS

| | | | |
|---|---|---|---|
| CN | 109756523 | A | 5/2019 |
| CN | 109996327 | A | 7/2019 |
| CN | 110447302 | A | 11/2019 |
| CN | 110493890 | A | 11/2019 |
| CN | 110913505 | A * | 3/2020 ........... H04L 67/568 |
| CN | 110913506 | A | 3/2020 |
| WO | WO-2019193184 | A1 * | 10/2019 |

OTHER PUBLICATIONS

Ericsson, New SID on support of reduced capability NR devices. 3GPP TSG RAN Meeting #86, Sitges, Spain, Dec. 9-12, 2019, RP-193238, 5 pages.

International Search Report issued in corresponding International Application No. PCT/CN2020/084774, dated Jan. 21, 2021, pp. 1-13.

International Search Report issued in corresponding International Application No. PCT/CN2020/107585, dated Jan. 14, 2021, pp. 1-11.

Extended European Search Report issued in corresponding European Application No. 20931678.5, dated Jul. 18, 2023, pp. 1-8.

3rd Generation Partnership Project;Technical Specification Group Services and System Aspects;Procedures for the 5G System (5GS);Stage 2(Release 15,3GPP TS 23.502 V15.9.0 (Mar. 2020),Total:362Pages.

3rd Generation Partnership Project;Technical Specification Group Services and System Aspects;System architecture for the 5G System (5GS);Stage 2(Release 15),3GPP TS 23.501 V15.9.0 (Mar. 2020),Total:248Pages.

* cited by examiner

1

DATA TRANSMISSION METHOD AND APPARATUS

CROSS-REFERENCE TO RELATED APPLICATIONS

This application is a continuation of International Application No. PCT/CN2020/107585, filed on Aug. 6, 2020, which claims priority to International Patent Application No. PCT/CN2020/084774, filed on Apr. 14, 2020. The disclosures of the aforementioned applications are hereby incorporated by reference in their entireties.

TECHNICAL FIELD

This application relates to the field of communication technologies, and in particular, to a data transmission method and apparatus.

BACKGROUND

When a terminal device is in a radio resource control (radio resource control, RRC) inactive mode and a core network device receives downlink data of the terminal device, the core network device sends the downlink data to an anchor network device of the terminal device, and then the anchor network device initiates paging to the terminal device, to resume an RRC connection to the terminal device. After the RRC connection is resumed, the terminal device switches from the RRC inactive mode to an RRC connected mode. In this case, the network device may send, to the terminal device, the downlink data delivered by the core network device.

To save energy, when the terminal device is in the RRC inactive mode, the network device and the terminal device agree on an occasion on which the terminal device may be paged, so that the terminal device periodically wakes up to listen to a paging message of the network device.

After the network device receives the downlink data of the terminal device from the core network device, the network device needs to store the downlink data before the paging occasion that is agreed on. When a discontinuous cycle of the terminal device is long, storage burden of the network device is high.

SUMMARY

This application provides a data transmission method and apparatus, to reduce load that is of a network device and that is for storing downlink data of a terminal device.

According to a first aspect, an embodiment of this application provides a data transmission method. The method may be implemented by a first network device, or may be implemented by a component of the first network device, for example, implemented by a component such as a processing apparatus, a circuit, or a chip in the first network device. The method includes:

receiving downlink data, where the downlink data is used to be sent to a terminal device; receiving first information from a second network device, where the first information is used to determine a time point for sending the downlink data to the second network device; and sending the downlink data to the second network device based on the first information.

For example, the first network device may be a user plane function (user plane function, UPF) network element, and the second network device may be an access network device.

According to the foregoing method, after receiving the downlink data, the first network device determines, based on the first information, the time point for sending the downlink data to the second network device, to avoid directly sending the downlink data to the second network device after receiving the downlink data, thereby relieving storage burden of the second network device.

In a possible design, the first information includes an extended discontinuous reception (extended discontinuous reception, eDRX) cycle; the first information includes an eDRX cycle and a paging time window (paging time window, PTW) duration; the first information includes an eDRX cycle and a first duration; the first information includes an eDRX cycle, a PTW duration, and a first duration; the first information includes a first duration; the first information includes eighth indication information; the first information includes eighth indication information and a second duration; or the first information includes ninth indication information, where the first duration indicates a time interval to a next PTW or a time interval to a next paging occasion PO, the eighth indication information indicates to suspend sending of the downlink data to the terminal device, the second duration indicates a duration for which sending of the downlink data to the terminal device is suspended, and the ninth indication information indicates to resume sending the downlink data to the terminal device.

According to the foregoing method, the first information may be used to determine the sending time point of the downlink data. For example, when the first information is the eDRX cycle, the downlink data may be sent at a point before the eDRX cycle. After receiving the downlink data, the second network device may page the terminal device without waiting for a long duration, so that a duration for buffering the downlink data by the second network device is shortened. When the first information includes other information, the first network device may determine a more accurate sending time point based on the first information, to further reduce the storage burden of the second network device. In addition, the eighth indication information directly indicates to suspend sending of the downlink data to an access network device; or the ninth indication information may directly indicate to resume sending the downlink data to an access network device, so that computing resources of the first network device such as a core network device can be saved, an interaction procedure is simple, and flexibility is higher.

In a possible design, the sending the downlink data to the second network device based on the first information includes: determining, based on the first information, a latest sending time point for sending the downlink data; and sending the downlink data to the second network device in a first preset duration before the latest sending time point.

In an optional implementation, the first preset duration may be predefined, for example, defined in a protocol or a standard; or preconfigured; or may be specified in another manner, for example, notified by the second network device. This is not limited in this embodiment of this application.

In another optional implementation, the latest sending time point is a wake-up time point of the terminal device after the downlink data is received.

For example, the first information further includes a PTW. If a time point at which the first network device receives the downlink data is in the PTW, the latest sending time point is a tail time domain position of an end time point of the PTW. If a time point at which the UPF receives the downlink data is outside the PTW, the latest sending time point is a first time domain position, and the first time domain position is a start time domain position of a next eDRX cycle, a tail time domain position of a PTW in the next eDRX cycle, or a start time domain position of any paging occasion in the PTW in the next eDRX cycle.

For another example, the first message includes the first duration; and the method further includes: The first network device determines, based on a time point at which the first message is received and the first duration, a start time domain position of a next PTW or a start time domain position of a next PO, where the latest sending time point is a start time domain position of a next eDRX cycle of an eDRX cycle in which the first network device receives the downlink data; or the latest sending time point is a start time domain position of a next PO when the first network device receives the downlink data.

According to the foregoing method, the first network device may determine the eDRX cycle of the terminal device based on the first information. The eDRX cycle includes the wake-up time point of the terminal device. The latest sending time point that is of the downlink data and that is determined by the first network device may be the wake-up time point of the terminal device closest to the time point at which the first network device receives the downlink data. The first network device may send the downlink data to an access network device of the terminal device before the latest wake-up time point of the terminal device, so that storage burden of the access network device is reduced and a delay in receiving the downlink data by the terminal device is reduced.

In a possible design, the method includes: sending second indication information to the second network device or a third network device, where the second indication information indicates that the downlink data exists.

In an optional implementation, the third network device may be an access and mobility management function (access and mobility management function, AMF) network element.

According to the foregoing method, when the first network device does not buffer the downlink data, the first network device may notify the second network device or the third network device by using the second indication information, so that the second network device or the third network device selectively releases the terminal device, to reduce power consumption of the terminal device. For example, when the second network device does not need to send the downlink data to the terminal device, the terminal device may switch to the radio resource control (radio resource control, RRC) inactive mode, or keep the RRC inactive mode.

In a possible design, the first network device is a user plane network element UPF, the second network device is an access network device, and the third network device is an access network device or an access and mobility management network element AMF.

According to a second aspect, an embodiment of this application provides a data transmission method. The method may be implemented by a second network device, or may be implemented by a component of the second network device, for example, implemented by a component such as a processing apparatus, a circuit, or a chip in the second network device. The method includes: determining first information, where the first information is used to determine a sending time point of downlink data, and the downlink data is used to be sent to a terminal device; and sending the first information to a first network device.

In a possible design, the first information includes: the first information includes an extended discontinuous reception eDRX cycle; the first information includes an eDRX cycle and a paging time window PTW duration; the first information includes an eDRX cycle and a first duration; the first information includes an eDRX cycle, a PTW duration, and a first duration; the first information includes a first duration; the first information includes eighth indication information; the first information includes eighth indication information and a second duration; or the first information includes ninth indication information, where the first duration indicates a time interval to a next PTW or a time interval to a next paging occasion (paging occasion, PO), the eighth indication information indicates to suspend sending of the downlink data to the terminal device, the second duration indicates a duration for which sending of the downlink data to the terminal device is suspended, and the ninth indication information indicates to resume sending the downlink data to the terminal device.

In a possible design, the method includes: receiving second indication information, where the second indication information indicates that the downlink data exists.

In a possible design, before the sending the first information to a first network device, the method further includes: determining that the extended discontinuous reception eDRX cycle is not less than a preset threshold.

According to the foregoing method, when UE is in an eDRX cycle mode, the second network device (for example, an access network device) may send the first information to a third network device (for example, an AMF). Further, whether to send the first information may be determined based on a length of the eDRX cycle. For example, when the length of the eDRX cycle is not less than the preset threshold, the access network device sends the first information. This prevents the access network device from buffering downlink data of the UE for a long duration when the UE is in a long eDRX cycle, thereby reducing storage load of the access network device.

In a possible design, the first network device is a user plane network element UPF or an access and mobility management network element AMF.

For a technical effect that can be achieved by any possible design of the second aspect, refer to the technical effect that can be achieved by the first aspect. Details are not described herein again.

According to a third aspect, an embodiment of this application provides a data transmission method. The method may be implemented by a third network device, or may be implemented by a component of the third network device, for example, implemented by a component such as a processing apparatus, a circuit, or a chip in the third network device. The method includes:

receiving first information from a second network device, where the first information is used to determine a sending time point of downlink data, and the downlink data is used to be sent to a terminal device; and sending the first information to a first network device.

In a possible design, the first information includes: the first information includes an extended discontinuous reception eDRX cycle; the first information includes an eDRX cycle and a paging time window PTW duration; the first information includes an eDRX cycle and a first duration; or the first information includes an eDRX cycle, a PTW duration, and a first duration, where the first duration indicates a time interval to a next PTW or a time interval to a next paging occasion PO.

In a possible design, the method includes: receiving second indication information from the first network device, where the second indication information indicates that the first network device has the downlink data.

In a possible design, the first network device is a user plane network element UPF, and the second network device is an access network device.

For a technical effect that can be achieved by any possible design of the third aspect, refer to the technical effect that can be achieved by the first aspect. Details are not described herein again.

According to a fourth aspect, an embodiment of this application provides a data transmission method. The method may be implemented by a first network device, or may be implemented by a component of the first network device, for example, implemented by a component such as a processing apparatus, a circuit, or a chip in the first network device. The method includes: receiving second information from a second network device, where the second information indicates that a terminal device is reachable; and sending downlink data of the terminal device to the second network device based on the second information.

For example, that the terminal device is reachable means that the terminal device is online, or indicates that the downlink data is reachable, or indicates that the terminal device is in an RRC active mode. In conclusion, that the terminal device is reachable may be used by the first network device to determine that the downlink data of the terminal device can be sent to an access network device.

Optionally, after receiving the second information, the first network device determines whether the downlink data of the terminal device is buffered, and if the downlink data of the terminal device is buffered, the first network device sends the downlink data of the terminal device to the access network device based on the second information.

According to the foregoing method, flexibility of sending the downlink data by the first network device to the access network device is improved, and a delay in receiving the downlink data by the terminal device is reduced.

In a possible design, the second information indicates that the terminal device requests to enter a radio resource control RRC connected mode; or the second information indicates that the terminal device is in an RRC connected mode.

In a possible design, the method further includes: determining that the downlink data of the terminal device is buffered.

In a possible design, the method includes: sending fourth indication information to the second network device or a third network device, where the fourth indication information indicates whether the downlink data of the terminal device is buffered.

In a possible design, the second network device is an access network device, and the third network device is an access network device or an access and mobility management network element AMF.

According to a fifth aspect, an embodiment of this application provides a data transmission method. The method may be implemented by a second network device, or may be implemented by a component of the second network device, for example, implemented by a component such as a processing apparatus, a circuit, or a chip in the second network device.

The method includes: determining second information, where the second information indicates that a terminal device is reachable; and sending the second information to a first network device.

In a possible design, the second information indicates that the terminal device requests to enter a radio resource control RRC connected mode; or the second information indicates that the terminal device is in an RRC connected mode.

In a possible design, the method includes: receiving fourth indication information from the first network device, where the fourth indication information indicates whether downlink data of the terminal device is buffered.

In a possible design, the method further includes: sending sixth indication information to a third network device, where the sixth indication information indicates a load status of the second network device; or the sixth indication information indicates that the second network device supports a capability of sending first information to the first network device.

In a possible design, the first network device is a user plane network element UPF, the second network device is an access network device, and the third network device is an access and mobility management network element AMF.

For a technical effect that can be achieved by any possible design of the fifth aspect, refer to the technical effect that can be achieved by the fourth aspect. Details are not described herein again.

According to a sixth aspect, an embodiment of this application provides a data transmission method. The method may be implemented by a third network device, or may be implemented by a component of the third network device, for example, implemented by a component such as a processing apparatus, a circuit, or a chip in the third network device. The method includes: determining second information, where the second information indicates that a terminal device is reachable; and sending the second information to a first network device.

In a possible design, the second information indicates that the terminal device requests to enter a radio resource control RRC connected mode; or the second information indicates that the terminal device is in an RRC connected mode.

In a possible design, the method includes: receiving the second information from a second network device.

In a possible design, the method includes: receiving fourth indication information from the first network device, where the fourth indication information indicates whether downlink data of the terminal device is buffered.

In a possible design, the method further includes: receiving sixth indication information, where the sixth indication information indicates a load status of the second network device; or the sixth indication information indicates that the second network device supports a capability of sending first information to the first network device.

In a possible design, the first network device is a user plane network element UPF, and the second network device is an access network device.

For a technical effect that can be achieved by any possible design of the sixth aspect, refer to the technical effect that can be achieved by the fourth aspect. Details are not described herein again.

According to a seventh aspect, an embodiment of this application provides a data transmission method. The method may be implemented by a third network device, or may be implemented by a component of the third network device, for example, implemented by a component such as a processing apparatus, a circuit, or a chip in the third network device. The method includes: receiving first information from a second network device; and after sending second information, waiting, in a waiting duration, to receive response information from a terminal device, where the second information is used to be sent to the terminal device, where the first information includes one or more of the following: an extended discontinuous reception eDRX cycle, a paging time window PTW duration, a first duration, and first indication information, where the first duration indicates a time interval to a next PTW or a time interval to a next paging occasion PO, and the first indication information indicates that the terminal device is in an RRC inactive mode.

For example, waiting to receive the response information of the UE in the waiting duration may be implemented by using a timer. Specifically, a specified duration of the timer is the determined waiting duration, and receiving of the response information of the UE is waited for before the timer expires. If the response information of the UE is received before the timer expires, the timer may be disabled.

According to the foregoing method, the waiting duration is determined based on the first information, and after the second information is sent to an access network device, the receiving of the response information of the terminal device is waited for in the determined waiting duration. Compared with an existing duration, the waiting duration can better adapt to a response duration required by the UE, and is dynamically configurable. For example, the access network device may dynamically configure the first information based on the eDRX cycle of the UE, to avoid a misoperation on the UE.

In a possible design, the terminal device is in a connection management connected (CM connected) mode, and the second information is non-access stratum (non-access stratum, NAS) signaling.

According to an eighth aspect, an embodiment of this application provides a data transmission method. The method may be implemented by a second network device, or may be implemented by a component of the second network device, for example, implemented by a component such as a processing apparatus, a circuit, or a chip in the third network device. The method includes: determining first information; and sending the first information to a first network device, where the first information includes one or more of the following: an extended discontinuous reception eDRX cycle, a paging time window PTW duration, a first duration, and first indication information, where the first duration indicates a time interval to a next PTW or a time interval to a next paging occasion PO, and the first indication information indicates that a terminal device is in an RRC inactive mode.

In a possible design, the first information is used to determine a response duration of the terminal device for second information, and the second information is used to be sent to the terminal device.

In a possible design, before the sending the first information to a first network device, the method further includes: determining that the extended discontinuous reception eDRX cycle is not less than a preset threshold.

According to the foregoing method, when the UE is in an eDRX cycle mode, the second network device (for example, an access network device) may send the first information to a third network device (for example, an AMF). Further, the second network device may determine, based on a length of the eDRX cycle, whether to send the first information. For example, when the length of the eDRX cycle is not less than the preset threshold, the second network device sends the first information, so that the third network side device can adjust a waiting duration in time to better adapt to a mode change of the UE, to reduce misoperations on the UE. If the length of the eDRX cycle is less than the preset threshold, the second network device may not send the first information.

It may be understood that an original waiting duration of the third network device can cover the response duration required after the mode of the UE is changed, so that signaling interaction is reduced and signaling and computing resources are saved while it is determined that misoperations on the UE can be reduced.

For a technical effect that can be achieved by any possible design of the eighth aspect, refer to the technical effect that can be achieved by the seventh aspect. Details are not described herein again.

According to a ninth aspect, this application provides a data transmission apparatus. The apparatus may be a user plane network element, or may be a chip used for the user plane network element. The apparatus has a function of implementing the embodiments of the first aspect, or a function of implementing the embodiments of the fourth aspect. The function may be implemented by hardware, or may be implemented by hardware executing corresponding software. The hardware or the software includes one or more modules corresponding to the function.

For example, the apparatus includes a communication module and a processing module, where the communication module includes a sending module and a receiving module.

In a possible design, the receiving module is configured to: receive downlink data, where the downlink data is used to be sent to a terminal device; and receive first information from a second network device, where the first information is used to determine a time point for sending the downlink data to the second network device; and the processing module is configured to send the downlink data to the second network device based on the first information.

In a possible design, the receiving module is configured to receive second information from a second network device, where the second information indicates that a terminal device is reachable; and the processing module is configured to send downlink data of the terminal device to the second network device based on the second information.

According to a tenth aspect, this application provides a data transmission apparatus.

The apparatus may be an access network device, or may be a chip used for the access network device. The apparatus has a function of implementing the embodiments of the second aspect, a function of implementing the embodiments of the fifth aspect, or a function of implementing the embodiments of the eighth aspect. The function may be implemented by hardware, or may be implemented by hardware executing corresponding software. The hardware or the software includes one or more modules corresponding to the function.

For example, the apparatus includes a communication module and a processing module, where the communication module includes a sending module and a receiving module.

In a possible design, the processing module is configured to determine first information, where the first information is used to determine a sending time point of downlink data, and the downlink data is used to be sent to a terminal device; and the sending module is configured to send the first information to a first network device.

In a possible design, the processing module is configured to determine second information, where the second information indicates that a terminal device is reachable; and the sending module is configured to send the second information to a first network device.

In a possible design, the processing module is configured to determine first information, where the first information includes one or more of the following: an extended discontinuous reception eDRX cycle, a paging time window PTW duration, a first duration, and first indication information, where the first duration indicates a time interval to a next PTW or a time interval to a next paging occasion PO, and the first indication information indicates that a terminal device is in an RRC inactive mode; and the sending module is configured to send the first information to a third network device.

According to an eleventh aspect, this application provides a data transmission apparatus. The apparatus may be a mobility management network element, or may be a chip used for the mobility management network element. The apparatus has a function of implementing the embodiments of the third aspect, a function of implementing the embodiments of the sixth aspect, or a function of implementing the embodiments of the seventh aspect. The function may be implemented by hardware, or may be implemented by hardware executing corresponding software. The hardware or the software includes one or more modules corresponding to the function.

The apparatus includes a communication module and a processing module, where the communication module includes a sending module and a receiving module.

In a possible design, the receiving module is configured to receive first information from a second network device, where the first information is used to determine a sending time point of downlink data, and the downlink data is used to be sent to a terminal device; and the sending module is configured to send the first information to a first network device.

In a possible design, the processing module is configured to determine second information, where the second information indicates that a terminal device is reachable; and the sending module is configured to send the second information to a first network device.

In a possible design, the receiving module is configured to receive first information from a second network device, where the first information includes one or more of the following: an extended discontinuous reception eDRX cycle, a paging time window PTW duration, a first duration, and first indication information, where the first duration indicates a time interval to a next PTW or a time interval to a next paging occasion PO, and the first indication information indicates that a terminal device is in an RRC inactive mode; and the processing module is configured to: after sending second information through the sending module, wait, in a waiting duration, to receive response information from the terminal device through the receiving module, where the second information is used to be sent to the terminal device.

According to a twelfth aspect, this application provides a data transmission apparatus. The apparatus includes a processor and an interface circuit. The processor is configured to communicate with another apparatus through the interface circuit, and perform the methods according to the foregoing aspects. There are one or more processors.

In a first embodiment, when the apparatus is the apparatus in the seventh aspect, for example, the interface circuit is configured to: receive downlink data, where the downlink data is used to be sent to a terminal device; and receive first information from a second network device, where the first information is used to determine a time point for sending the downlink data to the second network device; and the processor is configured to send the downlink data to the second network device based on the first information.

For another example, the interface circuit is configured to receive second information from a second network device, where the second information indicates that a terminal device is reachable; and the processor is configured to send downlink data of the terminal device to the second network device based on the second information.

In a second embodiment, when the apparatus is the apparatus in the eighth aspect, for example, the processor is configured to determine first information, where the first information is used to determine a sending time point of downlink data, and the downlink data is used to be sent to a terminal device; and the interface circuit is configured to send the first information to a first network device.

For another example, the processor is configured to determine second information, where the second information indicates that a terminal device is reachable; and the interface circuit is configured to send the second information to a first network device.

In a third embodiment, when the apparatus is the apparatus in the ninth aspect, for example, the interface circuit is configured to: receive first information from a second network device, where the first information is used to determine a sending time point of downlink data, and the downlink data is used to be sent to a terminal device; and send the first information to a first network device.

For another example, the processor is configured to determine second information, where the second information indicates that a terminal device is reachable; and the interface circuit is configured to send the second information to a first network device.

According to an eleventh aspect, this application provides a data transmission apparatus.

The apparatus includes a processor, configured to be connected to a memory, and configured to invoke a program stored in the memory, to perform the methods according to the foregoing aspects. The memory may be located inside or outside the apparatus. In addition, there are one or more processors.

According to a twelfth aspect, this application further provides a computer-readable storage medium. The computer-readable storage medium stores instructions. When the instructions are run on a computer, a processor is enabled to perform the methods according to the foregoing aspects.

According to a thirteenth aspect, this application further provides a computer program product including instructions. When the instructions are run on a computer, the computer is enabled to perform the methods according to the foregoing aspects.

According to a fourteenth aspect, this application further provides a chip or a chip system, including a processor and a communication interface. The processor is configured to communicate with another apparatus through the communication interface, and perform the methods according to the foregoing aspects.

According to a fifteenth aspect, this application further provides a data transmission system, including a first network device configured to perform any method in the first aspect, a second network device configured to perform any method in the second aspect, and a third network device configured to perform any method in the third aspect.

According to a sixteenth aspect, this application further provides a data transmission system, including a first network device configured to perform any method in the fourth aspect, a second network device configured to perform any method in the fifth aspect, and a third network device configured to perform any method in the sixth aspect.

DESCRIPTION OF EMBODIMENTS

Figure 1:
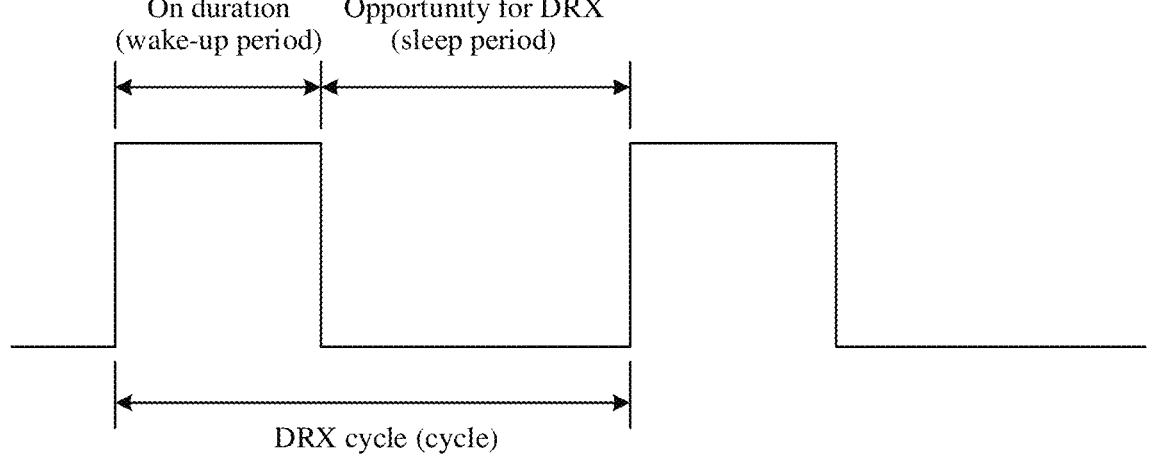
FIG. 1 is a schematic diagram of a DRX principle according to this application.

To make the objectives, technical solutions, and advantages of this application clearer, the following further describes this application in detail with reference to the accompanying drawings. A specific operation method in method embodiments may also be applied to a device embodiment or a system embodiment. In descriptions of this application, unless otherwise stated, "a plurality of" means two or more than two.

In a wireless communication system, for example, a long term evolution (long term evolution, LTE) system or a 5th generation (5th generation, 5G) communication system, a terminal device may perform a radio resource control (radio resource control, RRC) connection setup process with a network device. After the terminal device sets up an RRC connection to the network device, an RRC mode of the terminal device is an RRC connected mode. Then, the RRC mode of the terminal device may switch between the following modes: an RRC idle (RRC_IDLE) mode, the RRC connected (RRC_CONNECTED) mode, and an RRC inactive (RRC_INACTIVE) mode.

First, the three RRC modes of the terminal device are described.

1. RRC Idle Mode

When a terminal device is in the RRC idle mode, an RRC connection between the terminal device and an access network is released. In this case, the terminal device may receive a paging message, a broadcast channel, system information, and/or the like from a network device.

In this RRC mode, the network device does not know whether the terminal device is in a coverage area of the network device or a management scope of the network device. For example, the network device does not know whether the terminal device is in a coverage area of a cell managed by the network device; a core network does not know a coverage area or a management scope, of a specific network device, in which the terminal device is located; and the core network does not know a specific network device through which the terminal device can be positioned or found.

2. RRC Inactive Mode

When a terminal device is in the RRC inactive mode, there is no RRC connection between the terminal device and a network device. In this case, the network device does not know whether the terminal device is in a coverage area of the network device or a management scope of the network device. For example, the network device does not know whether the terminal device is in a coverage area of a cell managed by the network device; a core network knows one or more coverage areas or management scopes, of one or more specific network devices, in which the terminal device is located; and the core network knows one or more specific network devices through which the terminal device can be positioned or found.

When the terminal device is in the RRC_INACTIVE mode, the terminal device may receive a paging message, a synchronization signal, a broadcast message, system information, and/or the like from the network device.

3. RRC Connected Mode

When a terminal device is in the RRC_CONNECTED mode, there is an RRC connection between the terminal device and a network device. Therefore, the network device knows that the terminal device is in a coverage area of the network device or in a management scope of the network device.

Currently, when terminal device-specific data transmission is performed between a network device and a terminal device, for example, the network device is an access network device, the access network device receives downlink data of the terminal device (for example, downlink data of a PDU session of the terminal device) from a core network device. When the access network device needs to send the downlink data to the terminal device, the terminal device needs to be in the RRC connected mode. For example, if the terminal device is in the RRC idle mode or the RRC inactive mode, the terminal device first performs an RRC connection setup process with the network device. After the terminal device sets up an RRC connection to the network device, a mode of the terminal device is the RRC connected mode. In this case, the terminal device-specific data transmission may be performed.

For example, the terminal device may switch from the RRC idle mode or the RRC inactive mode to the RRC connected mode by using the RRC connection setup process with the network device. The RRC connection setup process may be triggered by the network device. For example, when the terminal device is in the RRC inactive mode, the network device sends a paging message to the terminal device, where the paging message includes an identifier of the terminal device. Correspondingly, after receiving the paging message from the network device, the terminal device triggers the RRC connection setup process. Alternatively, the RRC connection setup process may be triggered by a higher layer of the terminal device. For example, when the terminal device needs to send uplink data, the higher layer of the terminal device triggers the RRC connection setup process.

A process in which the network device sends the paging message to the terminal device may be as follows:

Downlink data from the network device is unpredictable. Therefore, in the RRC inactive mode, the terminal device periodically wakes up to listen to downlink data that may be sent by the network device. For example, the network device configures discontinuous reception (discontinuous reception, DRX) for the terminal device. DRX means that the terminal device does not need to continuously listen to a paging message, but periodically wakes up based on DRX to listen to a paging message, so as to save power. FIG. 1 is a schematic diagram of a DRX cycle. The DRX includes an on duration (a wake-up period) and an opportunity for DRX (a sleep period).

Specifically, for the on duration, a terminal device is in a wake-up active mode. If a network device needs to send downlink data to the terminal device, the network device initiates paging to the terminal device in the on duration. Correspondingly, the terminal device needs to listen to a PDCCH in the on duration, to detect whether the network device initiates paging to the terminal device. For example, the on duration includes at least one paging occasion (paging occasion, PO). A process in which the network device initiates paging to the terminal device may include: The network device sends, on a paging occasion (PO) in the on duration, DCI used to schedule a paging message, and sends the paging message at a resource position indicated by the DCI. Correspondingly, the terminal device listens to a PDCCH on the paging occasion in the on duration, blindly detects the DCI, receives the paging message based on the resource position indicated by the DCI, and performs an RRC connection setup process with the network device.

For the opportunity for DRX, the terminal device is in a sleep mode, and does not listen to the PDCCH. Therefore, the network device does not initiate paging to the terminal device in the opportunity for DRX either.

For example, if a DRX cycle is 10 s, and an on duration is 1 s, a terminal device wakes up every 10 s, and listens to, in 1 s of the on duration, a paging message that may be sent by an access network device, until the paging message is received or timing of the on duration is completed. In the foregoing manner, although the terminal device does not need to continuously listen on the channel, the terminal device still needs to frequently wake up to listen to the paging message.

To further reduce energy consumption of the terminal device, the network device may further configure a longer sleep duration for the terminal device in an RRC inactive mode. For example, the network device configures extended discontinuous reception (extended discontinuous reception, eDRX) for the terminal device. In the eDRX, the network device may configure a paging time window PTW for the terminal device. For example, (refer to FIG. 11b) the PTW may be understood as one or more DRX cycles that are cyclically executed. To be specific, the terminal device wakes up in the PTW based on the DRX cycle to listen to the paging message, and stays in a sleep mode outside the PTW in the eDRX. In the PTW, an on duration in the DRX cycle may be referred to as a paging occasion (PO). For example, an eDRX cycle may be 3 hours, the PTW may be 100 s, and a paging occasion cycle is 10 s. In this case, the terminal device wakes up every 10 s in the PTW, listens to the paging message on a paging occasion, and is in the sleep mode all time except the paging occasion in the eDRX. In other words, the terminal device needs to wake up only 10 times in one eDRX cycle. In conclusion, in the eDRX, in comparison with the DRX, the terminal device is in the sleep mode for a longer time, and does not need to wake up frequently to listen to the paging message, so that the power consumption of the terminal device is further reduced. However, it is more difficult for the network device to page the terminal device. In other words, the network device may need to store the downlink data of the terminal device for a long duration, increasing storage burden of the network device. How to reduce the storage load of the network device while reducing the energy consumption of the terminal device is a problem to be resolved urgently.

In view of this, technical solutions in embodiments of this application are provided. In embodiments of this application, an access network device sends first information to a core network device, where the first information is used to determine a time point at which the core network device sends downlink data of a terminal device to the access network device. After the core network device receives the downlink data of the terminal device, for example, receives, from a DN, data that is of the Youku service and that is requested by the terminal device by using a PDU session, the core network device sends the downlink data to the access network device based on the first information. For example, the core network device determines, based on the first information, the time point for sending the downlink data. When the time point arrives, the downlink data is sent to the access network device, so as to reduce storage burden of the access network device.

The technical solutions provided in embodiments of this application may be applied to various communication systems, for example, may be applied to communication systems such as LTE and 5G, or may be applied to wireless fidelity (wireless fidelity, Wi-Fi), worldwide interoperability for microwave access (worldwide interoperability for microwave access, WiMAX), or a future communication system, for example, a future 6th generation (6th generation, 6G) system. 5G may also be referred to as new radio (new radio, NR). For example, in a communication system to which the technical solutions provided in embodiments of this application may be applied, one entity may initiate paging or access to another entity. In a description process of embodiments of this application, an air interface communication process between a network device and a terminal device is used as an example. Optionally, the technical solutions provided in embodiments of this application may further be applied to sidelink (sidelink, SL) communication. In the communication, one terminal device can initiate paging or access to another terminal device. For example, the technical solutions provided in embodiments of this application may be applied to a device-to-device (device-to-device, D2D) communication scenario, for example, may be an NR D2D communication scenario and/or an LTE D2D communication scenario; may be applied to a vehicle to everything (vehicle to everything, V2X) communication scenario, for example, may be an NR V2X communication scenario, an LTE V2X communication scenario, an internet of vehicles communication scenario, and/or a vehicle-to-vehicle (vehicle-to-vehicle, V2V) communication scenario; or may be used in fields such as intelligent driving and intelligent connected vehicles.

Figure 2:
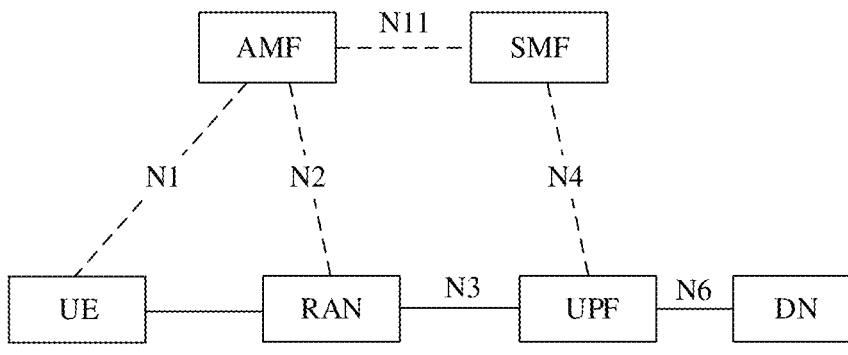
FIG. 2 is a diagram of a system architecture according to an embodiment of this application.

FIG. 2 shows a network architecture to which an embodiment of this application is applicable. The following separately provides brief descriptions of some network elements included in the architecture and functions of the network elements.

(1) A terminal device may be a device that has a wireless transceiver function. The terminal device may be referred to as a terminal for short. The terminal device may be deployed on land, including an indoor device, an outdoor device, a handheld device, or a vehicle-mounted device; may be deployed on water (for example, on a ship); or may be deployed in the air (for example, on a plane, a balloon, or a satellite). The terminal device may be user equipment (user equipment, UE), and the UE includes a handheld device, a vehicle-mounted device, a wearable device, or a computing device that has a wireless communication function. For example, the UE may be a mobile phone (mobile phone), a tablet computer, or a computer having a wireless transceiver function. The terminal device may alternatively be a virtual reality (virtual reality, VR) terminal device, an augmented reality (augmented reality, AR) terminal device, a wireless terminal in industrial control, a wireless terminal in unmanned driving, a wireless terminal in telemedicine, a wireless terminal in a smart grid, a wireless terminal in a smart city (smart city), a wireless terminal in a smart home (smart home), and/or the like.

In embodiments of this application, an apparatus configured to implement a function of the terminal device may be a terminal device, or may be an apparatus, for example, a chip system, that can support the terminal device in implementing the function. The apparatus may be mounted in the terminal device. In embodiments of this application, the chip system may include a chip, or may include the chip and another discrete component. In the technical solutions provided in embodiments of this application, the technical solutions provided in embodiments of this application are described by using an example in which the terminal device is the apparatus for implementing the function of the terminal.

(2) An access network device may be a radio access network (radio access network, RAN) node that connects a terminal device to a wireless network. Currently, examples of some RAN nodes are: a next generation NodeB (next generation NodeB, gNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), or a wireless fidelity (wireless fidelity, Wi-Fi) access point (access point, AP).

(3) An access and mobility management function (access and mobility management function, AMF) network element is a core network element, and is mainly responsible for signaling processing, for example, functions such as access control, mobility management, and registration and deregistration. When the AMF network element provides a service for a session in UE, the AMF network element provides a control plane storage resource for the session, to store a session identifier, an SMF network element identifier associated with the session identifier, and the like. In this application, the AMF may alternatively be a mobility management entity (mobility management entity, MME).

(4) A task management function (session management function, SMF) network element is responsible for user plane network element selection, user plane network element redirection, internet protocol (Internet Protocol, IP) address allocation, session setup, modification, and release, and quality of service (Quality of Service, QoS) control. In this application, the SMF may alternatively be a serving gateway (serving gateway, S-GW).

(5) A user plane function (user plane function, UPF) network element is responsible for forwarding and receiving user data of a terminal device. The UPF network element may receive the user data from a data network (data network, DN), and transmit the user data to the terminal device through an access network device. Alternatively, the UPF network element may receive the user data from the terminal device through the access network device, and forward the user data to the data network. A transmission resource and a scheduling function, in the UPF network element, that serves the terminal device are managed and controlled by the SMF network element. In this application, the UPF may alternatively be a public data network gateway (public data network gateway, P-GW). In this application, functions of the SMF and the UPF may be integrated into a serving gateway or a public data network gateway. The SMF, the UPF, the S-GW, and the P-GW may be collectively referred to as data gateway devices, and interact with the AMF or the MME. In this way, interaction between the SMF and the UPF and interaction between the S-GW and the P-GW may be omitted. The data gateway device may buffer downlink data.

An interface between the UE and the AMF network element is referred to as an N1 interface, an interface between the AMF network element and the RAN network element is referred to as an N2 interface, an interface between the RAN device and the UPF network element may be referred to as an N3 interface, an interface between the SMF network element and the UPF network element is referred to as an N4 interface, an interface between the UPF network element and the DN is referred to as an N6 interface, an interface between the SMF network element and a PCF network element is referred to as an N7 interface, and an interface between the AMF network element and the SMF network element is referred to as an N11 interface.

A first network device, a second network device, a third network device, and a fourth network device in this application may be respectively the UPF network element, the RAN, the AMF, and the SMF shown in FIG. 2. Alternatively, the first network device, the second network device, the third network device, and the fourth network device may be network elements that have the functions of the foregoing UPF network element, RAN network element, AMF network element, and SMF network element in a future communication system.

For ease of description, an example in which the first network device, the second network device, the third network device, and the fourth network device are respectively the UPF network element, the RAN network element, the AMF network element, and the SMF network element in FIG. 2 is subsequently used for description in this application. Further, the AMF network element is referred to as an AMF for short, the SMF network element is referred to as an SMF for short, the UPF network element is referred to as a UPF for short, the terminal device is referred to as UE, and the access network device is referred to as a RAN for short. In other words, all AMFs described subsequently in this application may be replaced with mobility management network elements, all SMFs may be replaced with session management network elements, all UPFs may be replaced with user plane network elements, all UEs may be replaced with terminal devices, and all RANs may be replaced with access network devices.

It should be noted that the foregoing is merely an example, and is not intended to limit the first network device, the second network device, the third network device, and the fourth network device. For example, the first network device may alternatively be another network element that can receive downlink data of the terminal device or can send downlink data of the terminal device to the access network device. This is not limited in embodiments of this application. Alternatively, the UPF may be a protocol data unit (protocol data unit, PDU) session anchor (PDU session anchor, PSA) UPF, a downlink classifier user plane (downlink classifier UPF, DLCL UPF) network element, or the like. This is not limited in embodiments of this application.

The following describes the technical solutions in embodiments of this application with reference to specific embodiments.

Embodiment 1 (UPF-Drx)

Figure 3:
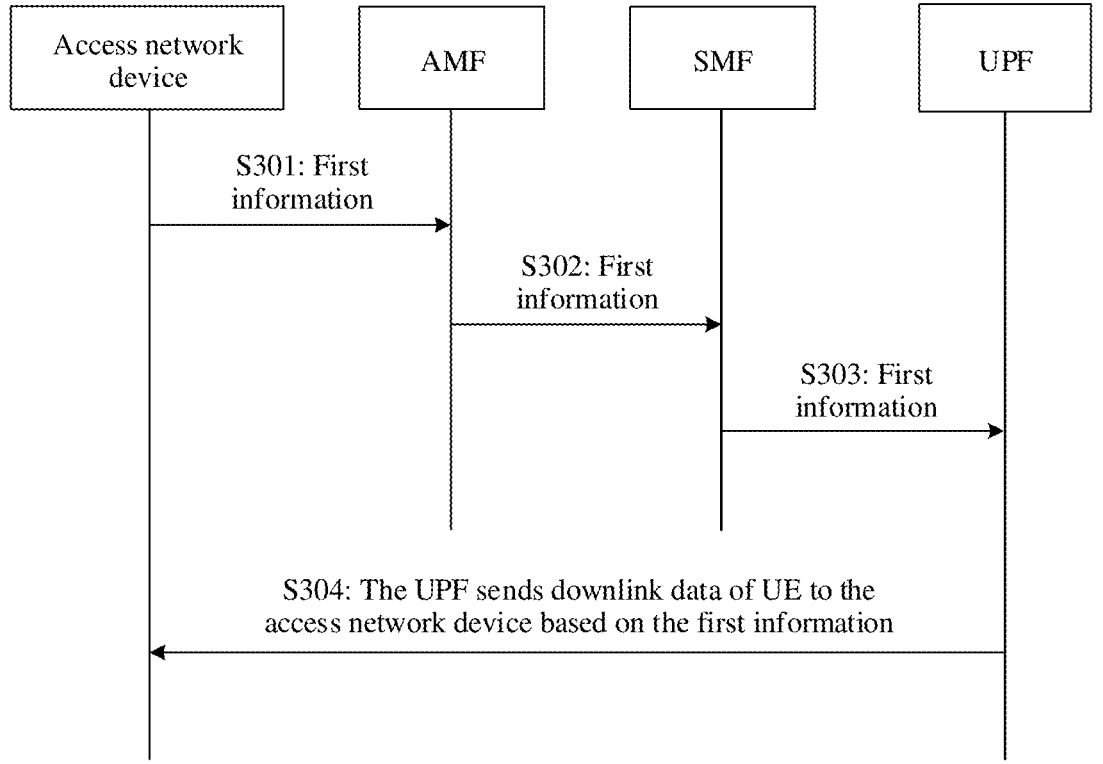
FIG. 3 is a schematic flowchart of a data transmission method according to an embodiment of this application.

FIG. 3 shows a data transmission method according to an embodiment of this application. The method may be applied to the network structure shown in FIG. 2. As shown in FIG. 3, the method may include the following procedure.

Step S301: An access network device sends first information to an AMF, where the first information is used by a UPF to determine a time point for sending downlink data of UE to the access network device. Correspondingly, the AMF receives the first information from the access network device.

Optionally, the first information may further include information about the UE, for example, an identifier of the UE, so that when receiving the downlink data of the UE, the UPF sends the downlink data to the access network device of the UE based on the first information corresponding to the identifier of the UE. It may be understood that, if the access network device configures same eDRX for different UEs, the first information may not include the information about the UE. If the first information may not include the information about the UE, the UE in this application may be any UE served by the access network device that sends the first information. If the access network device serves a plurality of UEs, steps shown in the data transmission method provided in this embodiment of this application are performed for each UE.

Step S302: The AMF sends the first information to an SMF, and correspondingly, the SMF receives the first information from the AMF.

Step S303: The SMF sends the first information to the UPF, and correspondingly, the UPF receives the first information from the SMF.

Step S304: The UPF sends the downlink data of the UE to the access network device based on the first information.

For example, the UPF receives the downlink data of the UE, determines a latest sending time point of the downlink data based on the first information, and sends the downlink data to the access network device in a preset duration before the latest sending time point. The latest sending time point may be understood as a deadline by which the UPF can store the downlink data. If the UPF sends the downlink data to the access network device at the latest sending time point, a paging occasion of the UE may just arrive when the access network device receives the downlink data. Therefore, a duration for storing the downlink data by the access network device is as short as possible. If the UPF sends the downlink data after the latest sending time point, the access network device may need to store the downlink data until the paging occasion of the UE arrives. Consequently, a duration for storing the downlink data of the UE by the access network device is excessively long. Specifically, the latest sending time point may be determined based on a wake-up time point of the terminal device. For example, the latest sending time point may be a wake-up time point of the UE after the UPF receives the downlink data of the UE, for example, a start time point of DRX (a PTW), an end time point of the PTW, any time point in the PTW, a start time point of any PO in the PTW, an end time point of any PO in the PTW, or any time point of any PO in the PTW. This is not limited in this embodiment of this application. The preset duration is a time period of a preset length before the latest sending time point. The preset duration may be preset, defined in a protocol, or preconfigured based on prior information. This is not limited in this embodiment of this application.

The following describes, with reference to specific examples, a procedure of sending the downlink data based on the first information.

Example 1: The First Information Includes an eDRX Cycle

The eDRX cycle may alternatively be a wake-up cycle or a discontinuous reception DRX cycle of the UE, or a sleep cycle of the UE. The following uses an example in which the first information includes the eDRX cycle for description.

In a possible implementation, the UPF may determine a third time point based on the eDRX cycle and a time point at which the first information is received, and the UPF sends the downlink data to the access network device before the third time point. The third time point is an eDRX cycle boundary or an eDRX cycle start time point after the UPF receives the downlink data.

Figure 4:
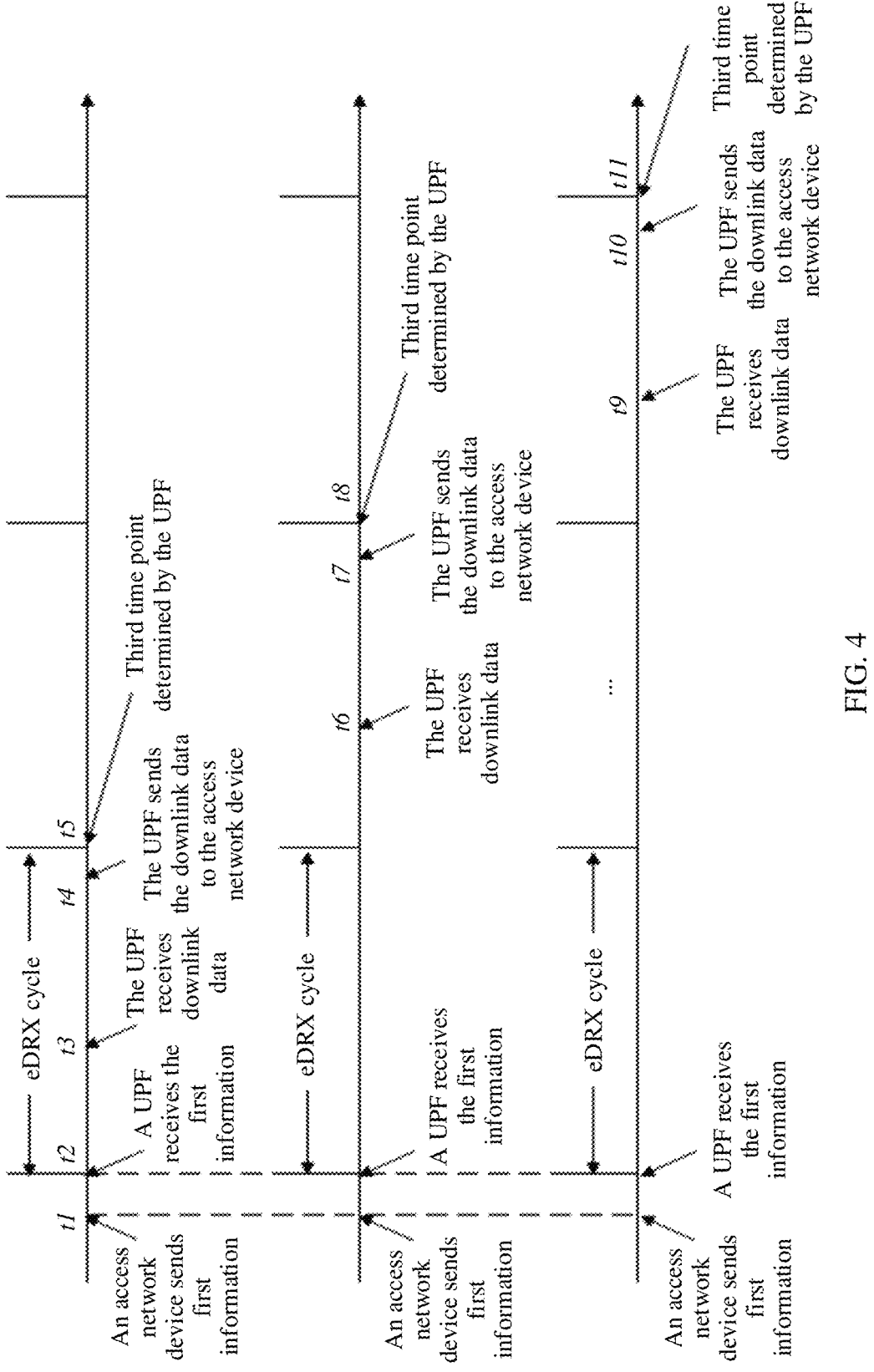
FIG. 4 is a schematic diagram of a method for determining a sending time point of downlink data based on first information according to an embodiment of this application.

As shown in FIG. 4, the access network device sends the first information at t1, and the UPF receives the first information at t2. If the UPF receives the downlink data at t3, the UPF determines a third time point, namely, t5, based on t2 and an eDRX cycle, and the UPF sends the downlink data to the access network device at t4 before t5. If the UPF receives the downlink data at t6, the UPF determines a third time point, namely, t8, based on t2 and an eDRX cycle, and the UPF sends the downlink data to the access network device at t7 before t8. If the UPF receives the downlink data at t9, the UPF determines a third time point, namely, t11, based on t2 and an eDRX cycle, and the UPF sends the downlink data to the access network device at t10 before t11.

For example, t5 may be understood as the latest sending time point, a duration of an interval between t5 and t4 may be understood as the preset duration, and the UPF may send the downlink data to the access network device at t4 before t5. Optionally, the UPF may alternatively send the downlink data to the access network device at any moment in t4 to t5. Details are not repeated below.

It should be noted that FIG. 4 is merely an example, and does not constitute a limitation on the time point at which the access network device sends the first information and the time point at which the UPF receives the first information in this embodiment of this application. In an implementation, t1 may be equal to t2.

Figure 5:
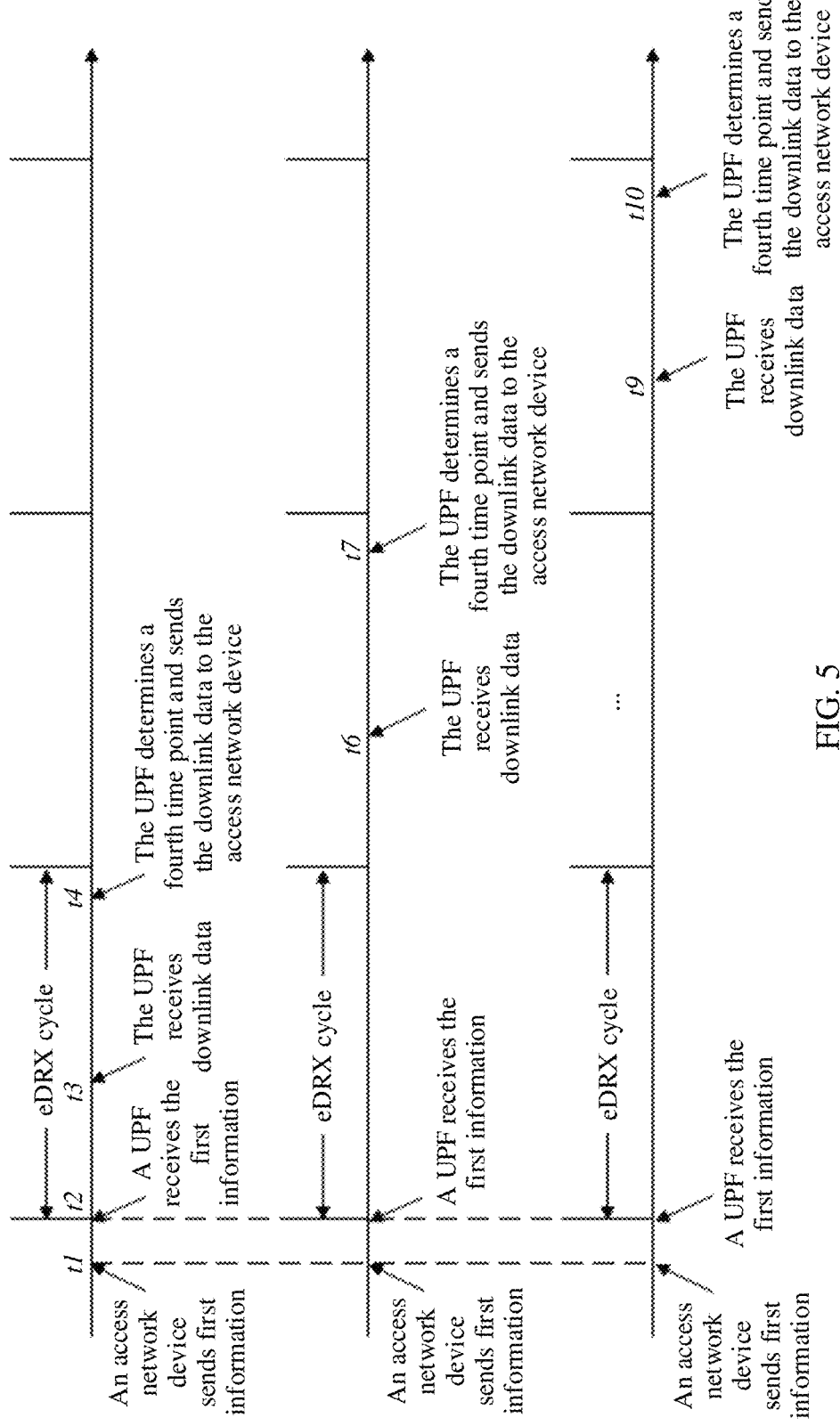
FIG. 5 is a schematic diagram of a method for determining a sending time point of downlink data based on first information according to an embodiment of this application.

In a possible implementation, the UPF may determine a fourth time point based on the eDRX cycle and a time point at which the first information is received, and the UPF sends the downlink data to the access network device at the fourth time point. The fourth time point is a time point just before (just before) an eDRX cycle boundary or an eDRX cycle start time point after the UPF receives the downlink data. As shown in FIG. 5, the access network device sends the first information at t1, and the UPF receives the first information at t2. If the UPF receives the downlink data at t3, the UPF determines a fourth time point, namely, t4, based on t2 and an eDRX cycle, and the UPF sends the downlink data to the access network device at t4. For example, the UPF determines a fourth time point based on t2, eDRX, and a timing advance for sending the downlink data. If the UPF receives the downlink data at t6, the UPF determines a fourth time point, namely, t7, based on t2 and an eDRX cycle, and the UPF sends the downlink data to the access network device at t7. If the UPF receives the downlink data at t9, the UPF determines a fourth time point, namely, t10, based on t2 and an eDRX cycle, and the UPF sends the downlink data to the access network device at t10.

It should be noted that FIG. 5 is merely an example, and does not constitute a limitation on the time point at which the access network device sends the first information and the time point at which the UPF receives the first information in this embodiment of this application. In an implementation, t1 may be equal to t2.

Figure 6:
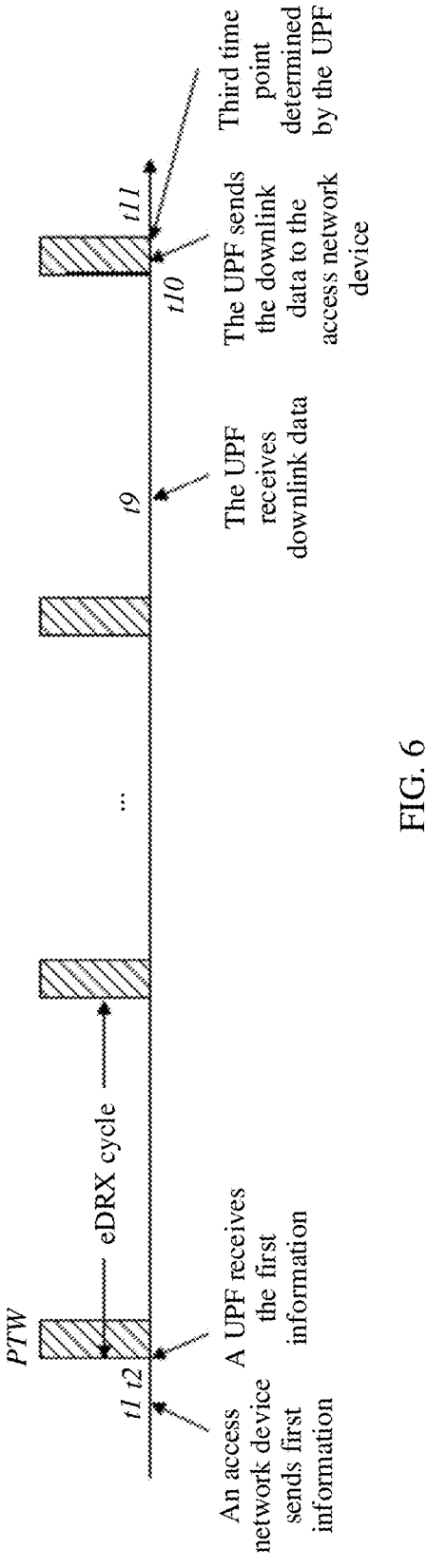
FIG. 6 is a schematic diagram of a method for determining a sending time point of downlink data based on first information according to an embodiment of this application.

Example 2: The First Information May Include an eDRX Cycle and a PTW Duration In a possible implementation, the UPF determines a time point at which the first information is received as a start time point of an eDRX cycle and a PTW. The UPF may determine a third time point based on the eDRX cycle, a PTW duration, and the time point at which the first information is received. The UPF sends the downlink data to the access network device before the third time point. For example, the UPF sends the downlink data to the access network device in a PTW before the third time point. The third time point is an end time point of the PTW after the UPF receives the downlink data. As shown in FIG. 6, the access network device sends the first information at t1, and the UPF receives the first information at t2. If the UPF receives the downlink data at t9, the UPF determines a third time point, namely, t11, based on t2, an eDRX cycle, and a PTW, and the UPF sends the downlink data to the access network device at t10 before t11.

It should be noted that FIG. 6 is merely an example, and does not constitute a limitation on the time point at which the access network device sends the first information and the time point at which the UPF receives the first information in this embodiment of this application. In an implementation, t1 may be equal to t2.

Figure 7:
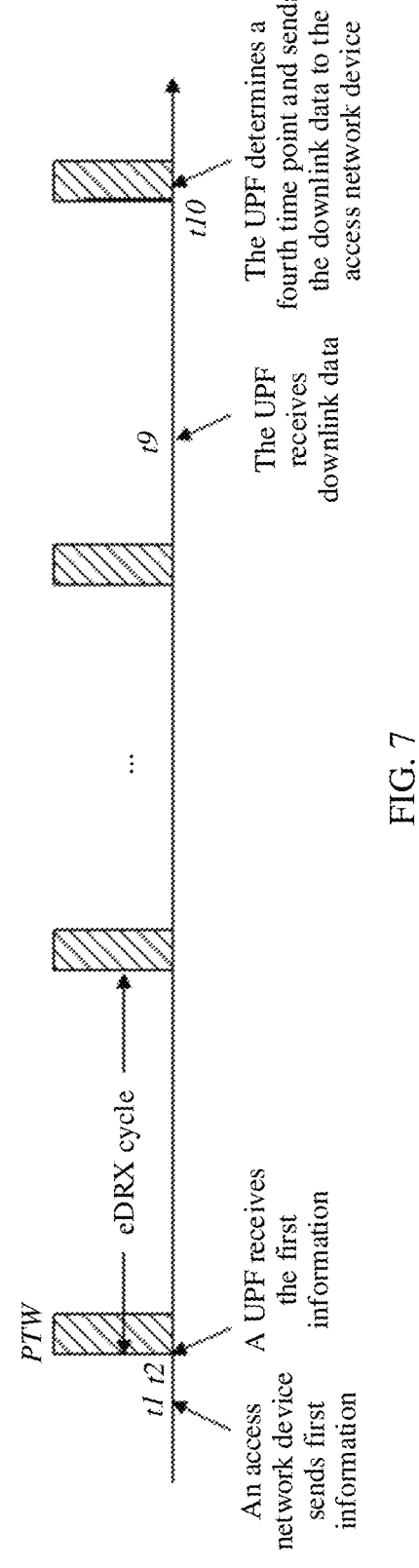
FIG. 7 is a schematic diagram of a method for determining a sending time point of downlink data based on first information according to an embodiment of this application.

In a possible implementation, the UPF determines a time point at which the first information is received as a start time point of an eDRX cycle and a PTW. The UPF may determine a fourth time point based on the eDRX cycle, a PTW duration, and the time point at which the first information is received. The UPF sends the downlink data to the access network device at the fourth time point. The fourth time point is a time point just before (just before) a PTW ends. For example, the fourth time point is a time point in the PTW. As shown in FIG. 7, the access network device sends the first information at t1, and the UPF receives the first information at t2. If the UPF receives the downlink data at t9, the UPF determines a fourth time point, namely, t10, based on t2, an eDRX cycle, and a PTW, and the UPF sends the downlink data to the access network device at t10.

It should be noted that FIG. 7 is merely an example, and does not constitute a limitation on the time point at which the access network device sends the first information and the time point at which the UPF receives the first information in this embodiment of this application. In an implementation, t1 may be equal to t2.

Figure 8:
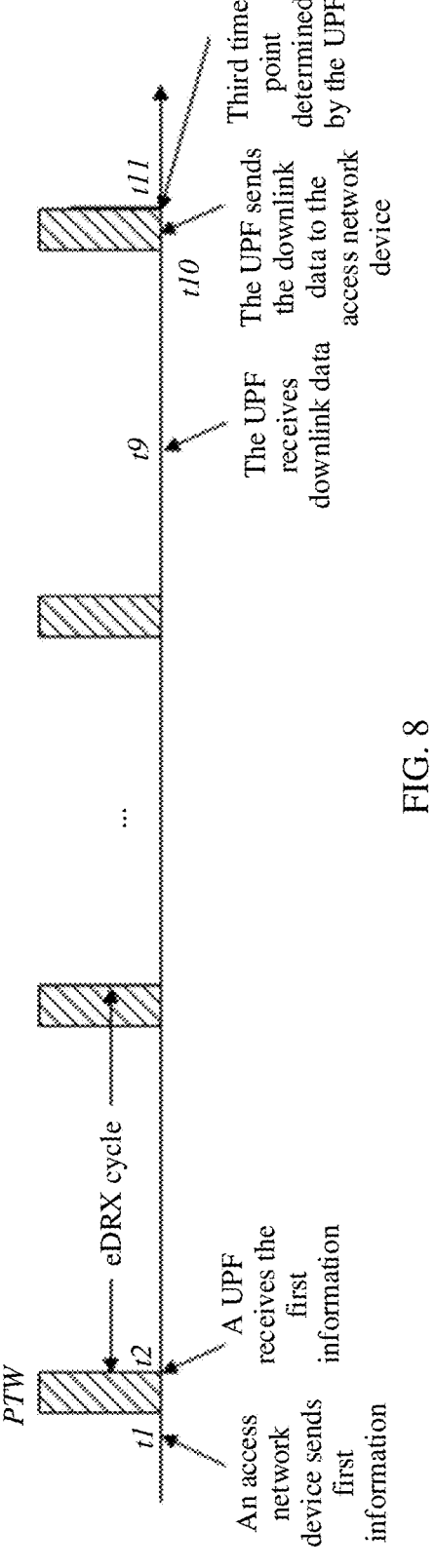
FIG. 8 is a schematic diagram of a method for determining a sending time point of downlink data based on first information according to an embodiment of this application.

In a possible implementation, the UPF determines a time point at which the first information is received as a start time point of an eDRX cycle and an end time point of a PTW. The UPF may determine a third time point based on the eDRX cycle, a PTW duration, and the time point at which the first information is received. The UPF sends the downlink data to the access network device before the third time point. For example, the UPF sends the downlink data to the access network device in a PTW before the third time point. The third time point is an end time point of the PTW. As shown in FIG. 8, the access network device sends the first information at t1, and the UPF receives the first information at t2. If the UPF receives the downlink data at t9, the UPF determines a third time point, namely, t11, based on t2, an eDRX cycle, and a PTW, and the UPF sends the downlink data to the access network device at t10 before t11.

It should be noted that FIG. 8 is merely an example, and does not constitute a limitation on the time point at which the access network device sends the first information and the time point at which the UPF receives the first information in this embodiment of this application. In an implementation, t1 may be equal to t2.

Figure 9:
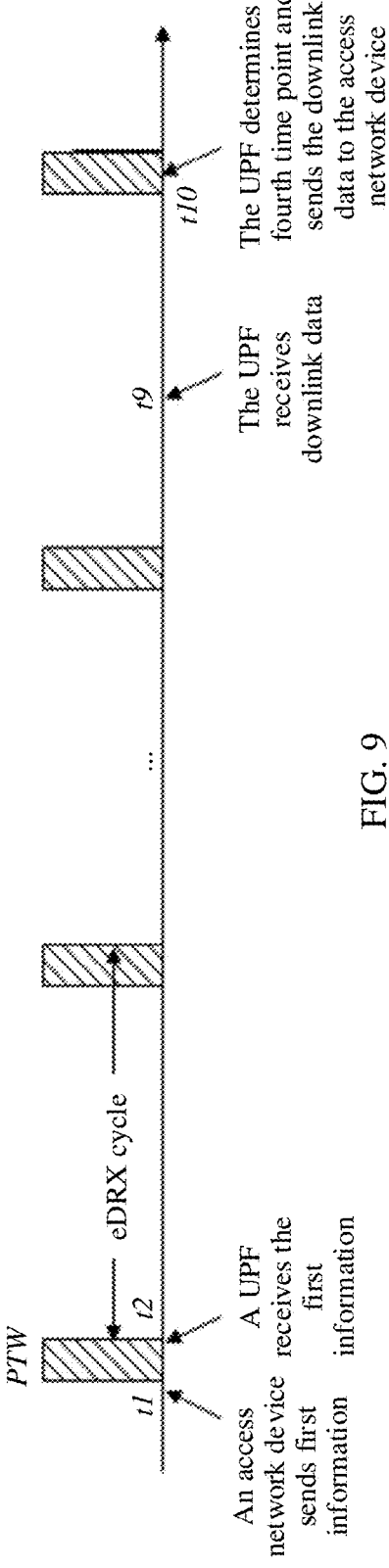
FIG. 9 is a schematic diagram of a method for determining a sending time point of downlink data based on first information according to an embodiment of this application.

In a possible implementation, the UPF determines a time point at which the first information is received as a start time point of an eDRX cycle and an end time point of a PTW. The UPF may determine a fourth time point based on the eDRX cycle, a PTW duration, and the time point at which the first information is received. The UPF sends the downlink data to the access network device at the fourth time point. The fourth time point is a time point before a PTW ends. For example, the fourth time point is in the PTW. As shown in FIG. 9, the access network device sends the first information at t1, and the UPF receives the first information at t2. If the UPF receives the downlink data at t9, the UPF determines a fourth time point, namely, t10, based on t2, an eDRX cycle, and a PTW, and the UPF sends the downlink data to the access network device at t10.

It should be noted that FIG. 9 is merely an example, and does not constitute a limitation on the time point at which the access network device sends the first information and the time point at which the UPF receives the first information in this embodiment of this application. In an implementation, t1 may be equal to t2.

Figure 10:
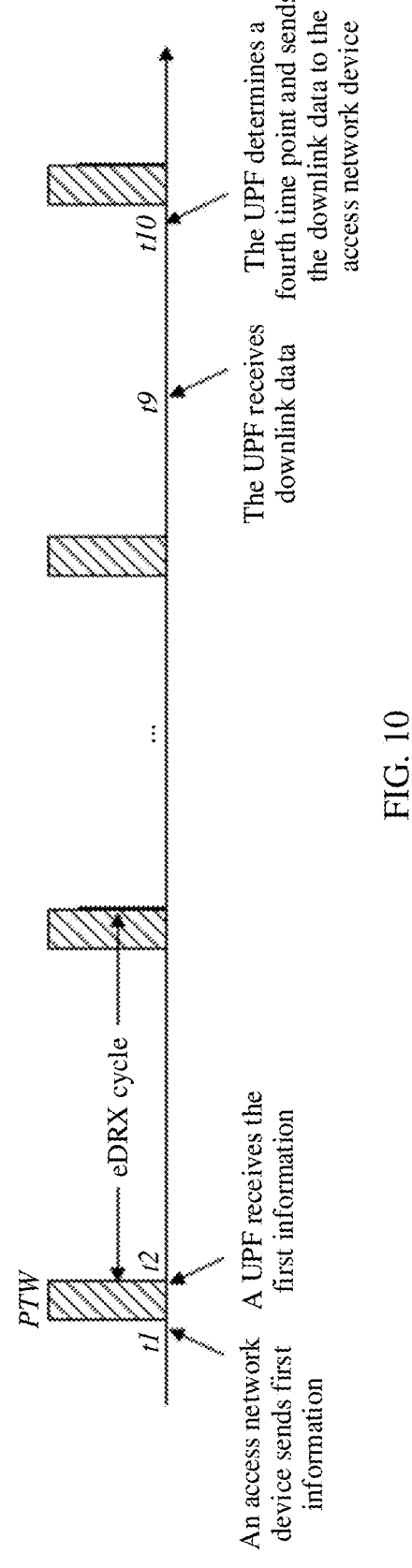
FIG. 10 is a schematic diagram of a method for determining a sending time point of downlink data based on first information according to an embodiment of this application.

In a possible implementation, the UPF determines a time point at which the first information is received as a start time point of an eDRX cycle and an end time point of a PTW. The UPF may determine a fourth time point based on the eDRX cycle, a PTW duration, and the time point at which the first information is received. The UPF sends the downlink data to the access network device at the fourth time point. The fourth time point is a time point before a PTW. As shown in FIG. 10, the access network device sends the first information at t1, and the UPF receives the first information at t2. If the UPF receives the downlink data at t9, the UPF determines a fourth time point, namely, t10, based on t2, an eDRX cycle, and a PTW, and the UPF sends the downlink data to the access network device at t10.

It should be noted that FIG. 10 is merely an example, and does not constitute a limitation on the time point at which the access network device sends the first information and the time point at which the UPF receives the first information in this embodiment of this application. In an implementation, t1 may be equal to t2.

Figure 11A:
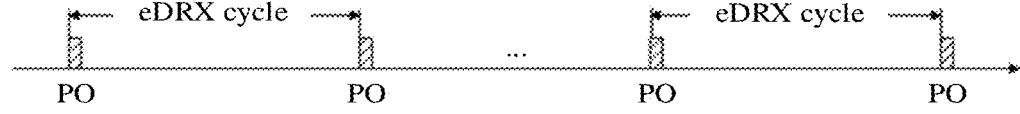
FIG. 11*a* is a schematic diagram of a method for determining a sending time point of downlink data based on first information according to an embodiment of this application.
Figure 11B:
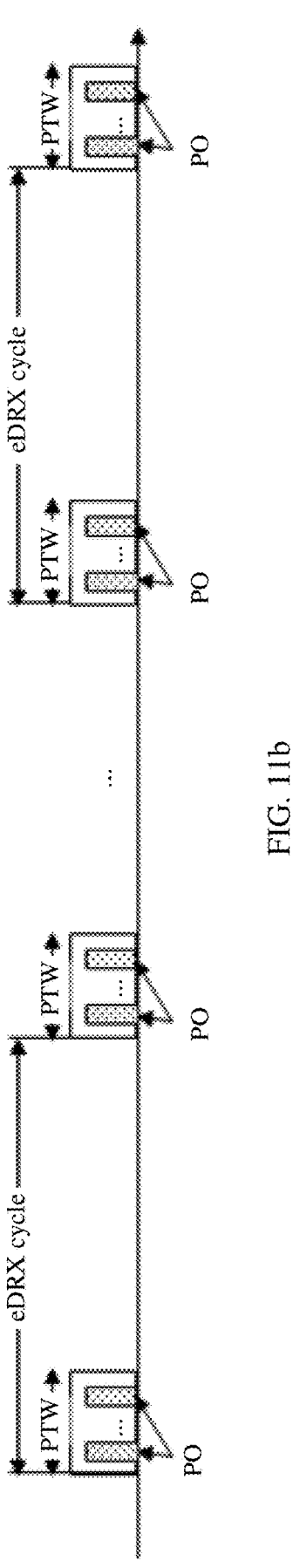
FIG. 11*b* is a schematic diagram of a method for determining a sending time point of downlink data based on first information according to an embodiment of this application.

In this application, the eDRX cycle may be a paging occasion (paging occasion, PO) cycle, as shown in FIG. 11*a*. Alternatively, the eDRX cycle is a paging time window (paging time window, PTW) cycle, where a PTW includes one or more POs, as shown in FIG. 11*b*.

Example 3: The First Information May Include an eDRX Cycle and a First Duration

In a possible implementation, the first duration indicates at least one of the following:

(1) a time interval between a time point at which the access network device sends the first information and a next eDRX cycle boundary;

(2) a time interval between the time point at which the access network device sends the first information and a next PTW; and (3) a time interval between the time point at which the access network device sends the first information and a next paging occasion PO.

Figure 12:
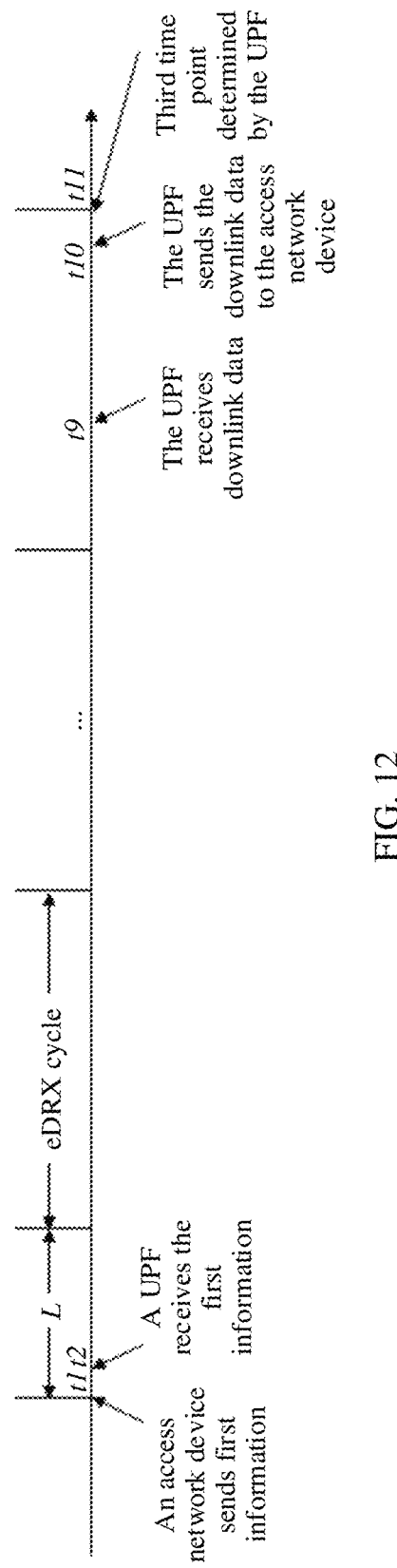
FIG. 12 is a schematic diagram of a method for determining a sending time point of downlink data based on first information according to an embodiment of this application.

The UPF determines a third time point based on the first duration and the eDRX cycle. The third time point is an eDRX cycle boundary after the UPF receives the downlink data. As shown in FIG. 12, the access network device sends the first information at t1, the UPF receives the first information at t2, the UPF receives the downlink data at t9, the UPF determines t1 based on t2 and a transmission delay (a time difference between t1 and t2) of the first information, and then the UPF determines an eDRX cycle boundary based on a first duration L, and determines a third time point t11 based on the determined eDRX cycle boundary and an eDRX cycle. For example, if t1 is equal to t2, the UPF directly determines the third time point t11 based on t1, L, and the eDRX cycle. The UPF sends the downlink data to the access network device at t10 before the third time point.

Figure 13:
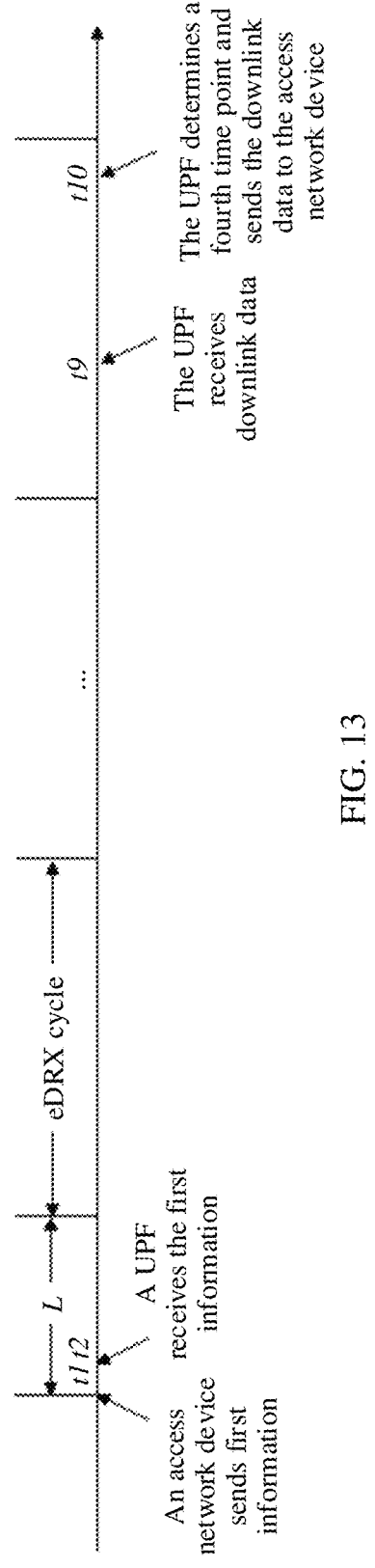
FIG. 13 is a schematic diagram of a method for determining a sending time point of downlink data based on first information according to an embodiment of this application.

In a possible implementation, the first duration indicates the time interval between the time point at which the access network device sends the first information and the next eDRX cycle boundary. The UPF determines a fourth time point based on the first duration and the eDRX cycle. The fourth time point is a time point before an eDRX cycle boundary after the UPF receives the downlink data. As shown in FIG. 13, the access network device sends the first information at t1, the UPF receives the first information at t2, the UPF receives the downlink data at t9, the UPF determines t1 based on t2 and a transmission delay of the first information, and then the UPF determines an eDRX cycle boundary based on t1 and a first duration L, and determines a fourth time point, namely, t10, based on the determined eDRX cycle boundary and an eDRX cycle. For example, if t1 is equal to t2, the UPF directly determines the fourth time point t10 based on t1, L, and the eDRX cycle. The UPF sends the downlink data to the access network device at the fourth time point t10.

In the foregoing manner, the UPF sends the downlink data of the UE to the access network device based on the first information, so that the downlink data of the UE can be sent to the access network device just before (just before) the UE wakes up. Therefore, storage burden of the access network device can be effectively relieved.

Example 3: The First Information Includes Eighth Indication Information

Specifically, the eighth indication information may indicate to suspend sending of the downlink data to the UE.

After receiving the eighth indication information, the UPF suspends sending of the downlink data to the UE.

Example 4: The First Information Includes Eighth Indication Information and a Second Duration After receiving the eighth indication information, the UPF suspends sending of the downlink data to the UE, where a suspension duration is the second duration. If the UPR buffers the downlink data of the UE, the UPR may send the buffered downlink data to the UE after the second duration is suspended.

Example 5: The First Information Includes Ninth Indication Information

Specifically, the ninth indication information may indicate to resume sending the downlink data to the UE.

After receiving the ninth indication information, the UPF resumes sending the downlink data to the UE. For example, the UPF first receives the eighth indication information, and the UPF suspends sending of the downlink data to the UE. Then, the UPF receives the ninth indication information, and the UPF resumes sending the downlink data to the UE. For another example, the UPF first receives the eighth indication information and the second duration, and the UPF suspends sending of the downlink data to the UE, where the suspension duration is the second duration. If the UPF receives the ninth indication information in the second duration, the UPF may send the downlink data to the UE after receiving the ninth indication information.

Embodiment 2 (SMF-Drx)

Figure 14:
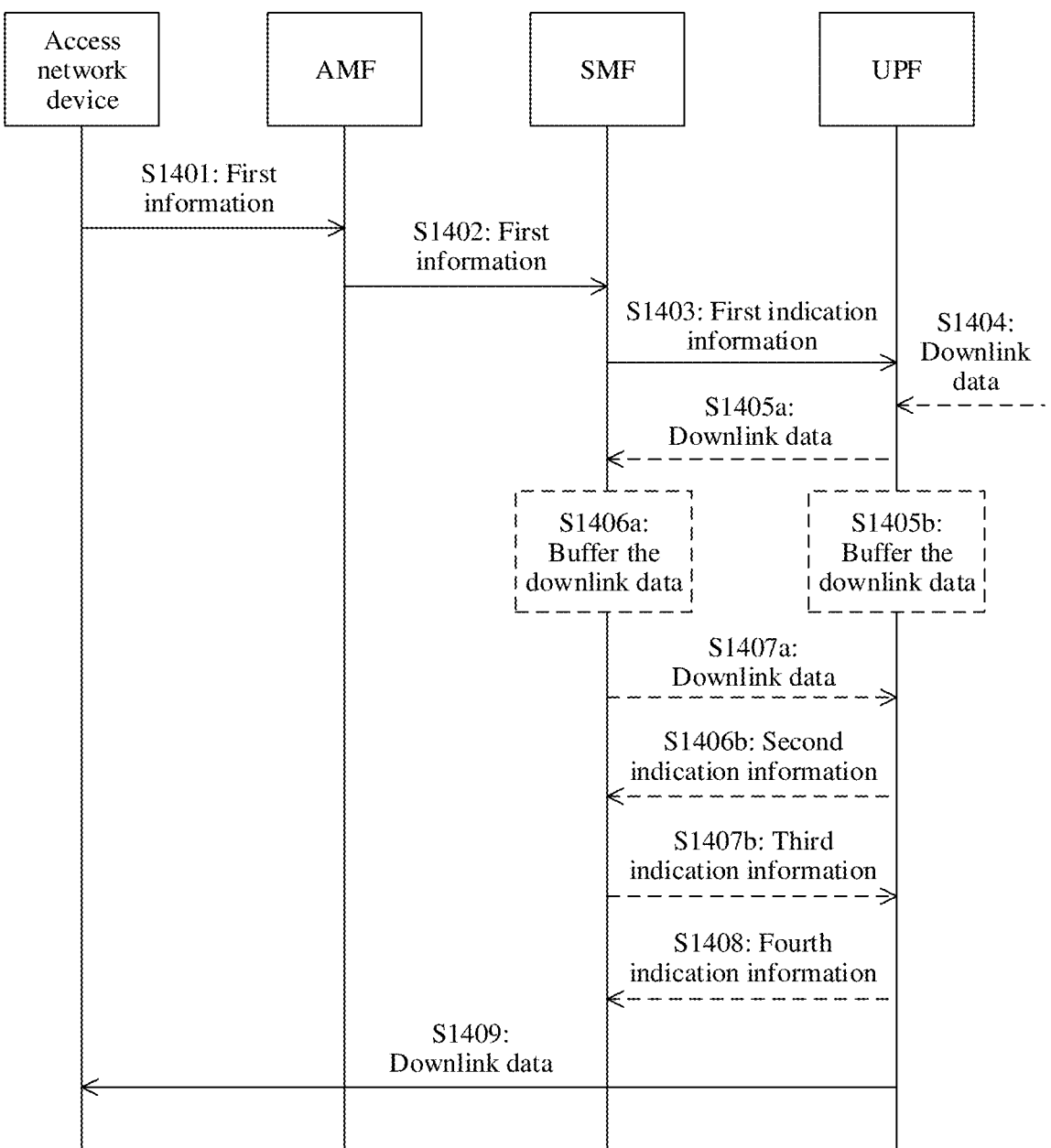
FIG. 14 is a schematic flowchart of a data transmission method according to an embodiment of this application.

FIG. 14 shows a data transmission method according to an embodiment of this application. The method may be applied to the system architecture shown in FIG. 2. As shown in FIG. 14, the method may include the following procedure.

Step S1401: An access network device sends first information to an AMF, where the first information is used by an SMF to determine a time point that is for sending downlink data of UE and that is indicated to a UPF. Correspondingly, the AMF receives the first information from the access network device.

For example, the first information may be the first information in FIG. 4 to FIG. 13. After receiving the first information, the SMF may perform the procedure steps of the UPF in the foregoing embodiment to determine the time point at which the SMF sends the downlink data of the UE. Details are not repeated in the following embodiments.

Step S1402: The AMF sends the first information to the SMF, and correspondingly, the SMF receives the first information from the AMF.

Step S1403: The SMF sends first indication information to the UPF, where the first indication information indicates the following a1, a2, or a3 to the UPF.

a1: When receiving the downlink data of the UE:
  (1) buffer (buffer) the downlink data of the UE, and
  (2) send second indication information to the SMF, where
    the second indication information indicates that the
    UPF has the downlink data of the UE.
  For example, that the UPF has the downlink data of the UE may be that the UPF buffers the downlink data, or may be that the UPF (just) receives the downlink data.
  a2: Buffer the downlink data of the UE when receiving the
    downlink data of the UE.
  a3: Send the downlink data to the SMF when receiving the
    downlink data of the UE.

"Buffer" in embodiments of this application may be understood as "temporarily store", and "buffer" described in this specification may be alternatively replaced with "store".

In the foregoing design, the first indication information may indicate the UPF to perform different operations, so that a data transmission manner in this embodiment of this application is more flexible. For example, the first indication information indicates a1. When receiving the downlink data of the UE, the UPF does not directly send the downlink data to the access network device, and the UPF may buffer the downlink data, to reduce storage burden of the access network device. In addition, the UPF may determine the sending time point of the downlink data, and the UPF sends the downlink data to the access network device at the determined sending time point. This reduces a delay in receiving the downlink data by the terminal device while reducing the storage burden of the access network device. The UPF may further notify, by using the second indication information, the SMF that the UPF buffers the downlink data of the UE. After receiving the second indication information, the SMF determines, for the UPF, the sending time point of the downlink data, to reduce calculation overheads of the UPF. For another example, the first indication information indicates a3. The UPF may further send the received downlink data to the SMF, and the SMF buffers the downlink data, to share storage burden of the access network device, and can further share storage burden of the UPF.

In a possible implementation, step S1403 may be performed before step S1401 or S1402.

Step S1404: The UPF receives the downlink data of the UE. This step is an optional step.

First Optional Implementation:

If the UPF receives the downlink data in step S1404 and the first indication information indicates a1, steps S1405*b*, S1406*b*, S1407*b*, and S1409 are performed.

Step S1405*b*: The UPF buffers the downlink data.

Step S1406*b*: The UPF sends the second indication information to the SMF when receiving the downlink data.

Step S1407*b*: If the SMF receives the second indication information, the SMF sends third indication information to the UPF based on the second indication information and the first information, where the third indication information indicates the UPF to send the downlink data.

If the SMF does not receive the second indication information, the SMF sends the third indication information to the UPF based on the first information.

Step S1409: The UPF sends the downlink data of the UE to the access network device based on the third indication information.

In a possible implementation, when the UPF receives the third indication information, the UPF sends the downlink data of the UE to the access network device.

In conclusion, when the UPF receives the downlink data, the UPF buffers the downlink data, and the UPF sends the second indication information to the SMF, to indicate that the UPF buffers the downlink data. The SMF determines, based on the first information received in step S1402, the time point for sending the downlink data of the UE by the UPF, and notifies the UPF by using the third indication information. The UPF sends the buffered downlink data based on the third indication information.

Second Optional Implementation:

If the UPF receives the downlink data in step S1404 and the first indication information indicates a2, steps S1405*b*, S1407*b*, and S1409 are performed.

Third Optional Implementation:

If the UPF receives the downlink data in step S1404 and the first indication information indicates a3, steps S1405*a*, S1406*a*, S1407*a*, and S1409 are performed.

Step S1405*a*: The UPF sends the downlink data to the SMF.

Step S1406*a*: The SMF buffers the downlink data.

Step S1407*a*: The SMF sends the downlink data to the UPF based on the first information.

Fourth Optional Implementation:

If the UPF does not receive the downlink data in step S1404 (or step S1404 is not performed in this embodiment) and the first indication information indicates a2, steps S1407*b* and S1408 are performed.

Step S1408: The UPF sends fourth indication information to the AMF based on the third indication information, where the fourth indication information indicates that the downlink data is not received.

For example, the SMF determines, based on the first information, the time point that can be used by the UPF to send the downlink data of the UE. Herein, it is assumed that the SMF does not know whether the UPF buffers the downlink data. The SMF may periodically send the third indication information to the UPF, to notify, when the UPF receives or buffers the downlink data, the UPF to send the downlink data when the UPF receives the third indication information. When the UPF receives the third indication information sent by the SMF, if the UPF does not buffer the downlink data, the UPF may send the fourth indication information to the SMF, and the SMF determines, based on the fourth indication information, whether to send the third indication information to the UPF again.

It should be noted that, for ease of description, information with a same name in embodiments listed in this application is not necessarily same information, and a function of the information is limited by respective embodiments.

Embodiment 3 (AMF-Drx)

Figure 15:
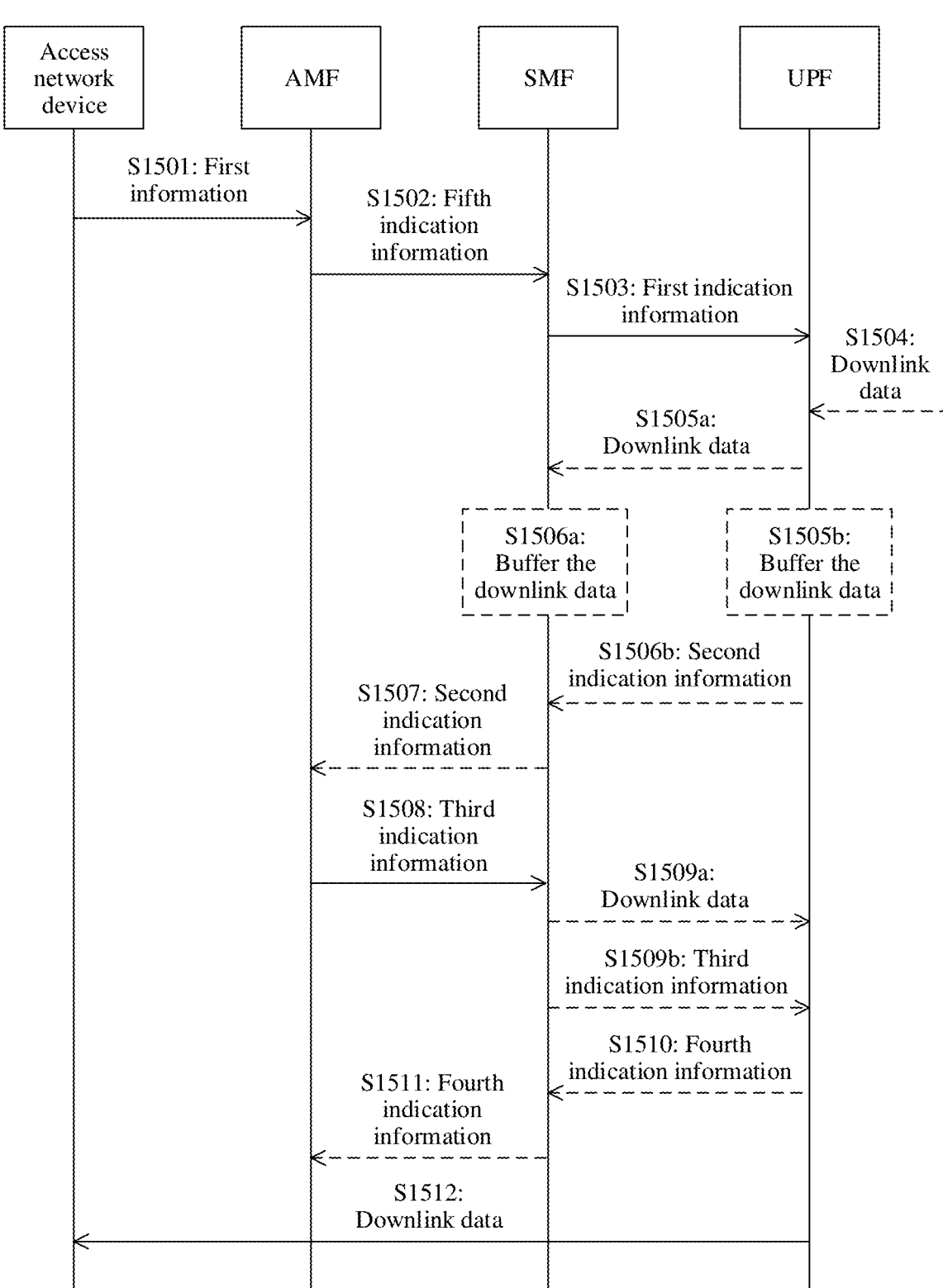
FIG. 15 is a schematic flowchart of a data transmission method according to an embodiment of this application.

FIG. 15 shows a data transmission method according to an embodiment of this application. The method may be applied to the system architecture shown in FIG. 2. As shown in FIG. 15, the method may include the following procedure.

Step S1501: An access network device sends first information to an AMF, where the first information is used by the AMF to determine a time point that is for sending downlink data of UE and that is indicated to an SMF or a UPF. Correspondingly, the AMF receives the first information from the access network device.

Step S1502: The AMF sends fifth indication information to the SMF based on the first information, where the fifth indication information indicates the following a1 or a2 to the SMF.

a1: When Receiving the Downlink Data of the UE:

(1) buffer the downlink data of the UE; and (2) send second indication information, where the second indication information indicates that the downlink data of the UE exists.

a2: Buffer the Downlink Data of the UE when Receiving the Downlink Data of the UE.

Step S1503: The SMF sends first indication information to the UPF, where the first indication information indicates a1, a2, or a3 to the UPF.

a3: Send the Downlink Data to the SMF when Receiving the Downlink Data.

Specifically, if the fifth indication information indicates a1, the fifth indication information indicates the SMF to send the second indication information to the AMF. When the first indication information indicates a1, the first indication information indicates the UPF to send the second indication information to the SMF. Details are not repeated below.

In the foregoing design, the fifth indication information indicates the SMF to perform different operations, and the first indication information indicates the UPF to perform different operations, to reduce a delay in receiving the downlink data by the terminal device while reducing storage burden of the access network device, so that a data transmission manner in this embodiment of this application is more flexible.

In a possible implementation, step S1503 may be performed before step S1501 or S1502.

Step S1504: The UPF receives the downlink data of the UE. This step is an optional step.

First Optional Implementation:

If the UPF receives the downlink data in step S1504, the fifth indication information indicates a1, and the first indication information indicates a1, steps S1505*b*, S1506*b*, S1507, S1508, S1509*b*, and S1512 are performed.

Step S1505*b*: The UPF buffers the downlink data.

Step S1506*b*: The UPF sends the second indication information to the SMF when receiving the downlink data.

Step S1507: The SMF sends the second indication information to the AMF.

Step S1508: If the AMF receives the second indication information, the AMF sends third indication information to the SMF based on the second indication information and the first information, where the third indication information indicates to send the downlink data.

If the AMF does not receive the second indication information, the AMF sends the third indication information to the SMF based on the first information.

Step S1509b: The SMF sends the third indication information to the UPF.

Step S1512: The UPF sends the downlink data to the access network device based on the third indication information.

Second Optional Implementation:

If the UPF receives the downlink data in step S1504, the fifth indication information indicates a1, and the first indication information indicates a3, steps S1505a, S1506a, S1507, S1508, S1509a, and S1512 are performed.

Step S1505a: When receiving the downlink data, the UPF sends the downlink data to the SMF based on the first indication information.

Step S1506a: The SMF buffers the downlink data.

Step S1509a: The SMF sends the downlink data to the UPF based on the third indication information.

Other steps are the same as corresponding steps in the first optional implementation.

Third Optional Implementation:

If the UPF receives the downlink data in step S1504, the fifth indication information indicates a2, and the first indication information indicates a1, steps S1505b, S1506b, S1508, S1509b, and S1512 are performed.

Fourth Optional Implementation:

If the UPF receives the downlink data in step S1504, the fifth indication information indicates a2, and the first indication information indicates a2, steps S1505b, S1508, S1509b, and S1512 are performed.

Fifth Optional Implementation:

If the UPF receives the downlink data in step S1504, the fifth indication information indicates a2, and the first indication information indicates a3, steps S1505a, S1506a, S1508, S1509a, and S1512 are performed.

Sixth Optional Implementation:

If the UPF does not receive the downlink data in step S1504 (or step S1504 is not performed in this embodiment), the fifth indication information indicates a2, and the first indication information indicates a2, steps S1508, S1509b, S1510, and S1511 are performed.

Step S1510: The UPF sends fourth indication information to the SMF, where the fourth indication information indicates that the downlink data is not received.

Step S1511: The SMF sends the fourth indication information to the AMF.

Seventh Optional Implementation:

If the UPF does not receive the downlink data in step S1504 (or step S1504 is not performed in this embodiment), the fifth indication information indicates a2, and the first indication information indicates a3, steps S1508 and S1511 are performed.

As described above, when the first indication information indicates a3, the first indication information indicates the UPF to send the downlink data to the SMF for buffering. Therefore, the AMF may send the third indication information to the SMF without determining whether the SMF buffers the downlink data, to indicate the time point that can be used for sending the buffered downlink data to the UPF and that is indicated to the SMF. Step S1508 may be performed once, or step S1508 may be periodically performed. The SMF may send the fourth indication information to the AMF when the SMF does not buffer the downlink data.

Embodiment 4 (RAN-Drx)

Figure 16:
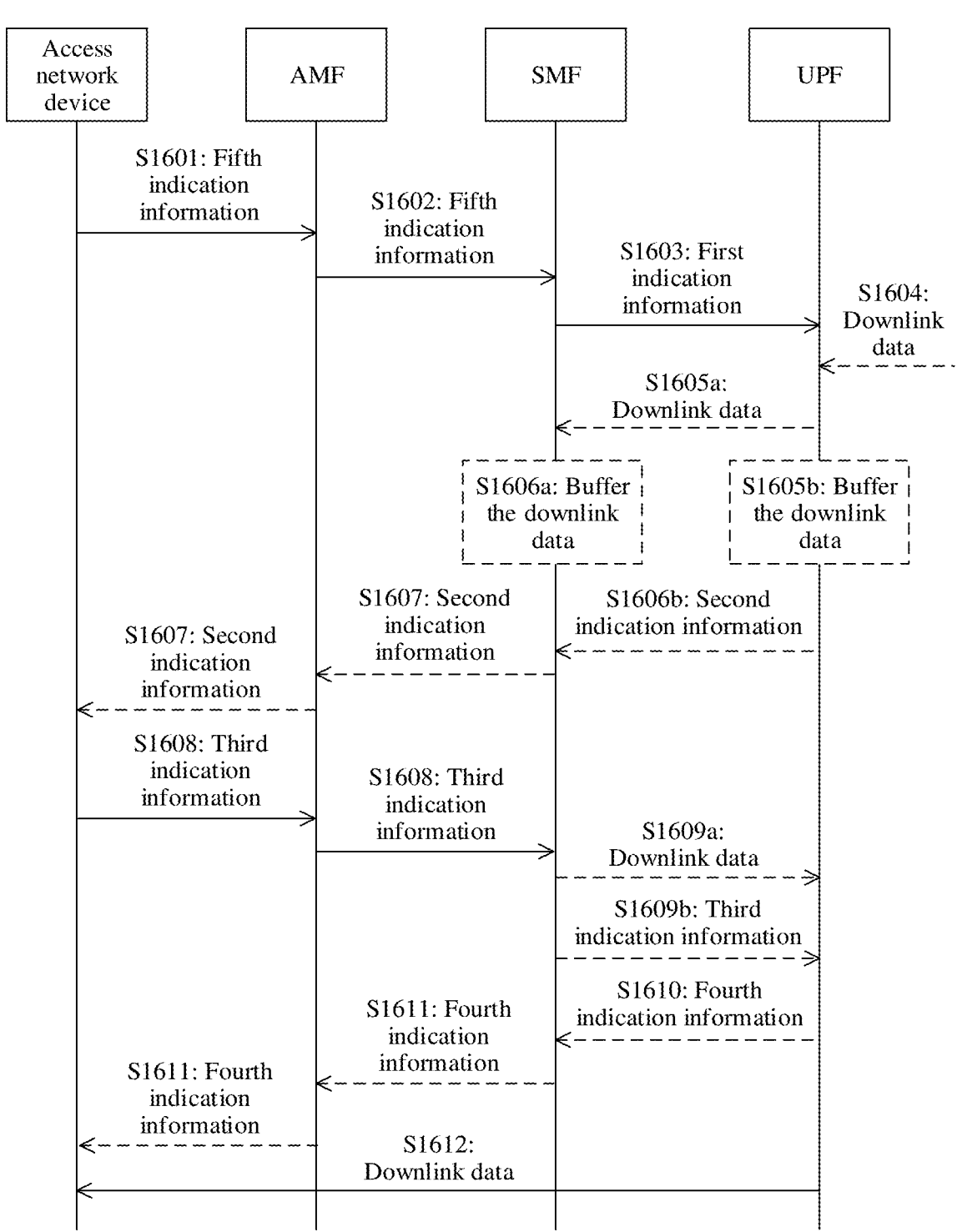
FIG. 16 is a schematic flowchart of another data transmission method according to an embodiment of this application.

FIG. 16 shows a data transmission method according to an embodiment of this application. The method may be applied to the system architecture shown in FIG. 2. In this embodiment, an access network device determines, based on first information, a time point for sending downlink data. As shown in FIG. 16, the method may include the following procedure.

Step S1601: The access network device sends fifth indication information to an AMF.

Step S1602: The AMF sends the fifth indication information to an SMF, where the fifth indication information indicates the following a1 or a2 to the SMF.

a1: When Receiving the Downlink Data of UE:

(1) buffer the downlink data of the UE; and (2) send second indication information, where the second indication information indicates that the downlink data of the UE exists.

a2: Buffer the Downlink Data of the UE when Receiving the Downlink Data of the UE.

Step S1603: The SMF sends first indication information to a UPF, where the first indication information indicates a1, a2, or a3 to the UPF.

a3: Send the Downlink Data to the SMF when Receiving the Downlink Data.

In a possible implementation, step S1603 may be performed before step S1601 or S1602.

Step S1604: The UPF receives the downlink data of the UE. This step is an optional step.

First Optional Implementation:

If the UPF receives the downlink data in step S1604, the fifth indication information indicates a1, and the first indication information indicates a1, steps S16056, S16066, S1607, S1608, S16096, and S1612 are performed.

Step S16056: The UPF buffers the downlink data.

Step S16066: The UPF sends the second indication information to the SMF when receiving the downlink data.

Step S1607: The SMF sends the second indication information to the AMF, and the AMF sends the second indication information to the access network device.

Step S1608: If the access network device receives the second indication information, the access network device sends third indication information to the AMF based on the second indication information and the first information, and the AMF sends the third indication information to the SMF, where the third indication information indicates to send the downlink data.

Step S1609b: The SMF sends the third indication information to the UPF.

Step S1612: The UPF sends the downlink data to the access network device based on the third indication information.

Second Optional Implementation:

If the UPF receives the downlink data in step S1604, the fifth indication information indicates a1, and the first indication information indicates a3, steps S1605a, S1606a, S1607, S1608, S1609a, and S1612 are performed.

Step S1605a: When receiving the downlink data, the UPF sends the downlink data to the SMF based on the first indication information.

Step S1606a: The SMF buffers the downlink data.

Step S1609a: The SMF sends the downlink data to the UPF based on the third indication information.

Other steps are the same as corresponding steps in the first optional implementation.

Third Optional Implementation:

If the UPF receives the downlink data in step S1604, the fifth indication information indicates a2, and the first indication information indicates a1, steps S1605b, S1606b, S1608, S1609b, and S1612 are performed.

Fourth Optional Implementation:

If the UPF receives the downlink data in step S1604, the fifth indication information indicates a2, and the first indication information indicates a2, steps S1605b, S1608, S1609b, and S1612 are performed.

Fifth Optional Implementation:

If the UPF receives the downlink data in step S1604, the fifth indication information indicates a2, and the first indication information indicates a3, steps S1605a, S1606a, S1607, S1608, S1609a, and S1612 are performed.

Sixth Optional Implementation:

If the UPF does not receive the downlink data in step S1604 (or step S1604 is not performed in this embodiment), the fifth indication information indicates a2, and the first indication information indicates a2, steps S1608, S1609b, S1610, and S1611 are performed.

Step S1610: The UPF sends fourth indication information to the SMF, where the fourth indication information indicates that the downlink data is not received.

Step S1611: The SMF sends the fourth indication information to the AMF, and the AMF sends the fourth indication information to the access network device.

Seventh Optional Implementation:

If the UPF does not receive the downlink data in step S1604 (or step S1604 is not performed in this embodiment), the fifth indication information indicates a2, and the first indication information indicates a3, steps S1608 and S1611 are performed.

Embodiment 5 (RNAU)

Figure 17:
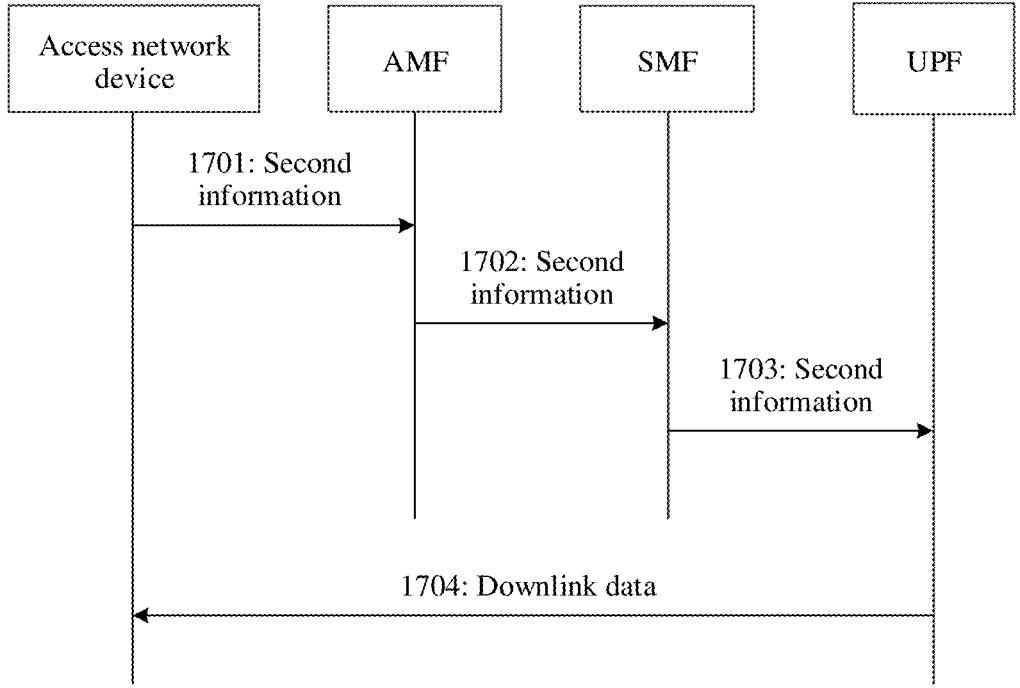
FIG. 17 is a schematic flowchart of another data transmission method according to an embodiment of this application.

FIG. 17 shows another data transmission method according to an embodiment of this application. The method may be applied to the system architecture shown in FIG. 2. The method may be independently applied. Alternatively, the method may be applied in combination with the foregoing embodiment. For example, the method is performed after the following step:

(1) step S301, S302, or S303 in Embodiment 1;

(2) step S1401, S1402, S1403, S1404, S1405a, S1406a, or S1405b in Embodiment 2;

(3) step S1501, S1502, S1503, S1504, S1505a, S1506a, or S1505b in Embodiment 3; or (4) step S1601, S1602, S1603, S1604, S1605a, S1606a, or S1605b in Embodiment 4.

As shown in FIG. 17, the method may include the following procedure.

Step S1701: An access network device sends second information to an AMF, where the second information indicates, to a UPF, that UE is reachable. Correspondingly, the AMF receives the second information from the access network device.

"Reachable" herein means that the terminal device can currently receive downlink data from a network side. For example, the terminal device is in an RRC connected mode, or the terminal device requests to enter the RRC connected mode.

Step S1702: The AMF sends the second information to an SMF, and correspondingly, the SMF receives the second information from the AMF.

Step S1703: The SMF sends the second information to the UPF, and correspondingly, the UPF receives the second information from the SMF.

Step S1704: The UPF sends downlink data of the UE to the access network device based on the second information.

For example, before receiving the second information, the UPF stores (or buffers) the downlink data of the UE. After receiving the second information, the UPF determines that the UE is reachable, and sends the buffered downlink data to the access network device of the UE. For another example, if the UPF buffers the downlink data of the UE, when the UPF receives the second information, the UPF may send second indication information to the SMF, where the second indication information indicates that the downlink data of the UE exists. If the UPF does not buffer the downlink data of the UE, when receiving the second information, the UPF may send fourth indication information to the SMF, where the fourth indication information indicates that there is no downlink data of the UE or indicates that the UE may be released.

Figure 18:
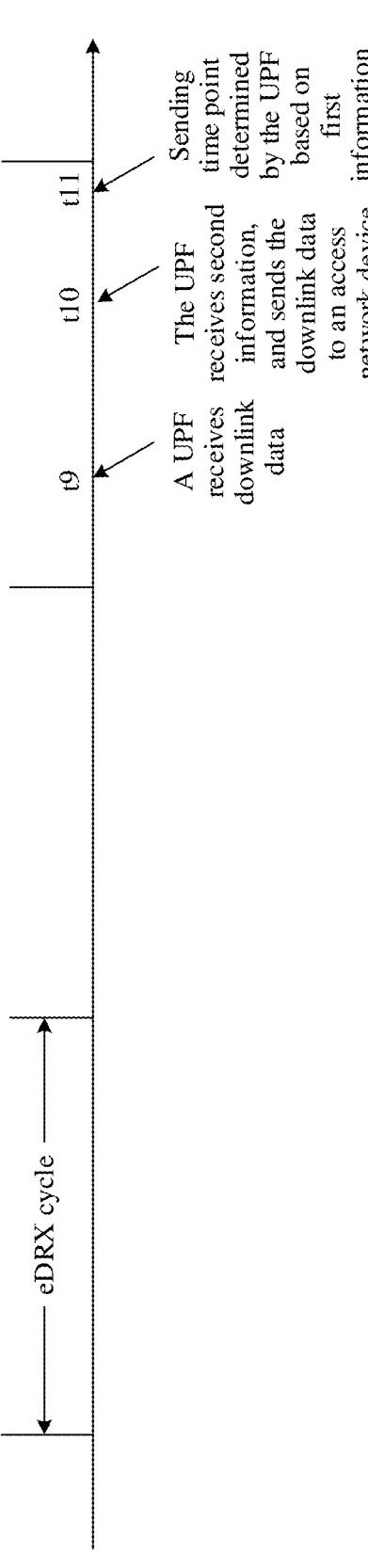
FIG. 18 is a schematic diagram of a method for determining a sending time point of downlink data based on first information and second information according to an embodiment of this application.

It should be noted that embodiments provided in this application may be used separately, or may be used in combination with each other. For example, some steps in Embodiment 1 are combined with some steps in Embodiment 2 to form a new embodiment, and all these fall in the protection scope of this application. For another example, specifically, (in step S301 in Embodiment 1) the access network device may send the first information to the AMF, and the AMF and the SMF send the first information to the UPF. When receiving the downlink data of the UE, the UPF determines a sending time point of the downlink data based on the first information. If the UPF receives the second information in a process of waiting for the sending time point (steps S1701, S1702, and S1703 in Embodiment 5), the UPF determines, based on the second information, that the UE to which the to-be-delivered downlink data belongs is reachable, and (step S1704 in Embodiment 5) the UPF sends the downlink data to the access network device. As shown in FIG. 18, the UPF receives the downlink data of the UE at t9, and determines, based on the first information, that the sending time point of the downlink data is t11. If the UPF receives the second information at t10, the UPF sends the downlink data to the access network device when determining, based on the second information, that the UE is reachable. In a possible implementation, the UPF sends the downlink data to the access network device before t10 or t11.

In the foregoing manner, flexibility of sending the downlink data of the UE by the UPF to the access network device is improved, and a delay in receiving the downlink data by the terminal device is reduced.

The following specifically describes the solution of the embodiment shown in FIG. 3 or FIG. 17 with reference to specific embodiments (Embodiment 6 to Embodiment 8).

Embodiment 6 (Capability)

Figure 19:
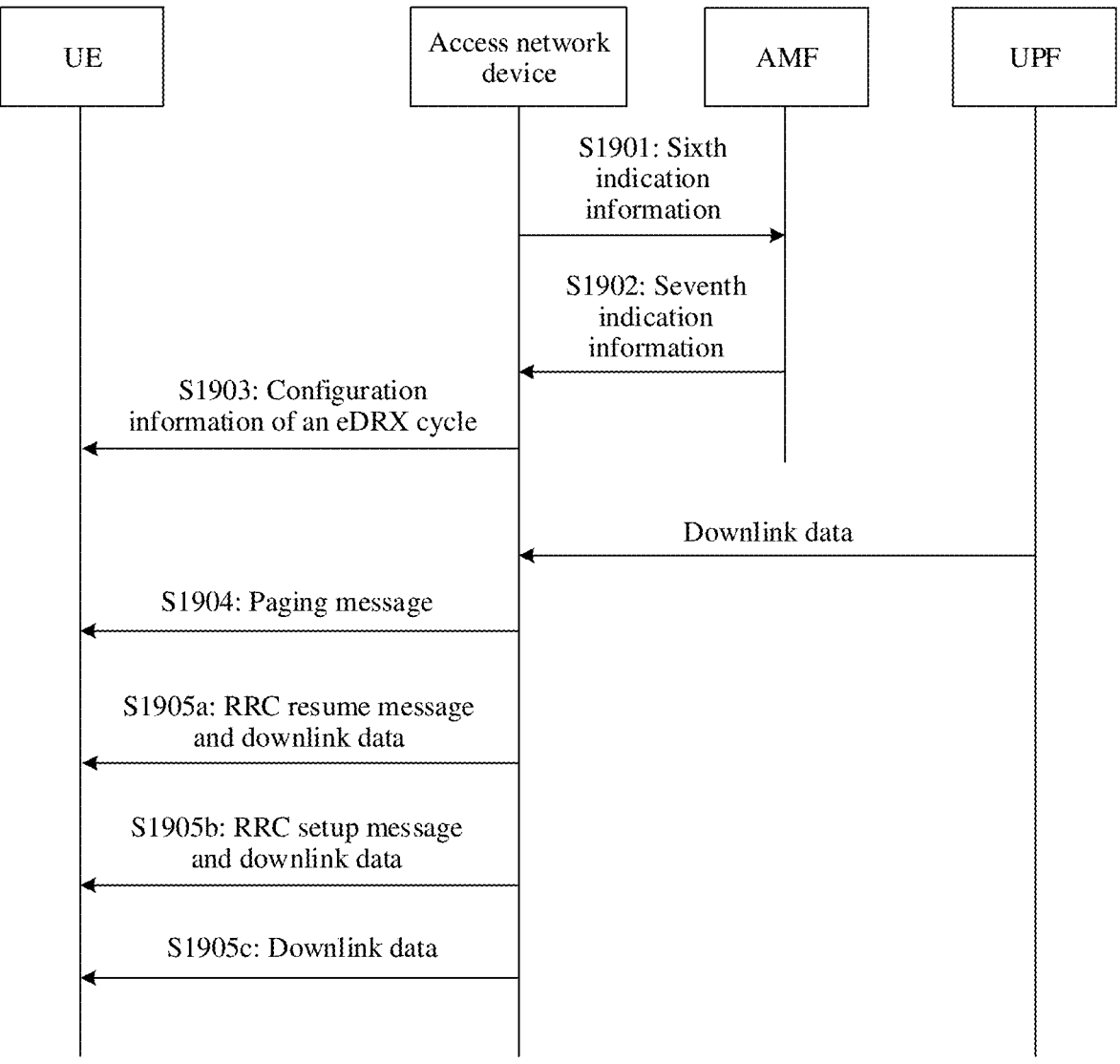
FIG. 19 is a schematic flowchart of another data transmission method according to an embodiment of this application.

In Embodiment 6, an example in which a UPF sends downlink data to an access network device when UE is in an RRC inactive mode is used to describe a data transmission method according to this embodiment of this application with reference to FIG. 3. FIG. 19 is a schematic flowchart corresponding to the data transmission method according to this embodiment of this application. As shown in FIG. 19, the method includes the following steps.

Step S1901: The access network device sends sixth indication information to an AMF, and correspondingly, the AMF receives the sixth indication information from the access network device.

The sixth indication information indicates a load status of the access network device, or the sixth indication information indicates that the access network device supports sending of first information to a core network device, or the sixth indication information indicates a capability of the access network device to report the first information. This embodiment may be applied independently, or may be applied in combination with the foregoing embodiment. For example, the access network device may determine, by using the sixth indication information, whether the following step in the embodiments can be performed:

(1) step S301 in Embodiment 1;

(2) step S1401 in Embodiment 2;

(3) step S1501 in Embodiment 3; or (4) step S1601 in Embodiment 4, so as to relieve storage load of the access network device.

Optionally, the sixth indication information may be but is not limited to being carried in at least one of the following messages:

NG setup request, RAN configuration update, AMF configuration update acknowledge, and NG reset acknowledge.

Step S1902: The AMF sends seventh indication information to the access network device, where the seventh indication information indicates that the access network device may send the first information to the core network device. Correspondingly, the access network device receives the seventh indication information from the AMF.

The seventh indication information herein may be understood as (1) being used to represent that the core network device has a capability of sending the downlink data of the UE to the access network device based on the first information, and/or (2) indicating the access network device to send the first information to the core network device.

Optionally, the seventh indication information may be but is not limited to being carried in at least one of the following messages:

NG setup response, RAN configuration update acknowledge, AMF configuration update, NG reset, AMF status Indication, Overload Start, and Overload Stop.

It should be noted that an execution sequence of step S1901 is not strictly limited in this application. For example, step S1901 may alternatively be performed after step S1902, to be specific, step S1902 is performed first, and then step S1901 is performed. In addition, the foregoing step S1901 and step S1902 are optional steps.

Step S1903: The access network device sends configuration information of an eDRX cycle to the UE.

Specifically, the access network device may send the configuration information of the eDRX cycle to the UE before the UE switches to the RRC inactive mode. For example, the configuration information of the eDRX cycle may be carried in an RRC release message, and the RRC release message is used to release the UE from an RRC connected mode to the RRC inactive mode.

For example, the configuration information of the eDRX cycle includes duration information of the eDRX cycle, and may further include PTW duration information and the like.

After step S1902 or S1903, Embodiment 1, Embodiment 2, Embodiment 3, or Embodiment 4 is performed. In a process of performing Embodiment 1, Embodiment 2, Embodiment 3, or Embodiment 4, Embodiment 5, Embodiment 7, or Embodiment 8 may be performed.

After Embodiment 1, Embodiment 2, Embodiment 3, or Embodiment 4 is performed, if the access network device receives the downlink data from the UPF, step S1904 is performed.

Step S1904: The access network device sends a paging message to the UE, and after setting up an RRC connection to the UE, the access network device sends, to the UE, the downlink data that is of the UE and that is received from the UPF.

After Embodiment 5, Embodiment 7, or Embodiment 8 is performed, if the access network device receives the downlink data or second information from the UPF, step S1905a, S1905b, or S1905c is performed.

Step S1905a: If the access network device receives the downlink data or the second information, and the access network device receives an RRC resume request (RRC resume request) message sent by the terminal device, the access network device sends an RRC resume (RRC resume) message and the downlink data to the terminal device, where the RRC resume message and the downlink data may be sent by using one message, or may be sent by using different messages. This is not limited in this application.

Step S1905b: If the access network device receives the downlink data or the second information, and the access network device receives an RRC setup request (RRC setup request) message sent by the terminal device, the access network device sends an RRC setup (RRC setup) message and the downlink data to the terminal device, where the RRC setup message and the downlink data may be sent by using one message, or may be sent by using different messages. This is not limited in this application.

Step S1905c: If the access network device receives the downlink data or the second information, and the access network device receives an RRC setup complete (RRC setup complete) message sent by the terminal device, the access network device sends the downlink data to the terminal device.

It should be understood that, in the manner of this embodiment of this application, a time point at which the access network device receives the downlink data of the UE from the UPF is close to a time point at which the access network device can page the UE, so that the access network device does not need to buffer the downlink data for the UE for a long duration.

Embodiment 7 (RNAU)

In Embodiment 7, a data transmission method according to this embodiment of this application is described by using an example in which UE requests to enter an RRC connected mode from an RRC inactive mode, for example, by using an access network notification area update (ran notification area update, RNAU) process.

Figure 20:
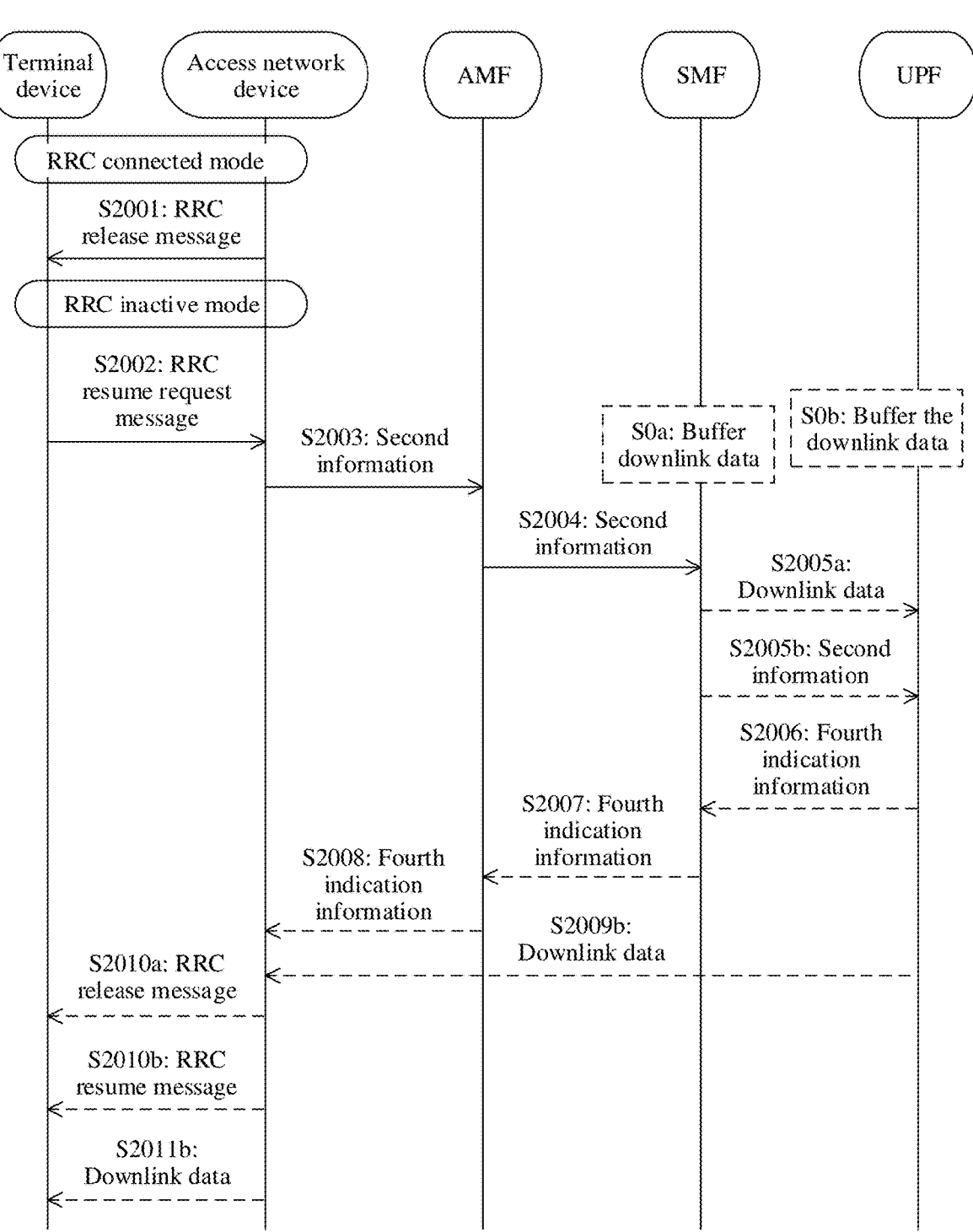
FIG. 20 is a schematic flowchart of another data transmission method according to an embodiment of this application.

The following describes the data transmission method according to this embodiment of this application with reference to Embodiment 1 and FIG. 17. FIG. 20 is a schematic flowchart corresponding to the data transmission method according to this embodiment of this application. As shown in FIG. 20, the method includes the following steps.

Step S2001: An access network device sends an RRC release message to the UE, and correspondingly, the UE receives the RRC release message sent by the access network device, and enters the RRC inactive mode from the RRC connected mode.

The RRC release message includes an RRC inactive mode configuration (rrc-inactiveConfig), and the RRC inactive mode configuration indicates a configuration of the RRC inactive mode, or the RRC inactive mode configuration indicates the UE to enter the RRC inactive mode.

Step S2002: The UE sends an RRC resume request (RRC Resume Request) message to the access network device, where the RRC resume request message is used by the UE to request the access network device to resume an RRC connection.

The RRC resume request message includes a resume cause indication (Resume Cause), and the resume cause indication includes an access network notification area update indication (ma-Update).

In a possible implementation, the RRC resume request message may be replaced with an RRC setup request (RRC setup request) message.

Step S2003: The access network device sends second information to an AMF. In a possible implementation, the second information may be included in an RRC inactive mode transition report (RRC Inactive Transition Report) message. The second information indicates one of the following:

(1) that the UE switches from the RRC inactive mode to the RRC connected mode;

(2) that the UE is to switch from the RRC inactive mode to the RRC connected mode;

(3) that the UE requests to resume the RRC connection;

(4) that the UE requests to enter the RRC connected mode;

(5) that the UE may receive downlink data;

(6) that the UE is reachable;

(7) that the UE is online;

(8) that the UE goes online; and (9) that the UE is in the RRC connected mode.

Step S2004: The AMF sends the second information to an SMF, and correspondingly, the SMF receives the second information sent by the AMF.

Case 1: The Downlink Data is Buffered.

With reference to Embodiment 1, Embodiment 2, Embodiment 3, or Embodiment 4, if the SMF buffers the downlink data, that is, step S0a, step S2005a is performed; or if a UPF buffers the downlink data, that is, step SOb, step S2005b is performed.

Step S2005a: The SMF sends the downlink data to the UPF.

Step S2005b: The SMF sends the second information to the UPF, and correspondingly, the UPF receives the second information sent by the SMF.

After step S2005a or S2005b, step S2009b is performed.

Step S2009b: If the UPF buffers the downlink data of the UE and receives the second information, or if the UPF receives the downlink data from the SMF, the UPF sends the downlink data to the access network device.

In a possible implementation, with reference to Embodiment 1, Embodiment 2, Embodiment 3, or Embodiment 4, if the SMF buffers the downlink data, that is, step S0a, step S2007 may be further performed after step S2004; or if the UPF buffers the downlink data, that is, step S0b, steps S2006 and S2007 may be further performed after step S2005a or S2005b.

Step S2006: If the UPF buffers the downlink data of the UE and receives the second information, the UPF sends fourth indication information to the SMF, where the fourth indication information indicates one of the following:

(1) that the downlink data of the UE is buffered;

(2) that the UE needs to enter the RRC connected mode;

(3) that the UE needs to resume the RRC connection;

(4) that the UE may wait for the downlink data; and (5) that the UE does not need to immediately enter the RRC inactive mode or an RRC idle mode.

Step S2007: If the SMF buffers the downlink data and receives the second information, or if the SMF receives the fourth indication information from the UPF, the SMF sends the fourth indication information to the AMF.

After step S2007, step S2008 is performed.

Step S2008: The AMF sends the fourth indication information to the access network device.

After step S2008 or S2009b, steps S2010b and 52011b are performed.

Step S2010b: If the access network device receives the downlink data or the fourth indication information, the access network device sends an RRC resume (RRC resume) message to the UE, where the RRC resume message is used to resume the RRC connection to the UE.

In a possible implementation, the RRC resume message may be replaced with an RRC setup (RRC setup) message.

Step S2011b: The access network device sends the downlink data to the UE.

In a possible implementation, S2010b and 52011b may be combined into one step.

Case 2: The Downlink Data is not Buffered.

With reference to Embodiment 1, Embodiment 2, Embodiment 3, or Embodiment 4, if the SMF does not buffer the downlink data, step S2007 is performed; or if the UPF does not buffer the downlink data, steps S2005b and S2006 are performed.

Step S2005b: This step is the same as S2005b in Case 1.

Step S2006: If the UPF does not buffer the downlink data of the UE and receives the second information, the UPF sends fourth indication information to the SMF, where the fourth indication information indicates one of the following:

(1) that the downlink data of the UE is not buffered;

(2) that the UE does not need to enter the RRC connected mode;

(3) that the UE does not need to resume the RRC connection;

(4) that the UE does not need to wait for the downlink data; and (5) that the UE may immediately enter the RRC inactive mode or the RRC idle mode.

Step S2007: If the SMF receives the fourth indication information from the UPF, or if the SMF does not buffer the downlink data and receives the second information, the SMF sends the fourth indication information to the AMF.

After step S2007, steps S2008 and S2010a are performed.

Step S2008: The AMF sends the fourth indication information to the access network device.

Step S2010a: If the access network device receives the fourth indication information sent by the AMF, the access network device sends an RRC release (RRC Release) message to the UE, where the RRC release message is used to release the RRC connection to the UE.

According to the foregoing method, when the access network device receives the RRC resume request message sent by the UE due to ma-Update, the access network device may notify, through the AMF, the SMF or the UPF that the UE can receive the downlink data, so that when buffering the downlink data of the UE, the SMF or the UPF can send the downlink data of the UE to the access network device in time, and the access network device is further enabled to send the downlink data to the UE. Therefore, the UE is prevented from being paged after the access network device receives the downlink data of the UE. In this way, signaling overhead and device power consumption are reduced.

Embodiment 8 (TAU)

Figure 21:
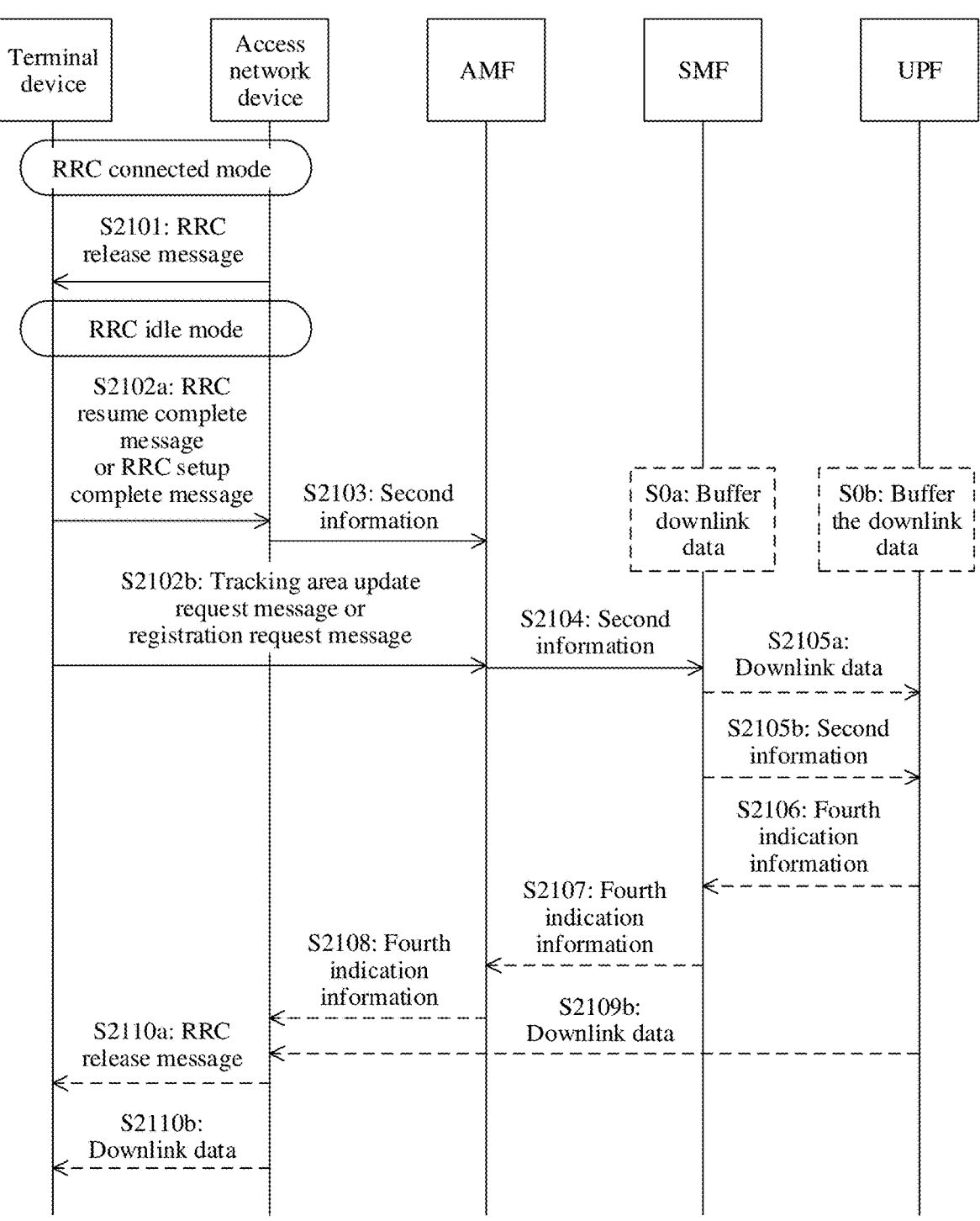
FIG. 21 is a schematic flowchart of another data transmission method according to an embodiment of this application.

In Embodiment 8, a data transmission method in this embodiment of this application is described by using an example in which UE switches from an RRC idle mode to an RRC connected mode. The following describes the data transmission method according to this embodiment of this application with reference to Embodiment 1 and FIG. 14. FIG. 21 is a schematic flowchart corresponding to the data transmission method according to this embodiment of this application. As shown in FIG. 21, the method includes the following steps.

Step S2101: An access network device sends an RRC release message to the UE, and correspondingly, the UE receives the RRC release message sent by the access network device, and enters the RRC idle mode from the RRC connected mode.

After step S2101, step S2102*a* or S2102*b* is performed.

Step S2102*a*: The UE sends an RRC resume complete (RRC resume complete) message or an RRC setup complete (RRC setup complete) message to the access network device.

After step S2102*a*, step S2103 is performed.

Step S2103: Same as step S2003.

Step S2102*b*: The UE sends a registration request (Registration Request) message or a tracking area update request (tracking area update request) message to an AMF, where the registration request (Registration Request) message includes a last visited registered tracking area identity (Last visited registered TAI) of the UE, and is used by the UE to update, to the AMF, the last visited registered tracking area identity of the UE.

After step S2103 or S2102*b*, step S2104 is performed.

Step S2104: Same as step S2004.

In a possible implementation, step S2104 may alternatively be: The AMF sends second information to the SMF based on the tracking area update request message or the registration request message.

If the SMF buffers the downlink data, steps S2105*a*, S2106, S2107, S2108, and S2109*b* are performed. This process is the same as the procedure in which the SMF buffers the downlink data in Embodiment 7 (to be specific, steps S2005*a*, S2006, S2007, S2008, and S2009*b* are performed), where S2106, S2107, and S2108 are optional steps.

If the UPF buffers the downlink data, steps S2005*b*, S2006, S2007, S2008, and S2009*b* are performed. This process is the same as the procedure in which the UPF buffers the downlink data in Embodiment 7 (to be specific, steps S2005*b*, S2006, S2007, S2008, and S2009*b* are performed), where S2106, S2107, and S2108 are optional steps.

After step S2108 or S2109*b*, step S2110*b* is performed, where step S2110*b* is the same as S2010*b*.

If the SMF does not buffer the downlink data, steps S2107 and S2108 are performed. This process is the same as the procedure in which the SMF does not buffer the downlink data in Embodiment 7 (to be specific, steps S1707 and S1708 are performed).

If the UPF does not buffer the downlink data, steps S2105*b*, S2106, S2107, and S2108 are performed. This process is the same as the procedure in which the UPF does not buffer the downlink data in Embodiment 7 (that is, steps S2005*b*, S2006, S2007, and S2008 are performed).

After step S2108, step S2110*a* is performed, where step S2110*a* is the same as S2010*a*.

According to the foregoing method, when receiving the registration request message, the tracking area update request message, or the second information sent by the UE, the AMF may determine that the UE is online, and the AMF may notify the SMF or the UPF of the online mode of the UE, so that the SMF or the UPF can send the downlink data of the UE to the access network device in time when buffering the downlink data of the UE, and may notify the AMF and the access network device to keep the UE online. Therefore, the UE is prevented from being re-paged after the access network device receives the downlink data of the UE. In this way, signaling overheads and device power consumption are reduced.

Embodiment 9

Figure 22:
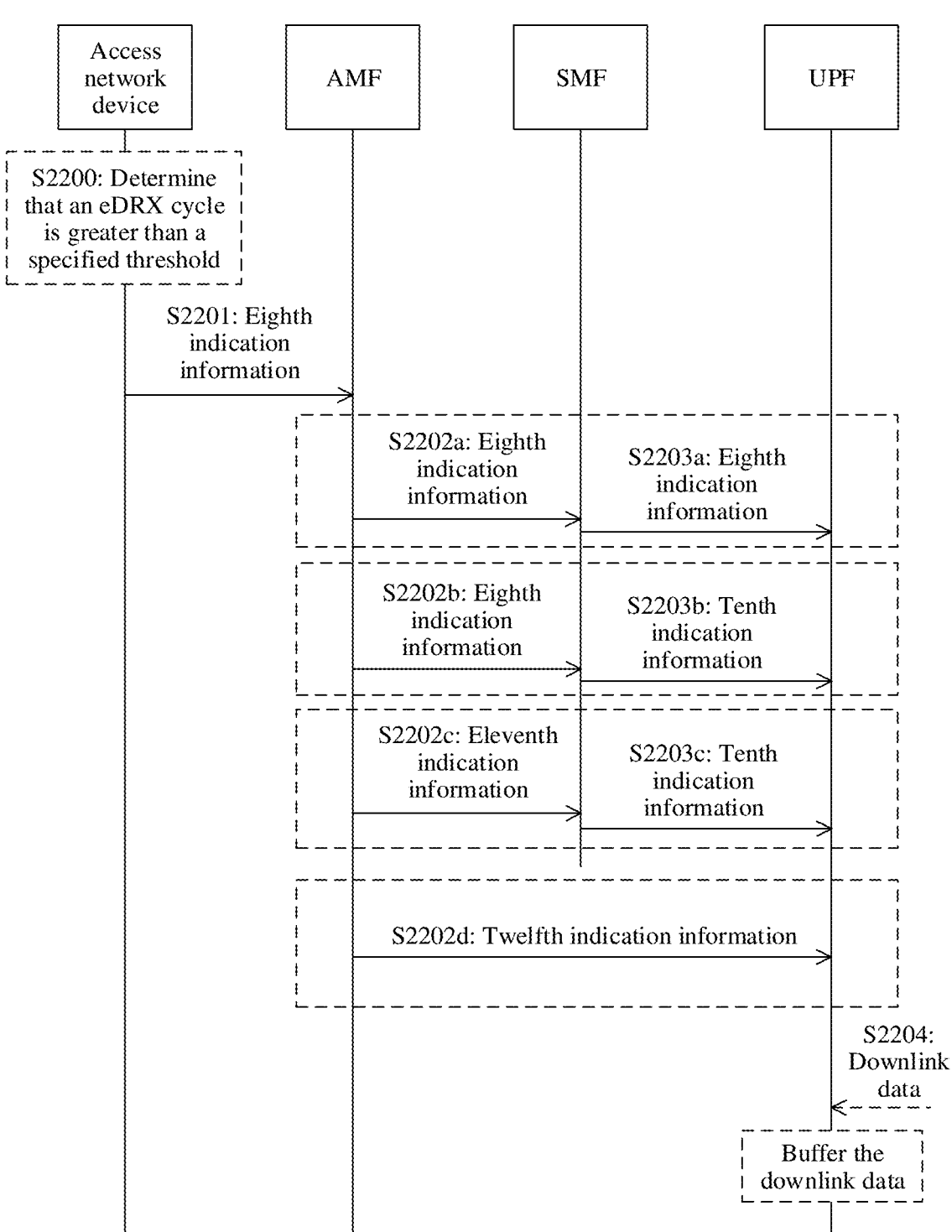
FIG. 22 is a schematic flowchart of another data transmission method according to an embodiment of this application.

In Embodiment 9, a data transmission method according to an embodiment of this application is described by using an example in which first information includes eighth indication information. FIG. 22 shows a data transmission method according to an embodiment of this application. The method may be applied to the system architecture shown in FIG. 2. As shown in FIG. 22, the method may include the following procedure.

Step 2200: An access network device determines that an eDRX cycle is greater than a specified threshold. This step is an optional step.

Step 2201: The access network device sends the eighth indication information to an AMF, where the eighth indication information indicates any one of the following:

a1. A UPF suspends sending of downlink data of UE.

a2. An SMF indicates the UPF to suspend sending of the downlink data of the UE.

a3. The AMF indicates the SMF to indicate the UPF to suspend sending of the downlink data of the UE.

a4. The AMF indicates the UPF to suspend sending of the downlink data of the UE.

First Optional Implementation:

Step 2202*a*: The AMF sends the eighth indication information to the SMF.

Step 2203*a*: The SMF sends the eighth indication information to the UPF, where the eighth indication information indicates a1.

Second Optional Implementation:

Step 2202*b*: The AMF sends the eighth indication information to the SMF, where the eighth indication information indicates a2.

Step 2203*b*: The SMF sends tenth indication information to the UPF, where the tenth indication information indicates a1.

Third optional implementation: The eighth indication information indicates a3.

Step 2202*c*: The AMF sends eleventh indication information to the SMF, where the eleventh indication information indicates a2.

Step 2203*c*: The SMF sends tenth indication information to the UPF, where the tenth indication information indicates a1.

Fourth optional implementation: The eighth indication information indicates a4.

Step 2202*d*: The AMF sends twelfth indication information to the UPF, where the twelfth indication information indicates a1.

Step S2204: The UPF receives the downlink data of the UE, and buffers the downlink data of the UE. This step is an optional step.

In the foregoing manner, the UPF can be controlled by using different network elements. An implementation is flexible, an interaction procedure is simple, and application is stronger.

Figure 23:
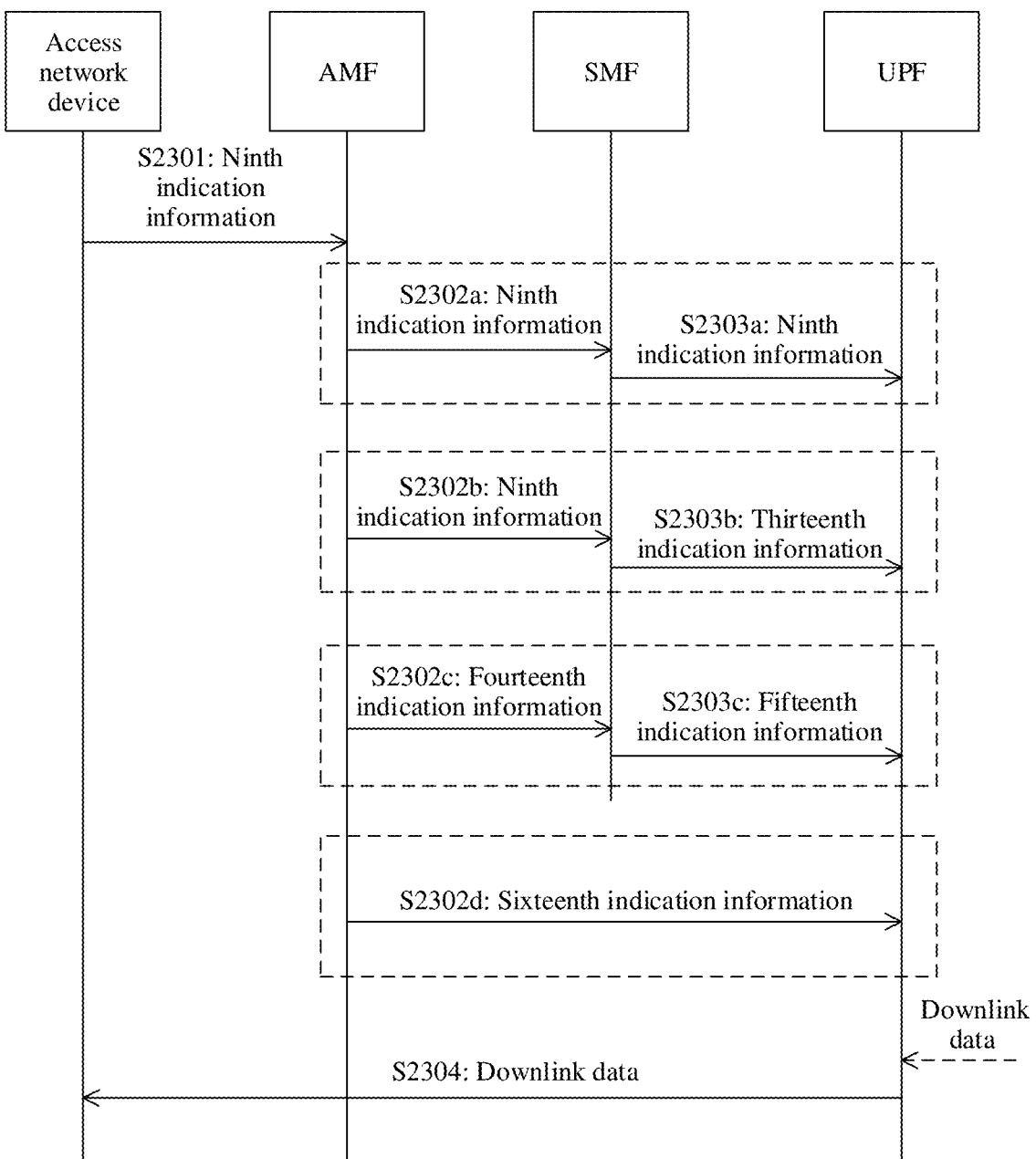
FIG. 23 is a schematic flowchart of another data transmission method according to an embodiment of this application.

Optionally, after step S2204, the following procedure of resuming data sending may be further performed. FIG. 23 is a procedure of resuming data transmission. The procedure includes the following steps.

Step 2301: The access network device sends ninth indication information to the AMF.

The ninth indication information indicates any one of the following:

b1. The UPF resumes sending the downlink data of the UE.

b2. The SMF indicates the UPF to resume sending the downlink data of the UE.

b3. The AMF indicates the SMF to indicate the UPF to resume sending the downlink data of the UE.

b4. The AMF indicates the UPF to resume sending the downlink data of the UE.

First Optional Implementation:

Step 2302*a*: The AMF sends the ninth indication information to the SMF.

Step 2303*a*: The SMF sends the ninth indication information to the UPF, where the ninth indication information indicates b1.

Second Optional Implementation:

Step 2302*b*: The AMF sends the ninth indication information to the SMF, where the ninth indication information indicates b2.

Step 2303*b*: The SMF sends thirteenth indication information to the UPF, where the thirteenth indication information indicates b1.

Third optional implementation: The ninth indication information indicates b3.

Step 2302*c*: The AMF sends fourteenth indication information to the SMF, where the fourteenth indication information indicates b2.

Step 2303*c*: The SMF sends fifteenth indication information to the UPF, where the fifteenth indication information indicates b1.

Fourth optional implementation: The eighth indication information indicates b4.

Step 2302*d*: The AMF sends sixteenth indication information to the UPF, where the sixteenth indication information indicates b1.

Step S2304: The UPF sends the received or buffered downlink data of the UE to the access network device. This step is an optional step.

In the foregoing method, the access network device may determine, based on a buffer status of the access network device and a status of the UE, to perform the foregoing method procedure. In a possible scenario, for example, when determining that a buffer of the access network device is insufficient, for example, remaining buffer space is less than a first preset value, the access network device sends the first information to the AMF. For another example, when determining that the UE is in an eDRX mode or in an RRC inactive mode, the access network device sends the first information to the AMF. In this scenario, the first information may include the eighth indication information, so that the UPF suspends sending of the downlink data of the UE to the access network device, to reduce storage load of the access network device.

In another possible scenario, for example, after the RAN sends the buffered downlink data to the UE, buffer space is sufficient. For example, if remaining buffer space is not less than a second preset value, the first information is sent to the AMF, where the first information may include the ninth indication information, so that the UPF resumes sending the downlink data of the UE to the access network device.

Connection management (connection management) may include two parts: setup of a NAS signaling connection between the UE and the AMF and release of the NAS signaling connection between the UE and the AMF. The NAS signaling connection is used for NAS signaling exchange between the UE and a core network.

Currently, a signaling connection between UE and an AMF in a 5GS has two modes: a connection management idle (CM-IDLE) mode and a connection management connected (CM connected) mode. When the UE is in the CM connected mode, a NAS signaling connection is set up between the UE and the corresponding AMF.

Specifically, the NAS signaling connection includes two parts of connections: 1. a signaling connection between the UE and an access network device (for example, an RRC connection in a 3GPP access mode); and 2. an N2 connection between the access network device and the AMF. For example, when a core network device sends NAS signaling to the UE, the core network device may send the NAS signaling to the access network device through the N2 connection, and the access network device sends the NAS signaling to the corresponding terminal device.

After sending the NAS signaling, the core network device may start a timer to wait to receive response information from the terminal device. When the timer times out and the response information from the terminal device is still not received, the core network device responds to the timeout, and may initiate signaling retransmission or directly release a connection to the terminal device.

Figures 24, 25:
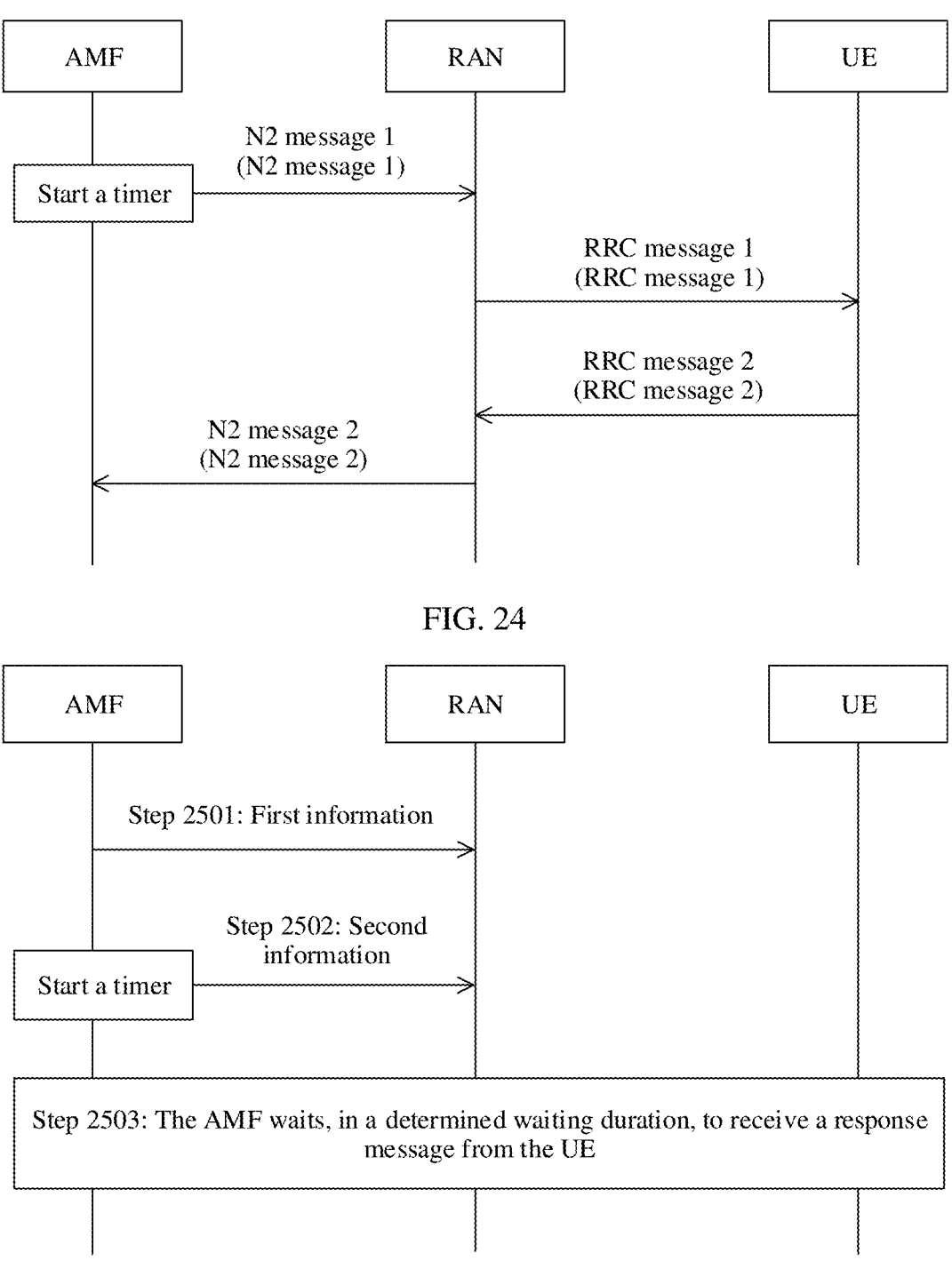
FIG. 24 is a schematic flowchart of protocol data unit session modification.
FIG. 25 is a schematic flowchart corresponding to a data transmission method according to an embodiment of this application.

FIG. 24 is a schematic flowchart of PDU session modification (protocol data unit session modification). As shown in FIG. 24, an AMF sends an N2 message 1 (N2 message 1) (for example, a PDU session modification command (PDU session modification command)) to a RAN. In addition, when sending the N2 message 1, the AMF starts a timer, and waits, before the timer times out, to receive response information of UE. Correspondingly, the RAN receives the N2 message 1.

After encapsulating the PDU session modification command into an RRC message 1, the RAN sends the RRC message 1 to the corresponding UE. Correspondingly, the UE receives the RRC message 1.

The UE sends an RRC message 2 to the RAN in response to the RRC message 1. The RRC message 2 includes a PDU session modification command Ack (PDU session modification command acknowledgment), to be specific, the RRC message 2 is response information of the UE for the PDU session modification command Correspondingly, the RAN receives the RRC message 2.

The RAN encapsulates the PDU session modification command Ack into an N2 message 2, and sends the N2 message 2 to the AMF. Correspondingly, the AMF receives the N2 message 2.

Specifically, the AMF receives the N2 message 2 in a specified duration of the timer. If the N2 message 2 is not received when the timer times out, the AMF may release a connection to the UE. In a possible scenario, the UE sends the response information after a long duration, but the AMF does not receive the response information from the UE in the specified duration, and considers that the AMF is disconnected from the UE. As a result, the AMF releases the UE by mistake.

In view of this, an embodiment of this application provides a new data transmission method, to reduce incorrect release of a terminal device by a first network device, and improve data transmission efficiency.

The data transmission method may be applied to a second network device and a third network device. As described above, the second network device and the third network device may be respectively a RAN and an AMF. An example in which the method is performed by a RAN and an AMF is used below for description.

FIG. 25 shows a first data transmission method according to an embodiment of this application. The method may be applied to the network structure shown in FIG. 2. As shown in FIG. 25, the method may include the following procedure.

Step 2500: An access network device determines that an eDRX cycle is greater than a preset threshold. This step is an optional step.

The preset threshold is predefined, or is configured by using a message from a core network device.

Step 2501: The access network device sends first information to an AMF, where the first information may be used by the AMF to determine a waiting duration. Correspondingly, the AMF receives the first information from the access network device.

For example, the first information includes but is not limited to one or more of the following: the eDRX cycle, a paging time window PTW duration, a first duration, and first indication information, where the first duration indicates a time interval to a next PTW, and the first indication information indicates that a terminal device is in an RRC inactive mode.

Optionally, the first information may further include information about the UE, for example, an identifier of the UE, so that when sending second information to the UE, the AMF determines the waiting duration for the UE based on the first information corresponding to the identifier of the UE, and waits for response information of the UE in the waiting duration. It may be understood that, if the access network device configures same eDRX for different UEs, the first information may not include the information about the UE. If the first information may not include the information about the UE, the UE in this application may be any UE served by the access network device that sends the first information. If the access network device serves a plurality of UEs, steps shown in the data transmission method provided in this embodiment of this application are performed for each UE.

Step 2502: The AMF sends the second information, where the second information is used to be sent to the terminal device.

Specifically, the second information may be NAS signaling, the NAS signaling is a message between the UE and the core network device, and the UE is in a CM connected mode. For example, a NAS signaling transmission process includes: The AMF sends the NAS signaling to the access network device, and the access network device sends the NAS signaling to the UE.

Step 2503: The AMF waits to receive the response information from the terminal device in the determined waiting duration.

In an implementation, when sending the second information, the AMF starts a timer, and waits, before the timer times out, to receive the response information from the UE. The response information may be response information of the UE for the second information. Specifically, a timing duration of the timer is a duration determined by the AMF based on the first information, that is, the waiting duration.

The following describes, with reference to a specific example, a procedure of determining the waiting duration based on the first information.

Example 1: The First Information Includes the eDRX Cycle

In a possible implementation, the AMF may determine, based on a first correspondence, the waiting duration corresponding to the received first information. The first correspondence includes different first correspondences between first information and waiting durations. Table 1 shows a specific example of a first correspondence provided in this embodiment of this application.

TABLE 1

| eDRX cycle | Waiting duration |
|------------|------------------|
| eDRX 1 | L1 |
| eDRX 1 | L2 |
| . . . | . . . |

For example, the waiting duration in the first correspondence may be agreed on in a protocol, or may be notified by another network device, for example, an SMF, a UPF, a RAN, or the UE.

For example, the first correspondence may alternatively be a correspondence between an eDRX cycle and a scaling factor (scaling factor). The waiting duration may be obtained by multiplying a waiting duration in a conventional technology by a scaling factor corresponding to an eDRX cycle.

For another example, the waiting duration in the first correspondence may alternatively be determined based on the eDRX cycle. For example, the eDRX cycle and the waiting duration satisfy a function relationship. For example, the eDRX cycle is in direct proportion to the waiting duration, and a longer eDRX cycle indicates a longer waiting duration. For example, the waiting duration satisfies the following formula 1:

Waiting duration=(eDRX/eDRX 0)*L, where a waiting duration corresponding to eDRX 0 is L.

Figure 26:
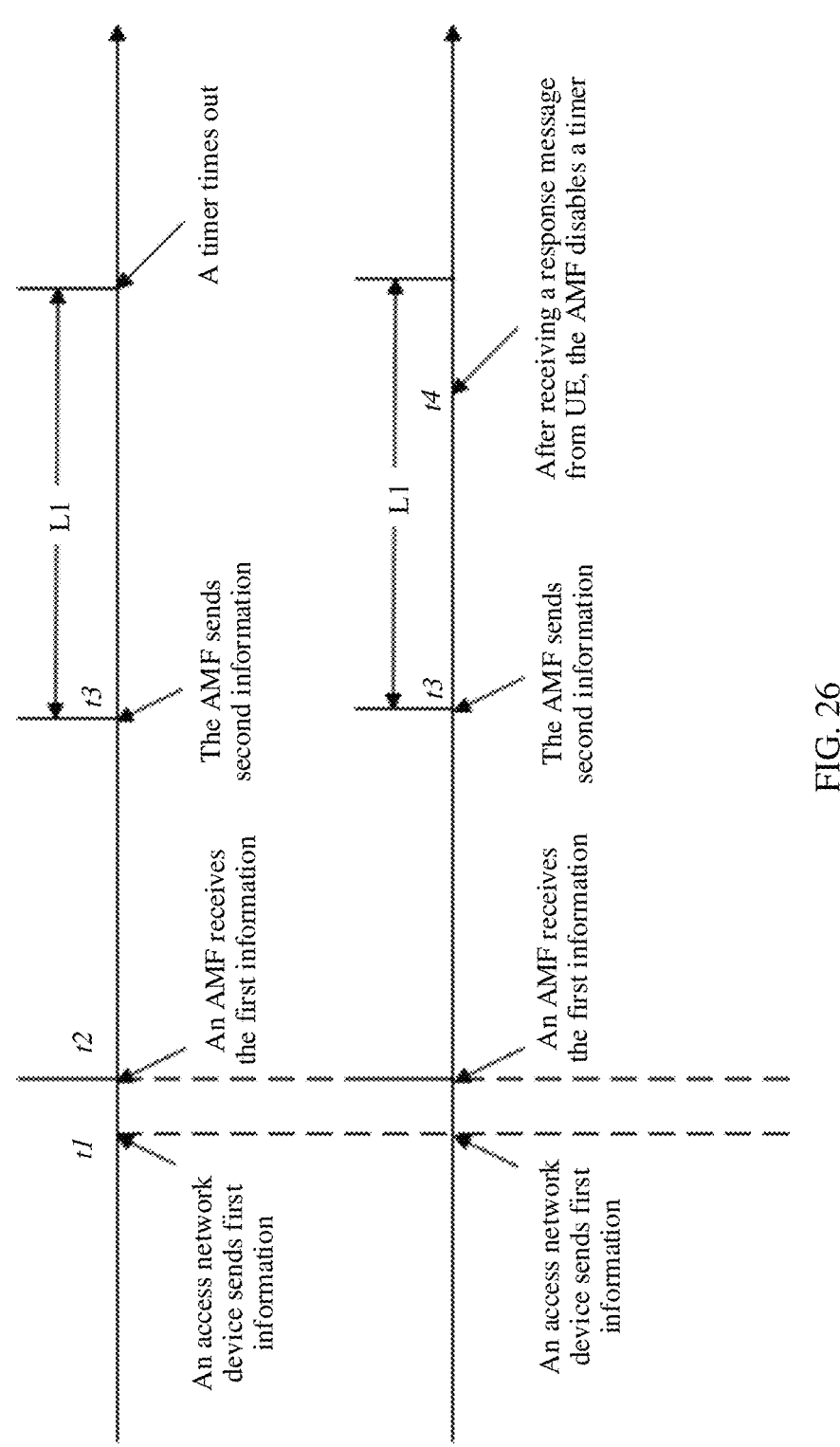
FIG. 26 is a schematic diagram of a method for determining a waiting duration based on first information according to an embodiment of this application.

As shown in FIG. 26, the access network device sends the first information at t1, and the AMF receives the first information at t2. If the first information includes eDRX 1, the AMF determines a waiting duration, namely, L1, based on the first correspondence and the eDRX 1, and the AMF sends the second information at t3, where the second information is used to be sent to the UE. The AMF waits to receive the response information from the UE in the duration of L1 from t3.

An implementation in which the AMF receives the response information from the UE in the waiting duration is as follows: When sending the second information, the AMF starts the timer at t3, where a specified duration of the timer is L1, and waits, before the timer times out, to receive the response information from the UE. If the AMF does not receive the response information from the UE in L1, the timer times out. If the AMF receives the response information from the UE at t4, and t4 is in the duration of L1, the AMF disables the timer at t4. This explanation may still be used in the following implementation. Details are not repeated below.

In another possible implementation, the AMF may determine the waiting duration based on the eDRX cycle. The waiting duration needs to be not less than a length of at least one eDRX cycle.

Figure 27:
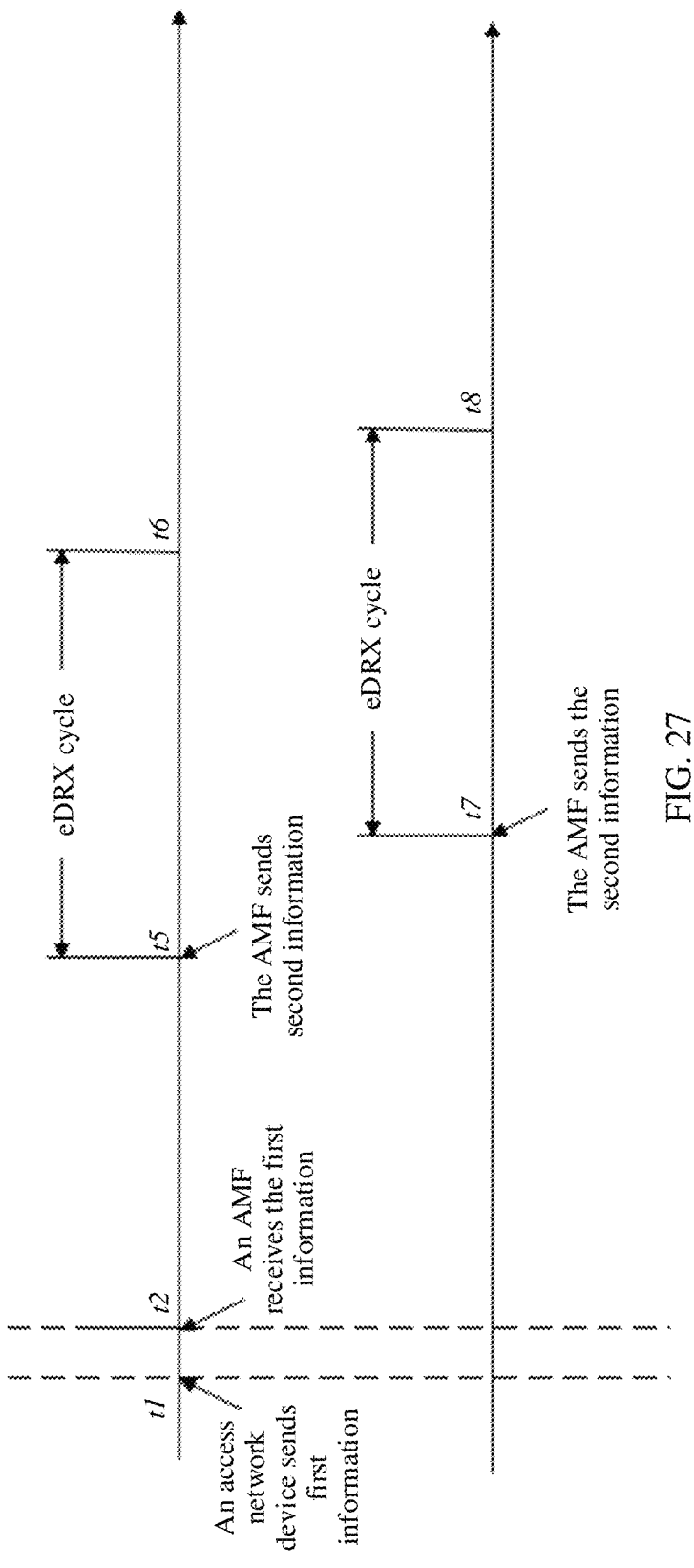
FIG. 27 is a schematic diagram of a method for determining a waiting duration based on first information according to an embodiment of this application.

As shown in FIG. 27, the access network device sends the first information at t1, the AMF receives the first information at t2, and the AMF sends the second information at t5. A time interval between t5 and t6 is one eDRX cycle. In this case, the AMF determines that a waiting duration needs to be at least one eDRX cycle, that is, t5 to t6. For another example, if the AMF sends the second information at t7, and a time interval between t7 and t8 is one eDRX cycle, the AMF determines that a waiting duration needs to be at least t7 to t8.

It should be noted that FIG. 26 and FIG. 27 are merely examples, and do not constitute limitations on the time point at which the access network device sends the first information and the time point at which the AMF receives the first information in this embodiment of this application. In an implementation, t1 may be equal to t2.

Figure 28:
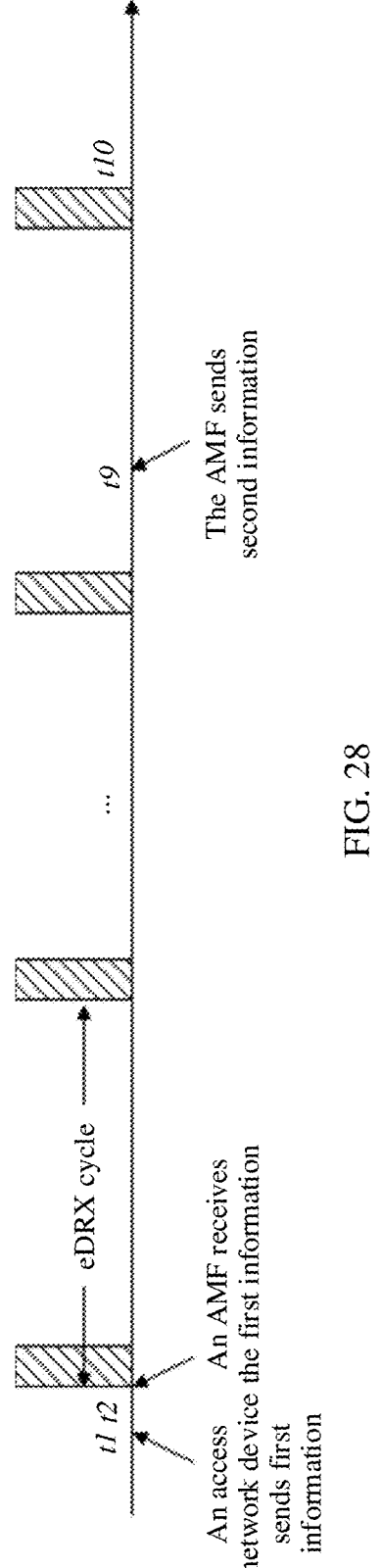
FIG. 28 is a schematic diagram of a method for determining a waiting duration based on first information according to an embodiment of this application.

Example 2: The First Information Includes the eDRX Cycle and the PTW Duration In a possible implementation, for example, the AMF may determine a time point at which the first information is received as a start time point of a PTW, and then the AMF may determine an end time point of the PTW based on the PTW duration, and determine an end time point of a PTW in each of a plurality of eDRX cycles based on the eDRX cycle. Correspondingly, the AMF determines the waiting duration based on the first information. A start time point of the waiting duration is a start time point for sending the second information, and the waiting duration needs to at least to an end time point of a next PTW after the second information is sent. In other words, the end time point of the waiting duration may be the end time point of the next PTW after the second information is sent, or may be a time point after the end time point of the next PTW. As shown in FIG. 28, the access network device sends the first information at t1, and the AMF receives the first information at t2, where t2 is a start time point of a PTW. If the AMF sends the second information at t9, the AMF may determine a waiting duration based on t2, an eDRX cycle, the PTW, and t9. For example, the waiting duration may start from a start time point of t9 and end at an end time point (for example, t10) of a next PTW of t9. A duration between t9 and t10 is the waiting duration. Optionally, the waiting duration may alternatively be greater than the duration (the duration between t9 and t10). For example, the waiting duration may start from the start time point of t9 and end at a time point after t10. The AMF waits, in the waiting duration, to receive the response information from the UE.

Figure 29:
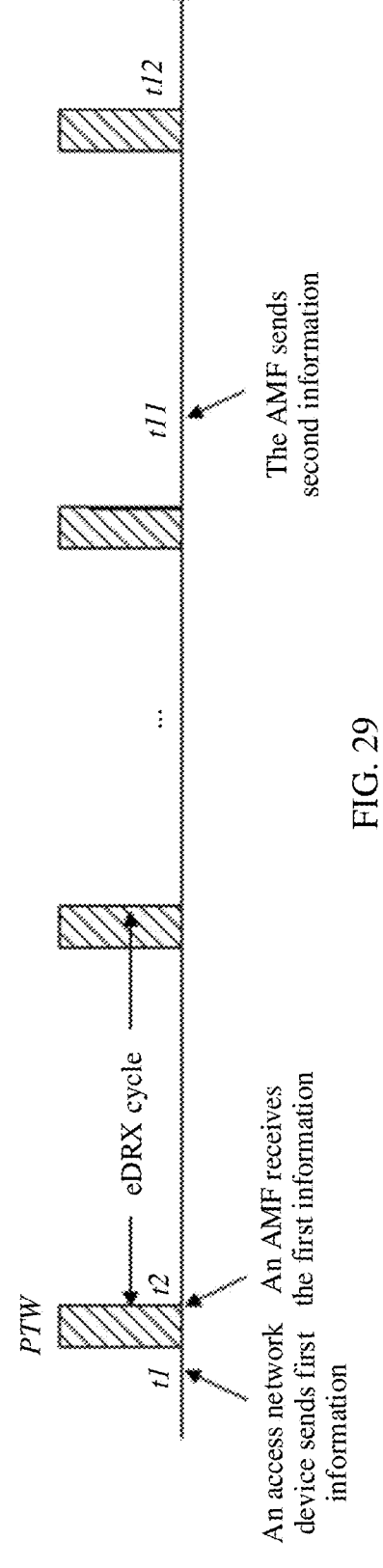
FIG. 29 is a schematic diagram of a method for determining a waiting duration based on first information according to an embodiment of this application.

For another example, the AMF may alternatively determine a time point at which the first information is received as an end time point of a PTW, and may further determine an end time point of a PTW in each of a plurality of eDRX cycles based on the eDRX cycle. Correspondingly, the waiting duration after the AMF sends the second information needs to be at least from a time point at which the second information is sent to an end time point of a next PTW. As shown in FIG. 29, the access network device sends the first information at t1, and the AMF receives the first information at t2, where t2 is an end time point of a PTW. If the AMF sends the second information at t11, the AMF determines a waiting duration based on t2, an eDRX cycle, the PTW, and t11. The waiting duration may start from a start time point of t11 and end at an end time point (for example, t12) of a next PTW of t11. A duration between t11 and 12 is the waiting duration. The waiting duration may alternatively be another duration. For example, the waiting duration may start from the start time point of t11 and end at a time point after t12. The AMF waits to receive the response information from the UE in the waiting duration.

It should be noted that: (1) In Example 2, the first possible implementation in Example 1 may further be performed, to be specific, the waiting duration is determined based on the first correspondence and the received eDRX cycle. Alternatively, the waiting duration is determined by using a new correspondence, for example, a second correspondence, and the first information. The second correspondence includes correspondences between waiting durations and combinations of different eDRX cycles and different PTW durations. Similar solutions are not repeated below by using examples. (2) FIG. 28 and FIG. 29 are merely examples, and do not constitute limitations on the time point at which the access network device sends the first information and the time point at which the AMF receives the first information in this embodiment of this application. In an implementation, t1 may be equal to t2.

Example 3: The First Information Includes the First Indication Information

The first indication information may indicate that the terminal device is in the RRC inactive mode, or indicate that the terminal device is in an eDRX mode, or indicate that the UE needs a long duration to send the response information.

In this manner, the AMF may preconfigure two waiting durations, for example, including a first waiting duration and a second waiting duration. The first waiting duration is a short duration, and the second waiting duration is a long duration. If receiving the first indication information, the AMF determines that the second waiting duration is a duration for waiting to receive the response information of the UE. If the AMF does not receive the first indication information, the AMF determines that the first waiting duration is a duration for waiting for the response information of the UE. The first waiting duration may alternatively be understood as a duration defined in another implementation, or may be a duration newly defined in this embodiment of this application, for example, a duration agreed on in a protocol, or a duration determined by the core network device. This is not limited in this embodiment of this application.

Example 4: The first information includes the first duration. In a possible implementation, the first duration indicates at least one of the following:

(1) a time interval between a time point at which the access network device sends the first information and a next PTW; and (2) a time interval between the time point at which the access network device sends the first information and a next paging occasion PO.

It should be understood that the first duration herein may indicate an accurate time interval value. For example, a PTW length may be at a subframe level, and the time interval value may be accurate to a subframe level. Alternatively, the time interval indicated by the first duration may indicate an approximate time interval. For example, the PTW length may be at a subframe level, and a time interval value may alternatively be at a second level or a minute level, that is, an approximate time range. This is not limited in this embodiment of this application.

Figure 30:
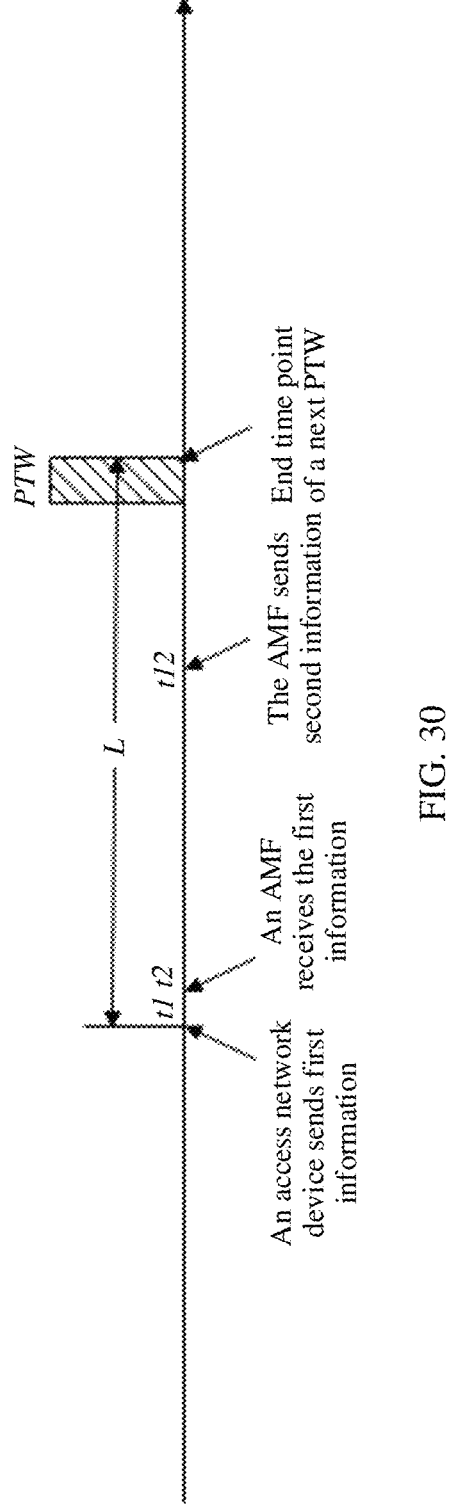
FIG. 30 is a schematic diagram of a method for determining a waiting duration based on first information according to an embodiment of this application.

In a first implementation, the first duration indicates the time interval to the next PTW. To be specific, the first duration may be the time interval between the time point at which the access network device sends the first information and the next PTW. As shown in FIG. 30, the first duration is L in FIG. 30, where a start time point of L is the time point at which the access network device sends the first information, and an end time point of L is an end time point of a PTW. The access network device sends the first information at t1, and the AMF receives the first message at t2. It is assumed that the AMF can determine t1. For example, the AMF determines t1 based on t2 and a transmission delay (a time difference between t1 and t2) of the first information. Assuming that the AMF sends the second information at t12, the AMF determines a waiting duration based on t1 and the first duration (L in FIG. 30). The waiting duration is at least a duration elapsed between t12 and the end time point of the first duration.

Figure 31:
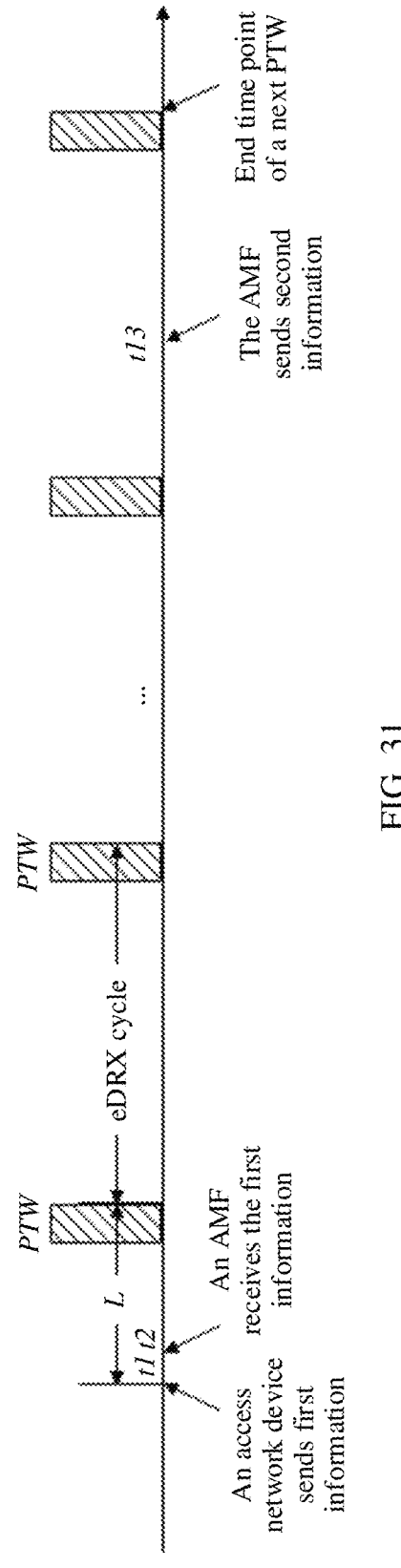
FIG. 31 is a schematic diagram of a method for determining a waiting duration based on first information according to an embodiment of this application.

Optionally, the first information may further include the eDRX cycle, and the first duration still indicates the time interval to the end time point of the next PTW. In this case, the AMF may determine end time points of a plurality of PTWs based on the eDRX cycle and the first duration. As shown in FIG. 31, the access network device sends the first information at t1, and the AMF receives the first information at t2. For example, the AMF determines t1 based on t2 and a transmission delay (a time difference between t1 and t2) of the first information. If the AMF sends the second information at t13, the AMF may determine a waiting duration based on t1, a first duration, and an eDRX cycle. The waiting duration needs to be at least a duration elapsed between t13 and an end time point of a next PTW after t13.

It should be understood that lengths of the PTWs in FIG. 30 and FIG. 31 are merely examples, and are used to represent that L indicates an interval to the end time point of the next PTW.

Figure 32:
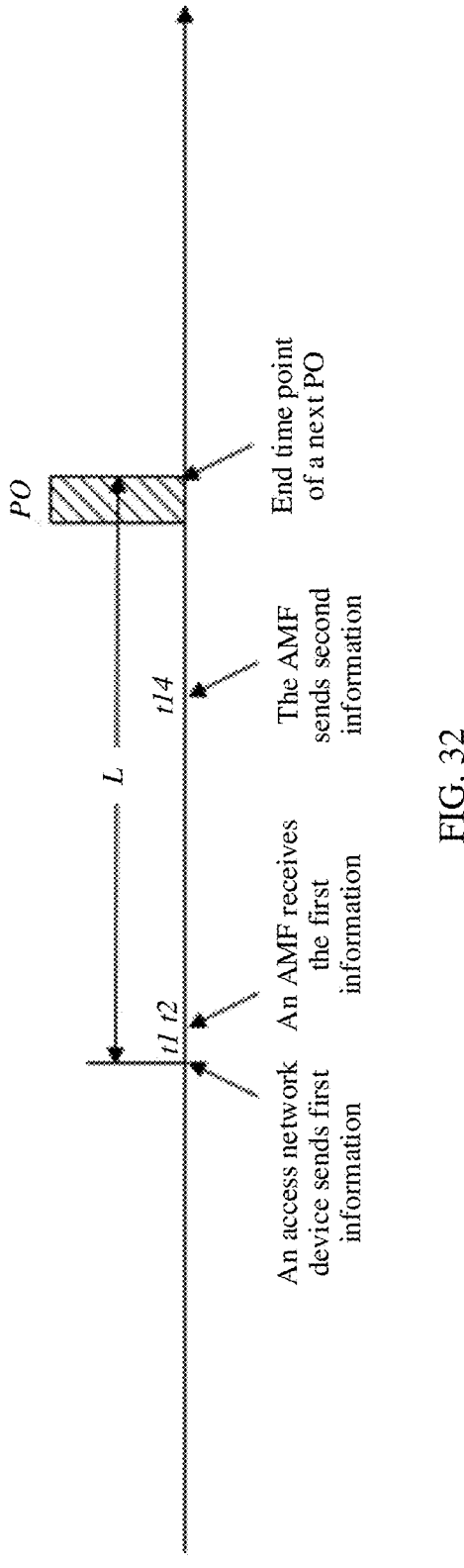
FIG. 32 is a schematic diagram of a method for determining a waiting duration based on first information according to an embodiment of this application.

In a second implementation, the first duration indicates the time interval to the next paging occasion PO. As shown in FIG. 32, the first duration is L in FIG. 32, where a start time point of L is the time point at which the access network device sends the first information, and an end time point of L is an end time point of the paging occasion PO. The access network device sends the first information at t1, and the AMF receives the first message at t2. For example, the AMF determines t1 based on t2 and a transmission delay (a time difference between t1 and t2) of the first information, and the AMF sends the second information at t14. In this case, the AMF determines a waiting duration based on t1 and the first duration (L in FIG. 30). The waiting duration is at least a duration elapsed between t14 and the end time point of the first duration.

Figure 33:
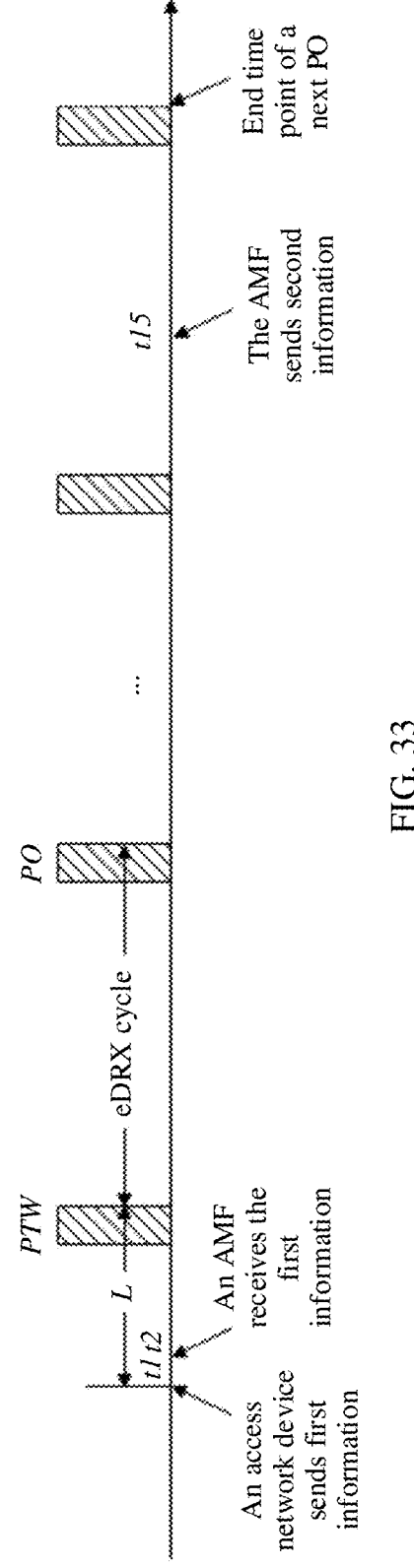
FIG. 33 is a schematic diagram of a method for determining a waiting duration based on first information according to an embodiment of this application.

Optionally, the first information may alternatively include the eDRX cycle and the first duration, and the first duration still indicates the time interval to the next paging occasion PO. In this case, the AMF may further determine end time points of a plurality of POs based on the eDRX cycle and the first duration. As shown in FIG. 33, the access network device sends the first information at t1, and the AMF receives the first information at t2. For example, the AMF determines t1 based on t2 and a transmission delay (a time difference between t1 and t2) of the first information. If the AMF sends the second information at t15, the AMF may determine a waiting duration based on t1, a first duration, and an eDRX cycle. The waiting duration needs to be at least a duration elapsed between t15 and an end time point of a next PO after t15.

In a possible implementation, the first information may include only the following several time points:
(1) the end time point of the next PTW; and
(2) the end time point of the next paging occasion PO.

The AMF determines the waiting duration based on the time point at which the second information is sent and the time point information in (1) or (2), where the waiting duration is at least a duration from the time point at which the AMF sends the second information to (1) or (2).

Figures 34, 35:
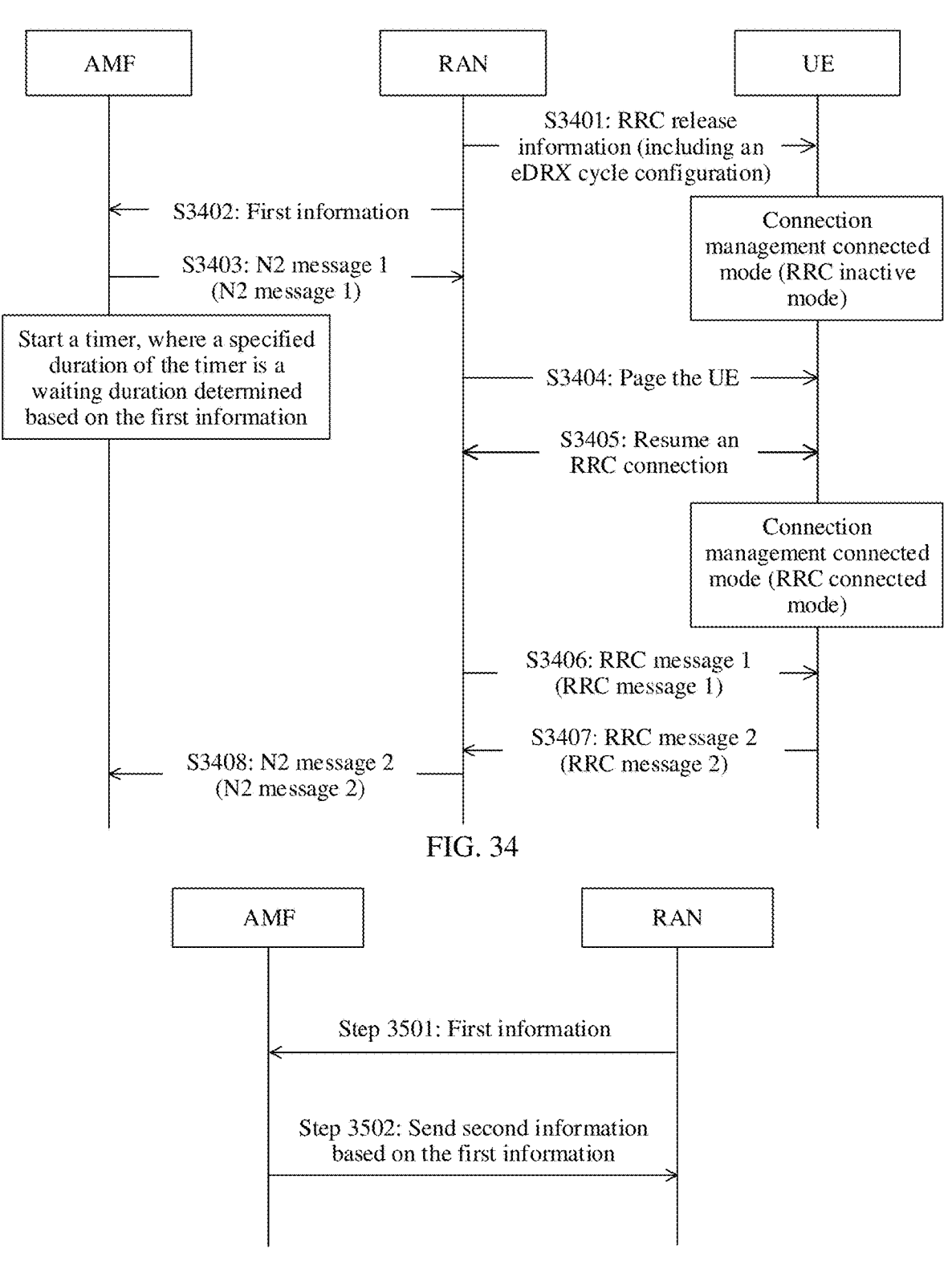
FIG. 34 is a schematic flowchart of a complete data transmission method according to an embodiment of this application.
FIG. 35 is a schematic flowchart corresponding to another data transmission method according to an embodiment of this application.

FIG. 34 shows a complete data transmission method according to an embodiment of this application. The method may be applied to the system architecture shown in FIG. 2. As shown in FIG. 34, the method may include the following procedure.

Step 3401: An access network device sends an RRC release message to UE.

Specifically, the RRC release message includes a suspend configuration (suspend configuration) and an eDRX cycle. The suspend configuration is used to suspend an RRC connection, so that the UE enters an RRC inactive mode. Optionally, the RRC release message may further include a PTW duration. In an implementation, the eDRX cycle may be further included in the suspend configuration. A form of sending data is not limited in this embodiment of this application.

Step 3402: The access network device sends first information to an AMF. Correspondingly, the AMF receives the first information.

The first information may be the first information in the foregoing examples.

Step 3403: The AMF sends second information (for example, an N2 message 1 in FIG. 34) to the access network device, starts a timer, and waits, before the timer times out, to receive response information of the UE. Correspondingly, the access network device receives the second information.

The second information is used to be sent to the UE. The AMF determines a waiting duration based on the first information. The waiting duration herein may be reflected as a timeout value of the timer, to be specific, a specified duration of the timer is the waiting duration.

Step 3404: The access network device pages the UE, to resume the RRC connection to the UE.

Step 3405: The access network device sends the second information (for example, in a form of an RRC message 1 in FIG. 34) to the UE. Correspondingly, the UE receives the second information.

Step 3406: The UE sends the response information (for example, an RRC message 2 in FIG. 34) to the access network device. Correspondingly, the access network device receives the response information.

Step 3407: The access network device sends the response information (for example, an N2 message 2 in FIG. 34) to the AMF.

Step 3408: The AMF receives the response information.

In a possible scenario, the AMF receives the response information in a timing duration (that is, before timeout) of the timer.

In another possible scenario, if the timer times out and the AMF does not receive the response information of the UE, the AMF responds to the timeout, and a core network device may trigger retransmission. If the response information times out after a plurality of retransmissions, it may be determined that the UE is unreachable.

In the foregoing manner, the waiting duration in this embodiment of this application is longer than an existing duration, or is more adaptive to an actual response duration of the UE, and may further be dynamically configurable, to avoid a misoperation performed by the core network device on the UE. For example, a problem of incorrect release caused by delayed replying of the response information of the UE in an eDRX mode may be avoided.

FIG. 35 shows another data transmission method according to an embodiment of this application. The method may be applied to the network structure shown in FIG. 2. As shown in FIG. 35, the method may include the following procedure.

Step 3501: An access network device sends first information to an AMF, where the first information may be used by the AMF to determine a time point for sending second information. Correspondingly, the AMF receives the first information.

Step 3502: The AMF sends second information based on the first information.

In the foregoing data transmission method, the AMF determines a waiting duration based on the first information, to be specific, a waiting duration after the AMF sends the second information. In the data transmission method shown in FIG. 35, the second information may not be sent first, in other words, the second information is sent after a delay, so that the time point for sending the second information is closer to a time point at which UE can be woken up.

The following describes, with reference to specific examples, a procedure of sending the second information based on the first information.

Example 1: The First Information Includes an eDRX Cycle

The eDRX cycle may alternatively be a wake-up cycle or a discontinuous reception DRX cycle of the UE, or a sleep cycle of the UE. The following uses an example in which the first information includes the eDRX cycle for description.

In a possible implementation, the AMF may determine a third time point based on the eDRX cycle and a time point at which the first information is received, and the AMF sends the second information to the access network device before the third time point. The third time point is an eDRX cycle boundary or an eDRX cycle start time point after the AMF determines that the second information exists.

Figure 36:
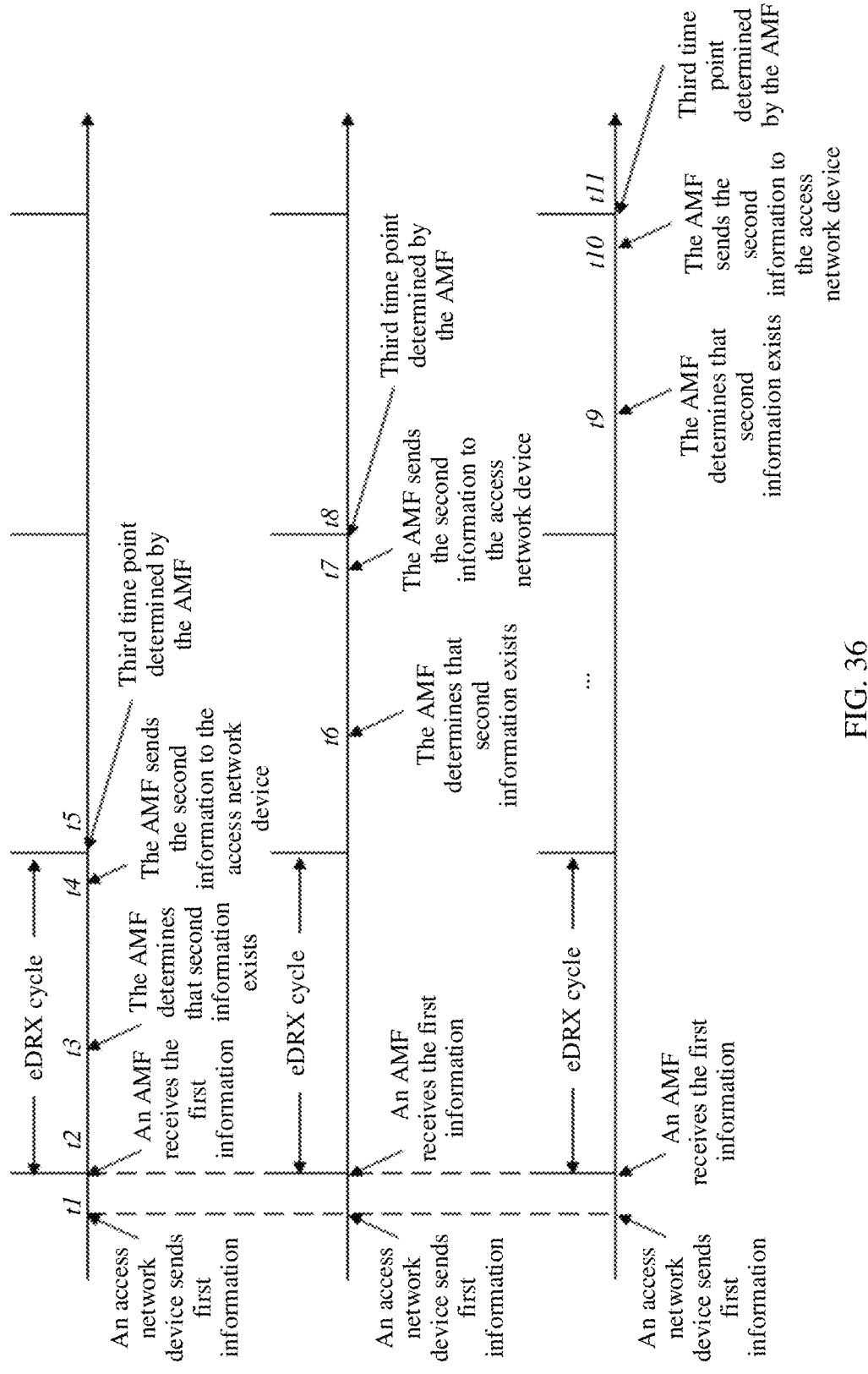
FIG. 36 is a schematic diagram of a method for determining a sending time point of second information based on first information according to an embodiment of this application.

As shown in FIG. 36, the access network device sends the first information at t1, and the AMF receives the first information at t2. If the AMF determines, at t3, that the second information exists, the AMF determines a third time point, namely, t5, based on t2 and an eDRX cycle, and the AMF sends the second information to the access network device at t4 before t5. If the AMF determines, at t6, that the second information exists, the AMF determines a third time point, namely, t8, based on t2 and an eDRX cycle, and a UPF sends the second information to the access network device at t7 before t8. If the AMF determines, at t9, that the second information exists, the AMF determines a third time point, namely, t11, based on t2 and an eDRX cycle, and the UPF sends the second information to the access network device at t10 before t11.

For example, t5 may be understood as a latest sending time point, a duration of an interval between t5 and t4 may be understood as a preset duration, and the AMF may send the second information to the access network device at t4 before t5. Optionally, the AMF may alternatively send the second information to the access network device at any moment in t4 to t5. Details are not repeated below.

It should be noted that FIG. 36 is merely an example, and does not constitute a limitation on the time point at which the access network device sends the first information and the time point at which the AMF receives the first information in this embodiment of this application. In an implementation, t1 may be equal to t2.

Figure 37:
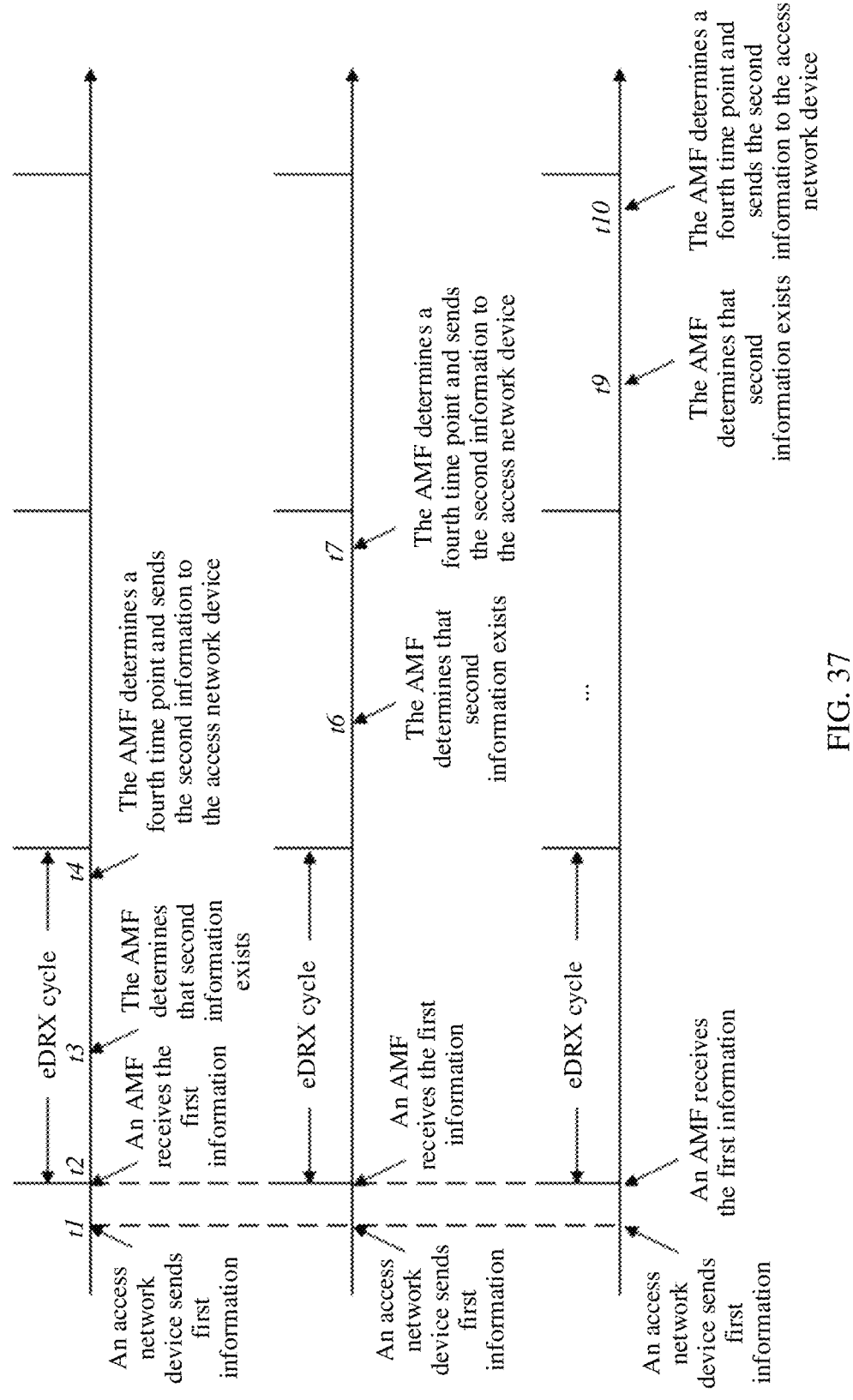
FIG. 37 is a schematic diagram of a method for determining a sending time point of second information based on first information according to an embodiment of this application.

In a possible implementation, the AMF may determine a fourth time point based on the eDRX cycle and a time point at which the first information is received, and the AMF sends the second information to the access network device at the fourth time point. The fourth time point is a time point (just before) just before an eDRX cycle boundary or an eDRX cycle start time point after the AMF determines that the second information exists. As shown in FIG. 37, the access network device sends the first information at t1, and the AMF receives the first information at t2. If the AMF determines, at t3, that the second information exists, the AMF determines a fourth time point, namely, t4, based on t2 and an eDRX cycle, and the AMF sends the second information to the access network device at t4. For example, the AMF determines a fourth time point based on t2, eDRX, and a timing advance for sending the second information. If the AMF determines, at t6, that the second information exists, the AMF determines a fourth time point, namely, t7, based on t2 and an eDRX cycle, and the AMF sends the second information to the access network device at t7. If the AMF determines, at t9, that the second information exists, the AMF determines a fourth time point, namely, t10, based on t2 and an eDRX cycle, and the AMF sends the second information to the access network device at t10.

It should be noted that FIG. 37 is merely an example, and does not constitute a limitation on the time point at which the access network device sends the first information and the time point at which the AMF receives the first information in this embodiment of this application.

In an implementation, t1 may be equal to t2.

Figure 38:
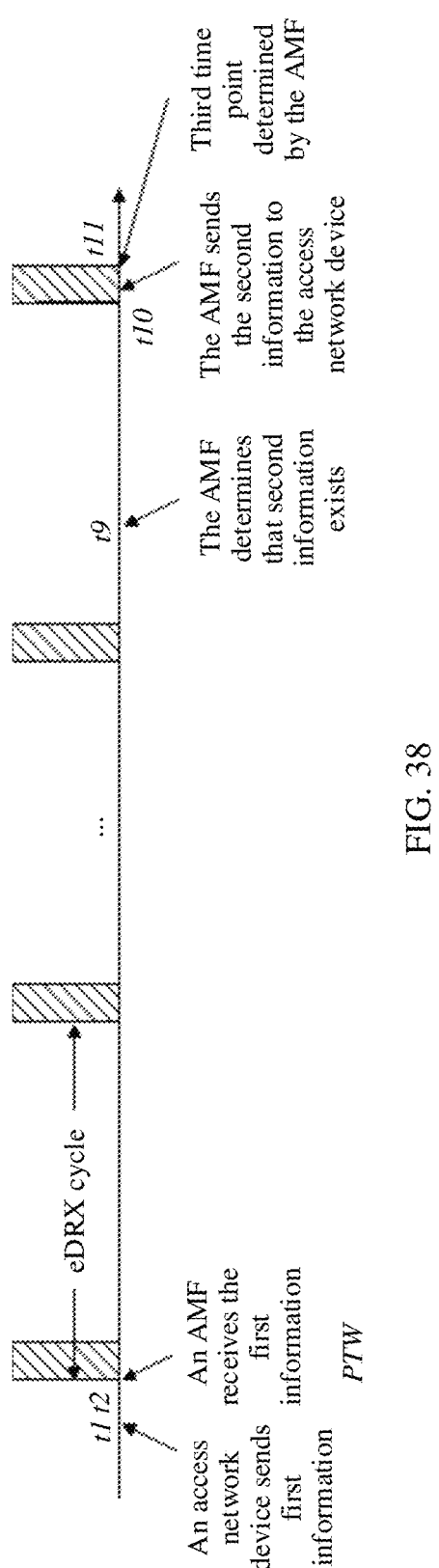
FIG. 38 is a schematic diagram of a method for determining a sending time point of second information based on first information according to an embodiment of this application.

Example 2: The First Information May Include an eDRX Cycle and a PTW Duration In a possible implementation, the AMF determines a time point at which the first information is received as a start time point of an eDRX cycle and a PTW. The AMF may determine a third time point based on the eDRX cycle, a PTW duration, and the time point at which the first information is received. The AMF sends the second information to the access network device before the third time point. For example, the AMF sends the second information to the access network device in a PTW before the third time point. The third time point is an end time point of the PTW after the AMF determines that the second information exists. As shown in FIG. 38, the access network device sends the first information at t1, and the AMF receives the first information at t2. If the AMF determines, at t9, that the second information exists, the AMF determines a third time point, namely, t11, based on t2, an eDRX cycle, and a PTW, and the AMF sends the second information to the access network device at t10 before t11.

It should be noted that FIG. 38 is merely an example, and does not constitute a limitation on the time point at which the access network device sends the first information and the time point at which the AMF receives the first information in this embodiment of this application. In an implementation, t1 may be equal to t2.

Figure 39:
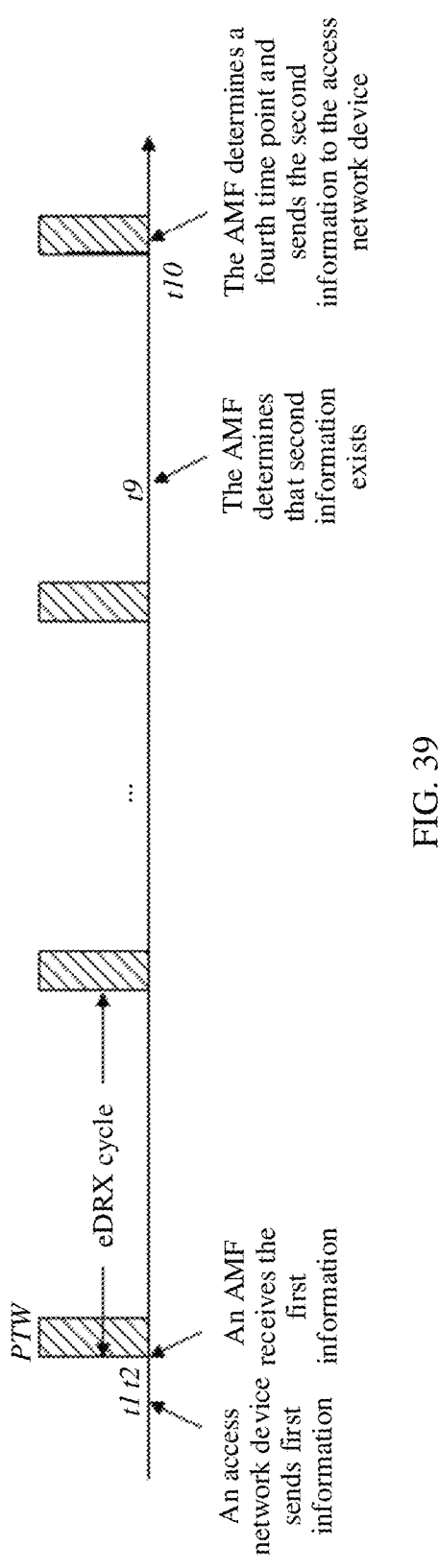
FIG. 39 is a schematic diagram of a method for determining a sending time point of second information based on first information according to an embodiment of this application.

In a possible implementation, the AMF determines a time point at which the first information is received as a start time point of an eDRX cycle and a PTW. The AMF may determine a fourth time point based on the eDRX cycle, a PTW duration, and the time point at which the first information is received. The AMF sends the second information to the access network device at the fourth time point. The fourth time point is a time point just before (just before) a PTW ends. For example, the fourth time point is a time point in the PTW. As shown in FIG. 39, the access network device sends the first information at t1, and the AMF receives the first information at t2. If the AMF determines, at t9, that the second information exists, the AMF determines a fourth time point, namely, t10, based on t2, an eDRX cycle, and a PTW, and the AMF sends the second information to the access network device at t10.

It should be noted that FIG. 39 is merely an example, and does not constitute a limitation on the time point at which the access network device sends the first information and the time point at which the AMF receives the first information in this embodiment of this application. In an implementation, t1 may be equal to t2.

Figure 40:
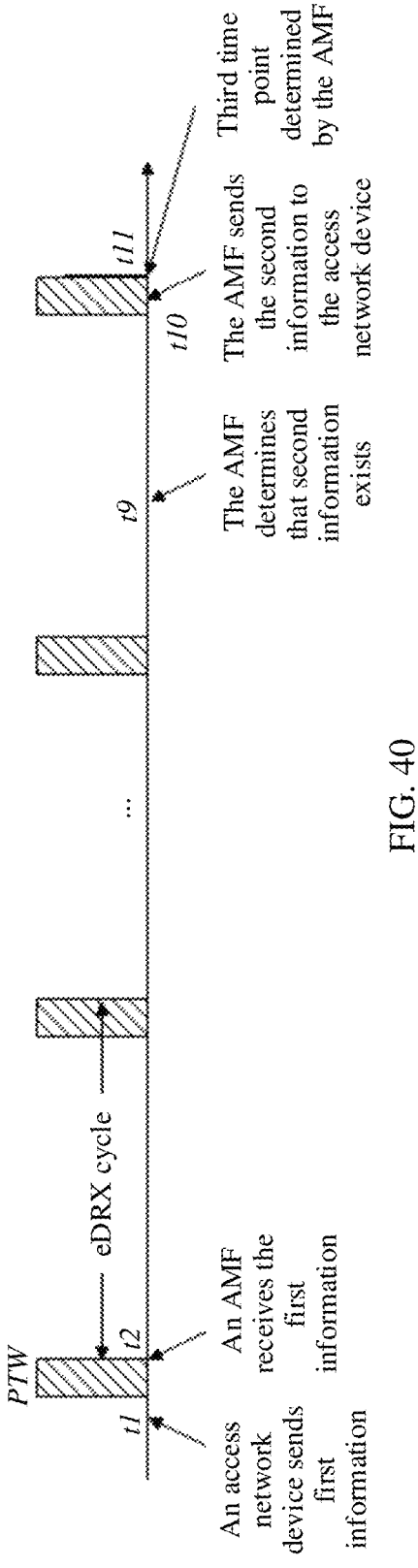
FIG. 40 is a schematic diagram of a method for determining a sending time point of second information based on first information according to an embodiment of this application.

In a possible implementation, the AMF determines a time point at which the first information is received as a start time point of an eDRX cycle and an end time point of a PTW. The AMF may determine a third time point based on the eDRX cycle, a PTW duration, and the time point at which the first information is received. The AMF sends the second information to the access network device before the third time point. For example, the AMF sends the second information to the access network device in a PTW before the third time point. The third time point is an end time point of the PTW. As shown in FIG. 40, the access network device sends the first information at t1, and the AMF receives the first information at t2. If the AMF determines, at t9, that the second information exists, the AMF determines a third time point, namely, t11, based on t2, an eDRX cycle, and a PTW, and the AMF sends the second information to the access network device at t10 before t11.

It should be noted that FIG. 40 is merely an example, and does not constitute a limitation on the time point at which the access network device sends the first information and the time point at which the AMF receives the first information in this embodiment of this application. In an implementation, t1 may be equal to t2.

Figure 41:
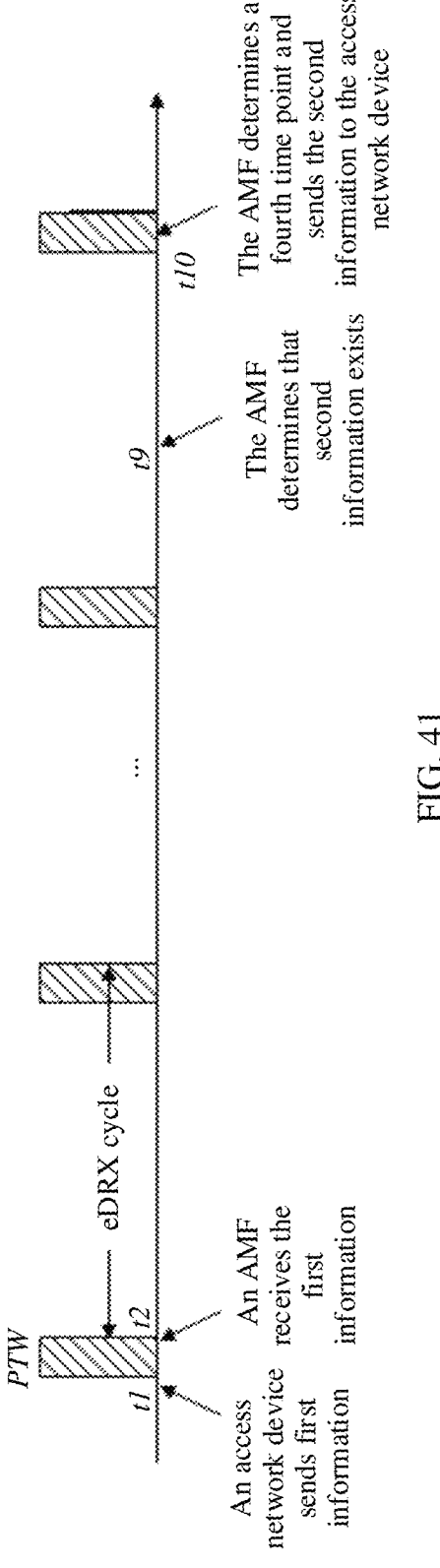
FIG. 41 is a schematic diagram of a method for determining a sending time point of second information based on first information according to an embodiment of this application.

In a possible implementation, the AMF determines a time point at which the first information is received as a start time point of an eDRX cycle and an end time point of a PTW. The AMF may determine a fourth time point based on the eDRX cycle, a PTW duration, and the time point at which the first information is received. The AMF sends the second information to the access network device at the fourth time point. The fourth time point is a time point before a PTW ends. For example, the fourth time point is in the PTW. As shown in FIG. 41, the access network device sends the first information at t1, and the AMF receives the first information at t2. If the AMF determines, at t9, that the second information exists, the AMF determines a fourth time point, namely, t10, based on t2, an eDRX cycle, and a PTW, and the AMF sends the second information to the access network device at t10.

It should be noted that FIG. 41 is merely an example, and does not constitute a limitation on the time point at which the access network device sends the first information and the time point at which the AMF receives the first information in this embodiment of this application. In an implementation, t1 may be equal to t2.

Figure 42:
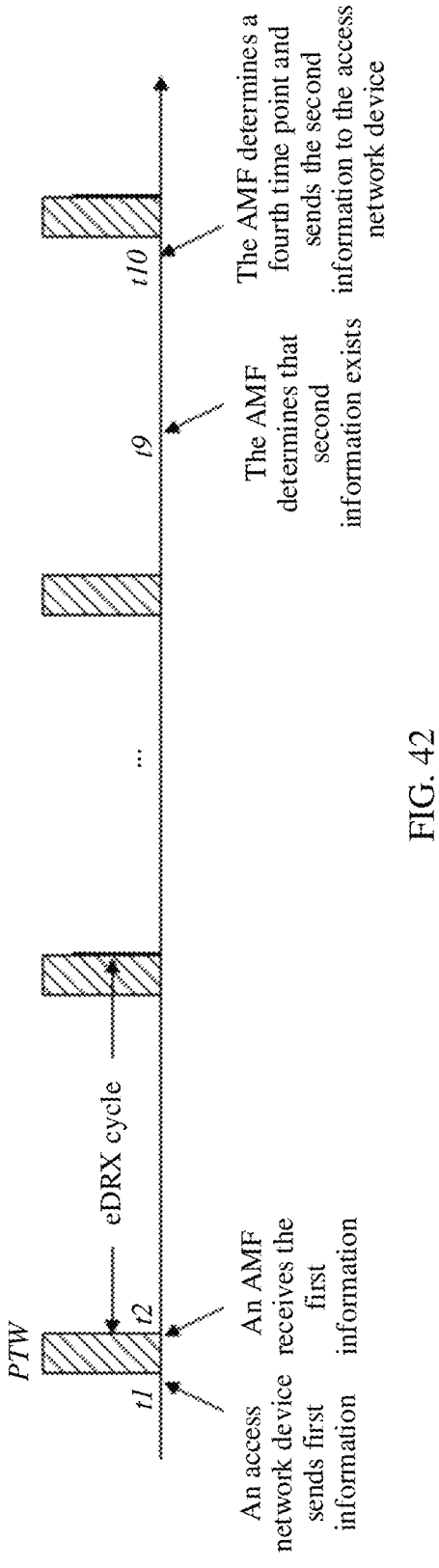
FIG. 42 is a schematic diagram of a method for determining a sending time point of second information based on first information according to an embodiment of this application.

In a possible implementation, the AMF determines a time point at which the first information is received as a start time point of an eDRX cycle and an end time point of a PTW. The AMF may determine a fourth time point based on the eDRX cycle, a PTW duration, and the time point at which the first information is received. The AMF sends the second information to the access network device at the fourth time point. The fourth time point is a time point before a PTW. As shown in FIG. 42, the access network device sends the first information at t1, and the AMF receives the first information at t2. If the AMF determines, at t9, that the second information exists, the AMF determines a fourth time point, namely, t10, based on t2, an eDRX cycle, and a PTW, and the AMF sends the second information to the access network device at t10.

It should be noted that FIG. 42 is merely an example, and does not constitute a limitation on the time point at which the access network device sends the first information and the time point at which the AMF receives the first information in this embodiment of this application. In an implementation, t1 may be equal to t2.

In this application, the eDRX cycle may be a paging occasion (paging occasion, PO) cycle, as shown in FIG. 11*a*. Alternatively, the eDRX cycle is a paging time window (paging time window, PTW) cycle, where a PTW includes one or more POs, as shown in FIG. 11*b*.

Example 3: The First Information May Include an eDRX Cycle and a First Duration In a possible implementation, the first duration indicates at least one of the following:

(1) a time interval between a time point at which the access network device sends the first information and a next eDRX cycle boundary;

(2) a time interval between the time point at which the access network device sends the first information and a next PTW; and (3) a time interval between the time point at which the access network device sends the first information and a next paging occasion PO.

Figure 43:
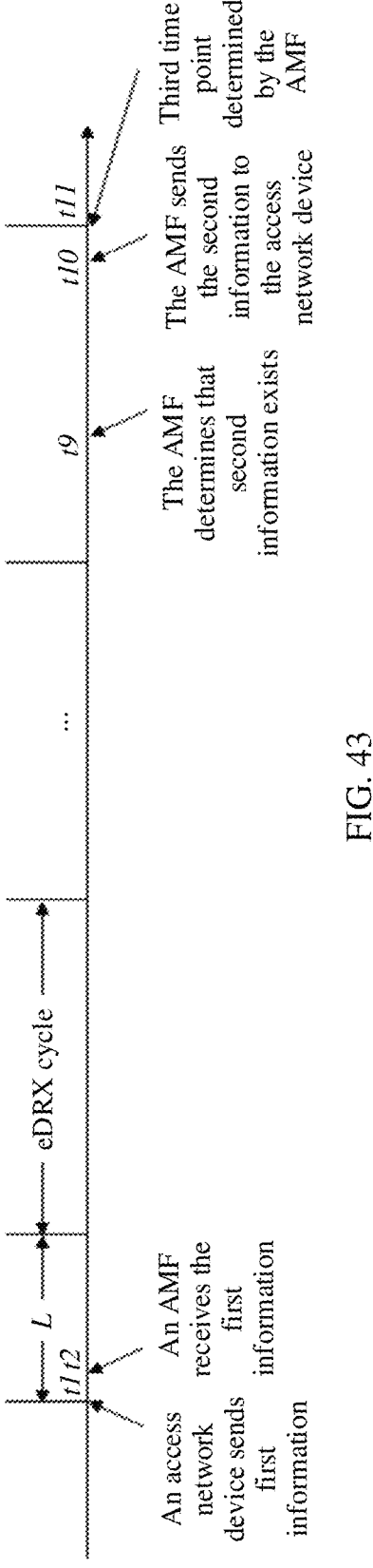
FIG. 43 is a schematic diagram of a method for determining a sending time point of second information based on first information according to an embodiment of this application.

The AMF determines a third time point based on the first duration and the eDRX cycle. The third time point is an eDRX cycle boundary after the AMF determines that the second information exists. As shown in FIG. 43, the access network device sends the first information at t1, the AMF receives the first information at t2, the AMF determines, at t9, that the second information exists, and the AMF determines t1 based on t2 and a transmission delay (a time difference between t1 and t2) of the first information, then determines an eDRX cycle boundary based on a first duration L, and determines a third time point t11 based on the determined eDRX cycle boundary and an eDRX cycle. For example, if t1 is equal to t2, the AMF directly determines the third time point t11 based on t1, L, and the eDRX cycle. The AMF sends the second information to the access network device at t10 before the third time point.

Figure 44:
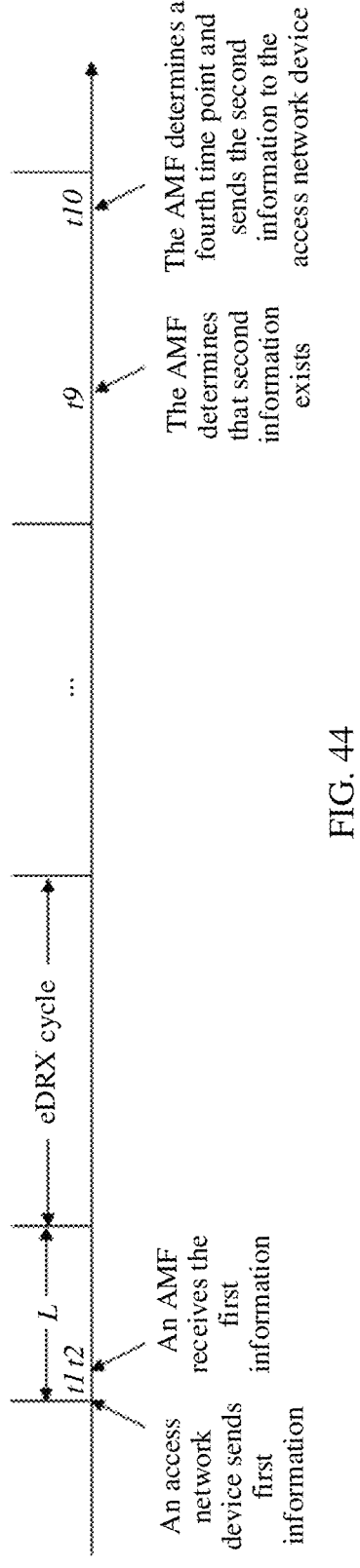
FIG. 44 is a schematic diagram of a method for determining a sending time point of second information based on first information according to an embodiment of this application.

In a possible implementation, the first duration indicates the time interval between the time point at which the access network device sends the first information and the next eDRX cycle boundary. The AMF determines a fourth time point based on the first duration and the eDRX cycle. The fourth time point is a time point before an eDRX cycle boundary after the AMF determines that the second information exists. As shown in FIG. 44, the access network device sends the first information at t1, the AMF receives the first information at t2, the AMF determines, at t9, that the second information exists, and the AMF determines t1 based on t2 and a transmission delay of the first information, then determines an eDRX cycle boundary based on t1 and a first duration L, and determines a fourth time point, namely, t10, based on the determined eDRX cycle boundary and an eDRX cycle. For example, if t1 is equal to t2, the AMF directly determines the fourth time point t10 based on t1, L, and the eDRX cycle. The AMF sends the second information to the access network device at the fourth time point t10.

The foregoing mainly describes the solutions provided in this application from a perspective of interaction between the network elements. It may be understood that, to implement the foregoing functions, the network elements include corresponding hardware structures and/or software modules for performing the functions. A person skilled in the art should easily be aware that, in combination with the examples of units, algorithms, and steps described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 45:
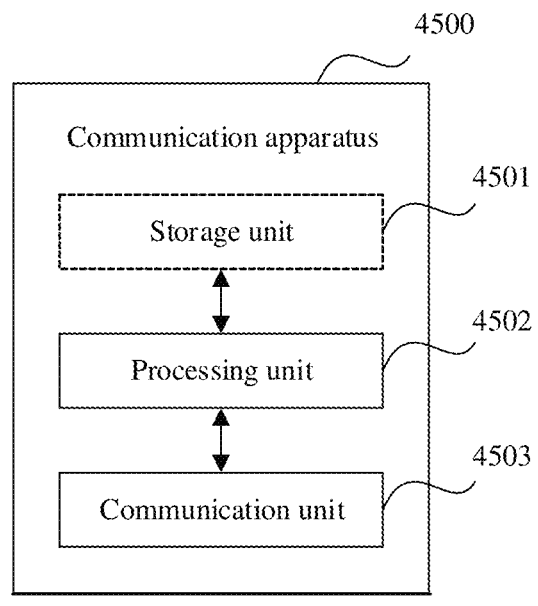
FIG. 45 is a schematic diagram of a structure of an apparatus according to this application.

FIG. 45 is a possible example block diagram of a data transmission apparatus in this application. The apparatus 4500 may exist in a form of software or hardware. The apparatus 4500 may include a processing unit 4502 and a communication unit 4503. In an implementation, the communication unit 4503 may include a receiving unit and a sending unit. The processing unit 4502 is configured to control and manage an action of the apparatus 4500. The communication unit 4503 is configured to support the apparatus 4500 in communicating with another network entity. The apparatus 4500 may further include a storage unit 4501, configured to store program code and data that are of the apparatus 4500.

The processing unit 4502 may be a processor or a controller, for example, may be a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing unit 4502 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The storage unit 4501 may be a memory. The communication unit 4503 is an interface circuit of the apparatus, and is configured to receive a signal from another apparatus. For example, when the apparatus is implemented in a form of a chip, the communication unit 4503 is an interface circuit used by the chip to receive a signal from another chip or apparatus, or is an interface circuit used by the chip to send a signal to another chip or apparatus.

The apparatus 4500 may be the network device (for example, the access and mobility management network element, the session management network element, the user plane network element, or the access network device) in any one of the foregoing embodiments, or may be a chip used for the network device. For example, when the apparatus 4500 is the network device, the processing unit 4502 may be, for example, a processor, and the communication unit 4503 may be, for example, a transceiver. Optionally, the transceiver may include a radio frequency circuit, and the storage unit may be, for example, a memory. For example, when the apparatus 4500 is the chip used for the network device, the processing unit 4502 may be, for example, a processor, and the communication unit 4503 may be, for example, an input/output interface, a pin, or a circuit. The processing unit 4502 may execute computer-executable instructions stored in the storage unit.

Optionally, the storage unit is a storage unit in the chip, such as a register or a cache. The storage unit may alternatively be a storage unit, such as a read-only memory (read-only memory, ROM) or another type of static storage device that can store static information and instructions, or a random access memory (random access memory, RAM), that is outside the chip and that is in the network device.

In a first embodiment, the apparatus 4500 is the first network device (user plane network element) in the foregoing example, and the communication unit 4503 of the first network device includes a sending unit and a receiving unit. The receiving unit is configured to: receive downlink data, where the downlink data is used to be sent to a terminal device; and receive first information from a second network device, where the first information is used to determine a time point for sending the downlink data to the second network device. The processing unit 4502 is configured to send the downlink data to the second network device based on the first information.

In a possible implementation method, the first information includes an extended discontinuous reception eDRX cycle; the first information includes an eDRX cycle and a paging time window PTW duration; the first information includes an eDRX cycle and a first duration; the first information includes an eDRX cycle, a PTW duration, and a first duration; the first information includes a first duration; the first information includes eighth indication information; the first information includes eighth indication information and a second duration; or the first information includes ninth indication information, where the first duration indicates a time interval to a next PTW or a time interval to a next paging occasion PO, the eighth indication information indicates to suspend sending of the downlink data to the terminal device, the second duration indicates a duration for which sending of the downlink data to the terminal device is suspended, and the ninth indication information indicates to resume sending the downlink data to the terminal device.

In a possible implementation method, the processing unit 4502 is specifically configured to determine, based on the first information, a latest sending time point for sending the downlink data; and the sending unit is specifically configured to send the downlink data to the second network device in a first preset duration before the latest sending time point.

In a possible implementation method, the latest sending time point is a wake-up time point of the terminal device after the downlink data is received.

In a possible implementation method, the sending unit is specifically configured to send second indication information to the second network device or a third network device, where the second indication information indicates that the downlink data exists.

In a possible implementation method, the first network device is a user plane network element UPF, the second network device is an access network device, and the third network device is an access network device or an access and mobility management network element AMF.

In a second embodiment, the apparatus 4500 is the second network device (access network device) in the foregoing example, and the communication unit 4503 of the second network device includes a sending unit and a receiving unit. The processing unit 4502 is configured to determine first information, where the first information is used to determine a sending time point of downlink data, and the downlink data is used to be sent to a terminal device; and the sending unit is configured to send the first information to a first network device.

In a possible implementation method, the first information includes: the first information includes an extended discontinuous reception eDRX cycle; the first information includes an eDRX cycle and a paging time window PTW duration;

the first information includes an eDRX cycle and a first duration; the first information includes an eDRX cycle, a PTW duration, and a first duration; the first information includes a first duration; the first information includes eighth indication information; the first information includes eighth indication information and a second duration; or the first information includes ninth indication information, where the first duration indicates a time interval to a next PTW or a time interval to a next paging occasion PO, the eighth indication information indicates to suspend sending of the downlink data to the terminal device, the second duration indicates a duration for which sending of the downlink data to the terminal device is suspended, and the ninth indication information indicates to resume sending the downlink data to the terminal device.

In a possible implementation method, the receiving unit is specifically configured to receive second indication information, where the second indication information indicates that the downlink data exists.

In a possible implementation method, the processing unit 4502 is further configured to determine that the extended discontinuous reception eDRX cycle is not less than a preset threshold.

In a possible implementation method, the first network device is a user plane network element UPF or an access and mobility management network element AMF.

In a third embodiment, the apparatus 4500 is the third network device (access and mobility management network element) in the foregoing example, and the communication unit 4503 of the access network device includes a sending unit and a receiving unit. The receiving unit is configured to receive first information from a second network device, where the first information is used to determine a sending time point of downlink data, and the downlink data is used to be sent to a terminal device. The sending unit is configured to send the first information to a first network device.

In a possible implementation method, the first information includes: the first information includes an extended discontinuous reception eDRX cycle; the first information includes an eDRX cycle and a paging time window PTW duration; the first information includes an eDRX cycle and a first duration; or the first information includes an eDRX cycle, a PTW duration, and a first duration, where the first duration indicates a time interval to a next PTW or a time interval to a next paging occasion PO.

In a possible implementation method, the receiving unit is specifically configured to receive second indication information from the first network device, where the second indication information indicates that the first network device has the downlink data.

In a possible implementation method, the first network device is a user plane network element UPF, and the second network device is an access network device.

In a fourth embodiment, the apparatus 4500 is the first network device (user plane network element) in the foregoing example, and the communication unit 4503 of the first network device includes a sending unit and a receiving unit. The receiving unit is configured to receive second information from a second network device, where the second information indicates that a terminal device is reachable. The processing unit 4502 is configured to send downlink data of the terminal device to the second network device based on the second information.

In a possible implementation method, the second information indicates that the terminal device requests to enter a radio resource control RRC connected mode; or the second information indicates that the terminal device is in an RRC connected mode.

In a possible implementation method, the processing unit is configured to determine that the downlink data of the terminal device is buffered.

In a possible implementation method, the sending unit is specifically configured to send fourth indication information to the second network device or a third network device, where the fourth indication information indicates whether the downlink data of the terminal device is buffered.

In a possible implementation method, the second network device is an access network device, and the third network device is an access network device or an access and mobility management network element AMF.

In a fifth embodiment, the apparatus 4500 is the second network device (access network device) in the foregoing example, and the communication unit 4503 of the second network device includes a sending unit and a receiving unit. The processing unit 4502 is configured to determine second information, where the second information indicates that a terminal device is reachable. The sending unit is configured to send the second information to a first network device.

In a possible implementation method, the second information indicates that the terminal device requests to enter a radio resource control RRC connected mode; or the second information indicates that the terminal device is in an RRC connected mode.

In a possible implementation method, the receiving unit is specifically configured to receive fourth indication information from the first network device, where the fourth indication information indicates whether downlink data of the terminal device is buffered.

In a possible implementation method, the sending unit is further configured to send sixth indication information to a third network device, where the sixth indication information indicates a load status of the second network device; or the sixth indication information indicates that the second network device supports a capability of sending first information to the first network device.

In a possible implementation method, the first network device is a user plane network element UPF, the second network device is an access network device, and the third network device is an access and mobility management network element AMF.

In a sixth embodiment, the apparatus 4500 is the third network device (access and mobility management network element) in the foregoing example, and the communication unit 4503 of the access network device includes a sending unit and a receiving unit. The processing unit 4502 is configured to determine second information, where the second information indicates that a terminal device is reachable. The sending unit is configured to send the second information to a first network device.

In a possible implementation method, the second information indicates that the terminal device requests to enter a radio resource control RRC connected mode; or the second information indicates that the terminal device is in an RRC connected mode.

In a possible implementation method, the receiving unit is specifically configured to receive fourth indication information from the first network device, where the fourth indication information indicates whether downlink data of the terminal device is buffered.

In a possible implementation method, the receiving unit is further configured to receive sixth indication information, where the sixth indication information indicates a load status of the second network device; or the sixth indication information indicates that the second network device supports a capability of sending first information to the first network device.

In a possible implementation method, the first network device is a user plane network element UPF, the second network device is an access network device, and the third network device is an access and mobility management network element AMF.

In a sixth embodiment, the apparatus 4500 is the third network device (access and mobility management network element) in the foregoing example, and the communication unit 4503 of the access network device includes a sending unit and a receiving unit. The receiving unit is configured to receive first information from a second network device. The sending unit is configured to send second information, where the second information is used to be sent to a terminal device. The processing unit 4502 is configured to: after the sending unit sends the second information, wait, in a waiting duration, to receive response information from the terminal device through the receiving unit.

The first information includes one or more of the following: an extended discontinuous reception eDRX cycle, a paging time window PTW duration, a first duration, and first indication information, where the first duration indicates a time interval to a next PTW or a time interval to a next paging occasion PO, and the first indication information indicates that the terminal device is in an RRC inactive mode.

In a possible implementation method, the terminal device is in a connection management connected CM connected mode, and the second information is NAS signaling.

In a seventh embodiment, the apparatus 4500 is the second network device (access network device) in the foregoing example, and the communication unit 4503 of the second network device includes a sending unit and a receiving unit. The processing unit 4502 is configured to determine first information, where the first information includes one or more of the following: an extended discontinuous reception eDRX cycle, a paging time window PTW duration, a first duration, and first indication information, where the first duration indicates a time interval to a next PTW or a time interval to a next paging occasion PO, and the first indication information indicates that a terminal device is in an RRC inactive mode. The sending unit is configured to send the first information to a third network device.

In a possible implementation method, the first information is used to determine a response duration of the terminal device for second information, and the second information is used to be sent to the terminal device.

In a possible implementation method, before the sending unit sends the first information to the first network device, the processing unit is further configured to determine that the extended discontinuous reception eDRX cycle is not less than a preset threshold.

Figure 46:
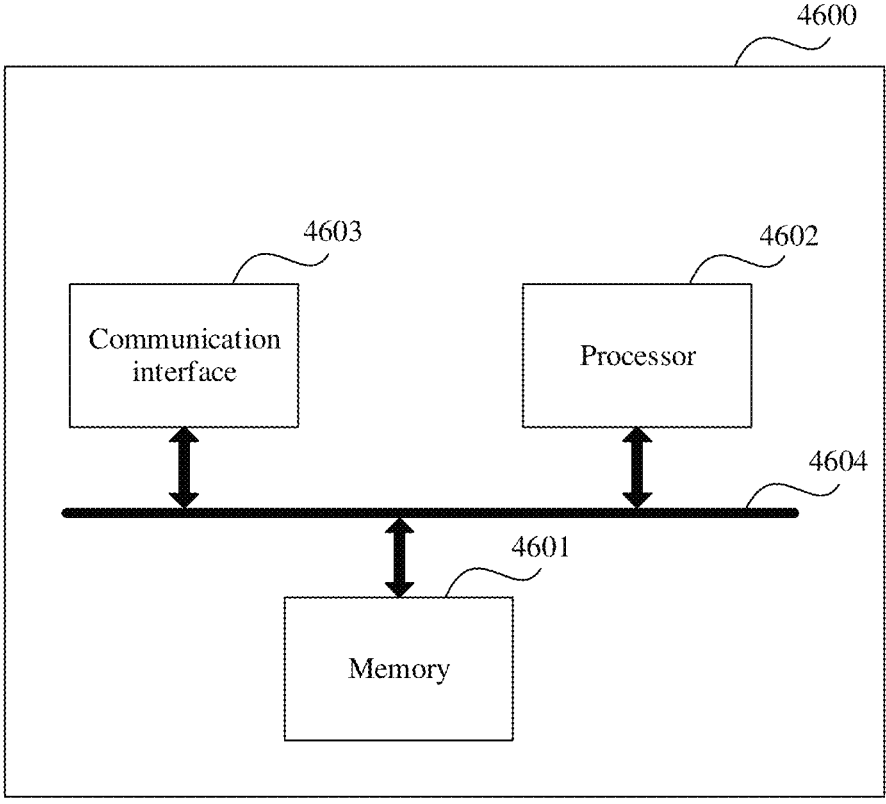
FIG. 46 is a schematic diagram of a structure of another apparatus according to this application.

FIG. 46 is a schematic diagram of an apparatus according to this application. The apparatus may be the network device (for example, the access and mobility management network element, the session management network element, the user plane network element, or the access network device in the foregoing examples) in the foregoing embodiments. The apparatus 4600 includes a processor 4602 and a communication interface 4603. Optionally, the apparatus 4600 may further include a memory 4601 and/or a communication line 4604. The communication interface 4603, the processor 4602, and the memory 4601 may be connected to each other through the communication line 4604. The communication line 4604 may be a peripheral component interconnect (peripheral component interconnect, PCI for short) bus, an extended industry standard architecture (extended industry standard architecture, EISA) bus, or the like. The communication line 4604 may be classified into an address bus, a data bus, a control bus, and the like. For ease of representation, only one thick line is used to represent the bus in FIG. 46, but this does not mean that there is only one bus or only one type of bus.

The processor 4602 may be a CPU, a microprocessor, an ASIC, or one or more integrated circuits configured to control program execution in the solutions of this application.

The communication interface 4603 may be any apparatus such as a transceiver, and is configured to communicate with another device or a communications network, such as an ethernet, a radio access network (radio access network, RAN), a wireless local area network (wireless local area network, WLAN), or a wired access network.

The memory 4601 may be a ROM, another type of static storage device that can store static information and instructions, a RAM, or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory 4601 is not limited thereto. The memory may exist independently, and may be connected to the processor through the communication line 4604. The memory may alternatively be integrated with the processor.

The memory 4601 is configured to store computer-executable instructions for executing the solutions of this application, and the processor 4602 controls the execution. The processor 4602 is configured to execute the computer-executable instructions stored in the memory 4601, to implement the session processing method provided in the foregoing embodiments of this application.

Optionally, the computer-executable instructions in embodiments of this application may also be referred to as application program code. This is not specifically limited in embodiments of this application.

The program product may be any combination of one or more readable media. The readable medium may be a readable signal medium or a readable storage medium. For example, the readable storage medium may be, but is not limited to, an electrical, a magnetic, an optical, an electromagnetic, an infrared, or a semiconductor system, apparatus or device, or any combination thereof. More specific examples (non-exhaustive list) of the readable storage medium include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any appropriate combination thereof.

A program product for configuring parameters in an implementation of the present invention may use a portable compact disc read-only memory (CD-ROM) and include program code, and may run on a server device. However, the program product of the present invention is not limited thereto. In this specification, the readable storage medium may be any tangible medium that includes or stores a program, and the program can be transmitted as information, used by an apparatus or a component, or used in combination with an apparatus or a component.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of the present invention may be written in any combination of one or more program design languages. The program design languages include object-oriented program design languages such as Java and C++, and further include a conventional procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or server. When the program code is executed on the remote computing device, the remote computing device may be connected to the user's computing device by using any type of network, including a local area network (LAN) or a wide area network (WAN), or may be connected to an external computing device.

An embodiment of this application further provides a computing device readable storage medium for an information synchronization method, that is, content is not lost after a power failure. The storage medium stores a software program including program code. When the program code is executed on a computing device, any solution for information synchronization in the foregoing embodiments of this application can be implemented when the software program is read and executed by one or more processors.

The foregoing describes this application with reference to the block diagrams and/or flowcharts of the method, the apparatus (system), and/or the computer program product in embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a dedicated computer, or another programmable data processing apparatus to produce a machine, so that the instructions executed by the processor of the computer and/or the another programmable data processing apparatus create a method for implementing a specific function/action in the block in the flowcharts and/or block diagrams.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, so that the computer-usable or computer-readable code is used by an instruction execution system or used in combination with the instruction execution system. In the context of this application, the computer-usable or computer-readable medium may be any medium, and may include, store, communicate, transmit, or transfer a program, for use by an instruction execution system, apparatus, or device or used in combination with the instruction execution system, apparatus, or device.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall in the scope of protection defined by the following claims and their equivalent technologies.

What is claimed is:

1. A data transmission method, wherein the method is performed by an access and mobility management network element (AMF) or a chip of the AMF, and comprises:

receiving first information from an access network device, wherein the first information triggers the AMF to send first indication information to a network device, and the first information is usable to determine a deadline by which the network device buffers downlink data; and sending the first indication information to the network device, wherein the first indication information indicates the network device to buffer the downlink data in response to the network device receiving the downlink data of a terminal device.

2. The method according to claim 1, wherein the deadline is a wake-up time point of the terminal device after the downlink data is received at the network device.

3. The method according to claim 1, wherein the method further comprises:

receiving second indication information from the network device, wherein the second indication information indicates that the downlink data of the terminal device exists.

4. The method according to claim 1, wherein the network device comprises a session management function network element (SMF).

5. A data transmission method, wherein the method is performed by an access network device or a chip of the access network device, and comprises:

determining first information, wherein the first information triggers an access and mobility management network element (AMF) to send first indication information to a network device, the first indication information indicates the network device to, in response to receiving downlink data of a terminal device, buffer the downlink data, and the first information is usable to determine a deadline by which the network device buffers the downlink data; and sending the first information to the AMF, wherein the first information comprises:

an extended discontinuous reception (eDRX) cycle; or an eDRX cycle and a paging time window (PTW) duration.

6. The method according to claim 5, wherein the first information further comprises:

a first duration; and the first duration indicates a time interval to a next PTW or a time interval to a next paging occasion (PO).

7. The method according to claim 5, wherein the method further comprises:

receiving second indication information from the AMF, wherein the second indication information indicates that the downlink data of the terminal device exists.

8. The method according to claim 5, wherein the network device comprises a session management function network element (SMF).

9. An apparatus, comprising:

one or more processors; and one or more non-transitory computer readable memories coupled to the one or more processors and storing programming to be executed by the one or more processors for causing the apparatus to perform operations comprising:

receiving downlink data to be sent to a terminal device;

receiving first information from a second network device;

determining, based on the first information, a time point for sending the downlink data to the second network device; and sending the downlink data to the second network device based on the determined time point, the receiving the first information from the second network device is before the receiving the downlink data, the operations further comprise buffering the downlink data in response to the receiving the downlink data, and in accordance with the first information received from the second network device, and the sending the downlink data to the second network device comprises sending the downlink data to the second network device without requiring further notification from the second network device, or from a third network device between the apparatus and the second network device.

10. The method according to claim 1, wherein the first information comprises:

an extended discontinuous reception (eDRX) cycle; or an eDRX cycle and a paging time window (PTW) duration.

11. The method according to claim 1, wherein the method further comprises:

determining that an extended discontinuous reception (eDRX) cycle is not less than a preset threshold.

\* \* \* \* \*